United States Patent
Klasen-Memmer et al.

(10) Patent No.: US 8,202,584 B2
(45) Date of Patent: Jun. 19, 2012

(54) LIQUID-CRYSTALLINE MEDIUM AND LIQUID-CRYSTAL DISPLAY

(75) Inventors: Melanie Klasen-Memmer, Heuchelheim (DE); Axel Jansen, Darmstadt (DE); Detlef Pauluth, Ober-Ramstadt (DE)

(73) Assignee: Merck Patent GmbH, Darmstadt (DE)

( * ) Notice: Subject to any disclaimer, the term of this patent is extended or adjusted under 35 U.S.C. 154(b) by 86 days.

(21) Appl. No.: 12/753,937

(22) Filed: Apr. 5, 2010

(65) Prior Publication Data

US 2010/0252777 A1    Oct. 7, 2010

(30) Foreign Application Priority Data

Apr. 6, 2009   (DE) .......................... 10 2009 016 305

(51) Int. Cl.
| | |
|---|---|
| C09K 19/34 | (2006.01) |
| C09K 19/32 | (2006.01) |
| C09K 19/30 | (2006.01) |
| C09K 19/12 | (2006.01) |
| C09K 19/20 | (2006.01) |

(52) U.S. Cl. ............... 428/1.1; 252/299.61; 252/299.62; 252/299.63; 252/299.67

(58) Field of Classification Search ............. 252/299.61, 252/299.62, 299.63, 299.66, 299.67; 428/1.1
See application file for complete search history.

(56) References Cited

U.S. PATENT DOCUMENTS

2010/0216986 A1 *  8/2010  Jansen et al. ...................... 540/1

FOREIGN PATENT DOCUMENTS

| DE | 101 02 631 A1 | 8/2001 |
|---|---|---|
| DE | 10 2008 036 807 A1 | 3/2009 |
| GB | 2 229 179 A | 9/1990 |
| JP | 2007-84487 A | 4/2007 |
| WO | WO 01/64814 A1 | 9/2001 |

* cited by examiner

*Primary Examiner* — Shean Wu
(74) *Attorney, Agent, or Firm* — Millen, White, Zelano & Branigan, P.C.

(57) ABSTRACT

Disclosed are a dielectrically negative, liquid-crystalline medium which contains a (first) dielectrically negative component (component A), which contains one or more dielectrically negative compounds of formula I

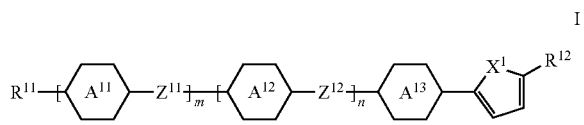

and a further (second) dielectrically negative component (component B), and the use thereof in an electro-optical display, particularly in an active-matrix display based on the VA, ECB, PS-VA, FFS or IPS effect, and displays of this type.

31 Claims, No Drawings

LIQUID-CRYSTALLINE MEDIUM AND LIQUID-CRYSTAL DISPLAY

The present invention relates to liquid-crystal media and to the use thereof in liquid-crystal displays, and to these liquid-crystal displays, particularly liquid-crystal displays which use the ECB (electrically controlled birefringence) effect with dielectrically negative liquid crystals in a homeotropic initial alignment. The liquid-crystal media according to the invention are distinguished by a particularly short response time in the displays according to the invention at the same time as a high voltage holding ratio.

Displays which use the ECB effect have become established as so-called VAN (vertically aligned nematic) displays besides IPS (in-plane switching) displays (for example: Yeo, S. D., Paper 15.3: "An LC Display for the TV Application", SID 2004 International Symposium, Digest of Technical Papers, XXXV, Book II, pp. 758 & 759), and the long-known displays, as one of the three more recent types of liquid-crystal display that are currently the most important besides TN (twisted nematic) displays, in particular for television applications.

The most important designs that should be mentioned are: MVA (multi-domain vertical alignment, for example: Yoshide, H. et al., Paper 3.1: "MVA LCD for Notebook or Mobile PCs . . . ", SID 2004 International Symposium, Digest of Technical Papers, XXXV, Book I, pp. 6 to 9, and Liu, C. T. et al., Paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, Paper 15.4: "Super PVA Sets New State-of-the-Art for LCD-TV", SID 2004 International Symposium, Digest of Technical Papers, XXXV, Book II, pp. 760 to 763) and ASV (advanced super view, for example: Shigeta, Mitzuhiro and Fukuoka, Hirofumi, Paper 15.2: "Development of High Quality LCDTV", SID 2004 International Symposium, Digest of Technical Papers, XXXV, Book II, pp. 754 to 757).

In general form, the technologies are compared, for example, in Souk, Jun, SID Seminar 2004, Seminar M-6: "Recent Advances in LCD Technology", Seminar Lecture Notes, M-6/1 to M-6/26, and Miller, Ian, SID Seminar 2004, Seminar M-7: "LCD-Television", Seminar Lecture Notes, M-7/1 to M-7/32.

Although the response times of modern ECB displays have already been significantly improved by addressing methods with overdrive, for example: Kim, Hyeon Kyeong et al., Paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular in the switching of grey shades, is still a problem which has not yet been solved to a satisfactory extent.

ECB displays, like ASV displays, use liquid-crystalline media of negative dielectric anisotropy ($\Delta\epsilon$), whereas TN and to date all conventional IPS displays use liquid-crystalline media of positive dielectric anisotropy.

In liquid-crystal displays of this type, the liquid crystals are used as dielectrics, whose optical properties change reversibly on application of an electrical voltage.

Since in displays in general, i.e. also in displays in accordance with these mentioned effects, the operating voltage should be as low as possible, use is made of liquid-crystal media which are generally predominantly composed of liquid-crystal compounds, all of which have the same sign of the dielectric anisotropy and have the highest possible value of the dielectric anisotropy.

In the media used in accordance with the present application, at most significant amounts of dielectrically neutral liquid-crystal compounds and generally only very small amounts of dielectrically positive compounds or even none at all are typically employed, since in general the liquid-crystal displays are intended to have the lowest possible addressing voltages.

The addressing voltage of the displays of the prior art is often too great, in particular for displays which are not connected directly or not continuously to the power supply network, such as, for example, displays for mobile applications.

In addition, the phase range must be sufficiently broad for the intended application.

In particular, the response times of the liquid-crystal media in the displays must be improved, i.e. reduced. This is particularly important for displays for television or multimedia applications. In order to improve the response times, it has repeatedly been proposed in the past to optimise the rotational viscosity of the liquid-crystal media ($\gamma_1$), i.e. to achieve media having the lowest possible rotational viscosity. However, the results achieved here are inadequate for many applications and therefore make it appear desirable to find further optimisation approaches.

There is therefore a great demand for liquid-crystal media which do not have the disadvantages of the media from the prior art, or at least do so to a significantly reduced extent.

Surprisingly, it has been found that it is possible to achieve liquid-crystal displays which have a short response time in ECB displays and at the same time have a sufficiently broad nematic phase, favourable birefringence ($\Delta n$) and a high voltage holding ratio.

Media of this type are to be used, in particular, for electro-optical displays with active-matrix addressing based on the ECB effect and for IPS or FFS (fringe field switching) displays. The medium according to the invention preferably has negative dielectric anisotropy.

The principle of electrically controlled birefringence, the ECB (electrically controlled birefringence) effect or DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). Papers by J. F. Kahn (Appl. Phys. Lett. 20 (1972), 1193) and G. Labrunie and J. Robert (J. Appl. Phys. 44 (1973), 4869) followed.

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy $\Delta n$ and values for the dielectric anisotropy $\Delta\epsilon$ of $\leq -0.5$ in order to be suitable for use for high-information display elements based on the ECB effect. Electro-optical display elements based on the ECB effect have a homeotropic edge alignment (VA technology=vertically aligned). Dielectrically negative liquid-crystal media can also be used in displays which use the IPS or FFS effect.

Polymerisable compounds, preferably polymerisable mesogenic compounds, so-called reactive mesogens (RMs), for example as disclosed in U.S. Pat. No. 6,861,107, may furthermore be added to the mixtures according to the invention in concentrations of preferably 0.12-5% by weight, particularly preferably 0.2-2% by weight, based on the mixture. These mixtures may optionally also comprise an initiator, as described, for example, in U.S. Pat. No. 6,781,665. The initiator, for example Irganox® 1076 from Ciba, is preferably added to the mixture comprising polymerisable compounds in amounts of 0-1%. Mixtures of this type can be used for so-called polymer-stabilised VA modes (PS-VA), in which polymerisation of the reactive mesogens is intended to take place in the liquid-crystalline mixture. The prerequisite for this is that the liquid-crystal mixture does not itself comprise any polymerisable components. Suitable polymerisable compounds are listed, for example, in Table D.

Industrial application of this effect in electro-optical display elements requires liquid-crystalline media which have to meet a multiplicity of requirements. Particularly important here are chemical resistance to moisture, air and physical influences, such as heat, radiation in the infrared, visible and ultraviolet regions, and direct and alternating electric fields.

Furthermore, liquid-crystalline media which can be used industrially are required to have a liquid-crystalline mesophase in a suitable temperature range and low viscosity.

None of the series of compounds having a liquid-crystalline mesophase that have been disclosed hitherto includes a single compound which meets all these requirements. Mixtures of two to 25, preferably three to 18, compounds are therefore generally prepared in order to obtain substances which can be used as liquid-crystalline media.

Matrix liquid-crystal displays (MLC displays) are known. Non-linear elements which can be used for individual switching of the individual pixels are, for example, active elements (i.e. transistors). The term "active matrix" is then used, where in general use is made of thin-film transistors (TFTs), which are generally arranged on a glass plate as substrate.

A distinction is made between two technologies: TFTs comprising compound semiconductors, such as, for example, CdSe, or TFTs based on polycrystalline and, inter alia, amorphous silicon. The latter technology currently has the greatest commercial importance worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The term MLC displays here covers any matrix display with integrated non-linear elements, i.e. besides the active matrix also displays with passive elements, such as varistors or diodes (MIM=metal-insulator-metal).

MLC displays of this type are particularly suitable for TV applications, monitors and notebooks or for displays with a high information density, for example in automobile manufacture or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

Compounds containing a 2,5-thiophene ring are disclosed in GB 2,229,179 A and are proposed, in particular, as constituents of smectic liquid-crystal mixtures.

Dielectrically positive thiophenecarboxylic acid esters are disclosed in DE 101 02 631 A1 and are employed in WO 01/64814 as constituents of nematic liquid-crystal mixtures for STN displays. Dielectrically negative thiophene compounds are disclosed in JP 2007-084487 (A) and are investigated in a dielectrically neutral host. Selenophenes and tellurophenes are also disclosed in DE 10 2008 036 807 A1.

Individual mesogenic compounds containing a 2,5-selenophene ring with different signs of the dielectric anisotropy are described in the as yet unpublished DE 102008036807.5 and are mentioned as constituents of liquid-crystal mixtures.

The disadvantage of the MLC displays disclosed hitherto is due to their comparatively low contrast, the relatively high viewing-angle dependence and the difficulty in producing grey shades in these displays, as well as their inadequate voltage holding ratio and their inadequate lifetime.

There thus continues to be a great demand for MLC displays having very high specific resistance at the same time as a large working-temperature range, short response times and a low threshold voltage with the aid of which various grey shades can be produced and which have, in particular, a good and stable voltage holding ratio.

The invention has the object of providing MLC displays, not only for monitor and TV applications, but also for mobile telephones and navigation systems, which are based on the ECB, IPS or FFS effect, do not have the disadvantages indicated above, or only do so to a lesser extent, and at the same time have very high specific resistance values. In particular, it must be ensured for mobile telephones and navigation systems that they also work at extremely high and extremely low temperatures.

Surprisingly, it has now been found that this object can be achieved if nematic liquid-crystal mixtures which comprise at least one compound of the formula I and at least one further, mesogenic compound are used in these display elements.

The mixtures according to the invention exhibit very broad nematic phase ranges with clearing points $\geq 85°$ C., very favourable values for the capacitive threshold, relatively high values for the holding ratio and at the same time very good low-temperature stabilities at $-30°$ C. and $-40°$ C. as well as very low rotational viscosities. The mixtures according to the invention are furthermore distinguished by a good ratio of clearing point and rotational viscosity and by a high negative dielectric anisotropy.

The invention relates to a dielectrically negative, nematic medium which comprises a) a first dielectrically negative component (component A), which consists of one or more compounds of the formula I

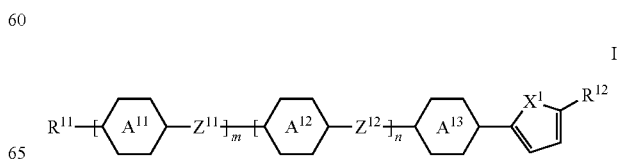

in which

R$^{11}$ and R$^{12}$ each, independently of one another, denote H, an unsubstituted alkyl or alkenyl radical having up to 15 C atoms, where, in addition, one or more CH$_2$ groups in these radicals may be replaced by —O—, —S—,

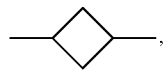

—C≡C—, —CF$_2$—O—, —O—CF$_2$—, —CO—O— or —O—CO— in such a way that O atoms are not linked directly to one another, preferably an unsubstituted alkyl, alkenyl, alkoxy, oxaalkyl or alkenyloxy radical, particularly preferably one of R$^{11}$ and R$^{12}$ denotes an alkyl or alkenyl radical and the other denotes an alkyl, alkenyl, alkoxy or alkenyloxy radical, particularly preferably R$^{12}$ denotes straight-chain alkyl or alkenyl, in particular CH$_2$=CH—, E-CH$_3$—CH=CH—, CH$_2$=CH—CH$_2$—CH$_2$—, CH$_3$—CH=CHC$_2$H$_4$—, CH$_3$—, C$_2$H$_5$—, n-C$_3$H$_7$, n-C$_4$H$_9$— or n-C$_5$H$_{11}$—, and R$^{11}$ denotes alkoxy, in particular C$_2$H$_5$—O— or n-C$_4$H$_9$—O—, one of the rings

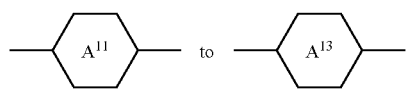

present denotes

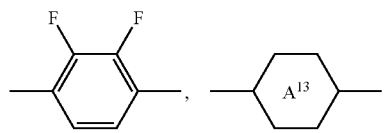

preferably denotes

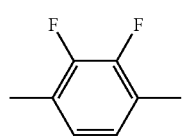

and the others, if present, in each case independently of one another, denote

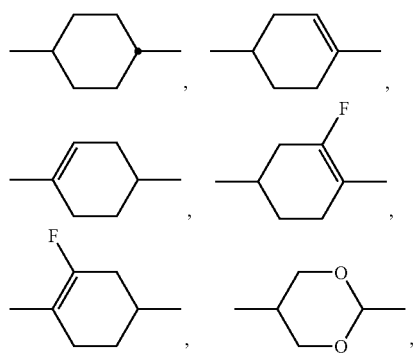

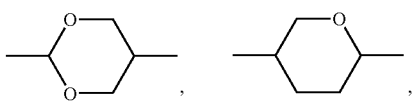

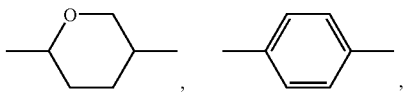

preferably

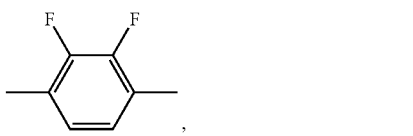

particularly preferably

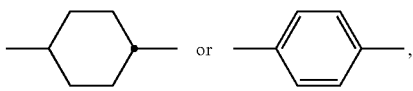

Z$^{11}$ and Z$^{12}$ each, independently of one another, denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, preferably —CH$_2$—CH$_2$—, —CH=CH—, —C≡C—, —CO—O—, —CF$_2$—O—, —O—CF$_2$— or a single bond, particularly preferably —CH=CH—, —CO—O— or a single bond and very particularly preferably one or, if present, all denote a single bond, X$^1$ denotes S, Se or Te, preferably S or Se, and m and n, independently of one another, denote 0 or 1, b) optionally, preferably obligatorily, a second dielectrically negative component (component B), which consists of one or more compounds selected from the group of the formulae II, III and IV:

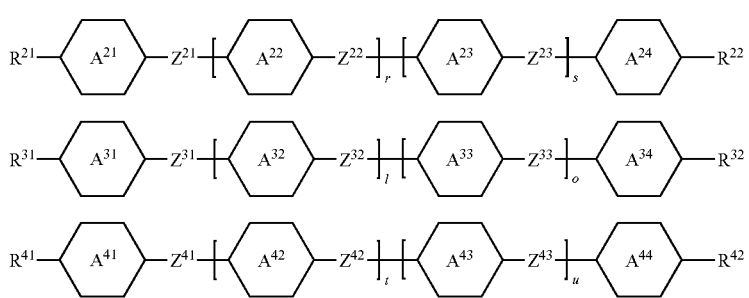

in which
R²¹ and R²² each, independently of one another, denote H, an unsubstituted alkyl or alkenyl radical having up to 15 C atoms, where, in addition, one or more CH₂ groups in these radicals may be replaced by —O—, —S—,

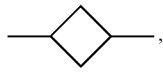

—C≡C—, —CF₂—O—, —O—CF₂—, —CO—O— or —O—CO— in such a way that O atoms are not linked directly to one another, preferably an unsubstituted alkyl, alkenyl, alkoxy or alkenyloxy radical, particularly preferably one of R²¹ and R²² denotes an alkyl or alkenyl radical and the other denotes an alkyl, alkenyl, alkoxy or alkenyloxy radical, preferably, independently of one another, alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 1 to 5 C atoms, or alkoxyalkyl, alkenyl or alkenyloxy having 2 to 7 C atoms, preferably having 2 to 4 C atoms, preferably alkenyl, where one or more H atoms in all groups may be replaced by halogen atoms, preferably F atoms, particularly preferably one of R²¹ and R²², preferably R²¹, denotes an alkyl or alkenyl radical and the other denotes an alkyl, alkenyl, alkoxy or alkenyloxy radical, particularly preferably R²¹ denotes straight-chain alkyl, in particular CH₃—, C₂H₅—, n-C₃H₇, n-C₄H₉— or n-C₅H₁₁—, or alkenyl, in particular CH₂=CH—, E-CH₃—CH=CH—, CH₂=CH—CH₂—CH₂—, E-CH₃—CH=CH—CH₂—CH₂— or E-n-C₃H₇—CH=CH—, R³¹, R³², R⁴¹ and R⁴² each, independently of one another, have one of the meanings given for R²¹ and R²² and preferably denote alkyl having 1 to 7 C atoms, preferably n-alkyl and particularly preferably n-alkyl having 1 to 5 C atoms, alkoxy having 1 to 7 C atoms, preferably n-alkoxy and particularly preferably n-alkoxy having 2 to 5 C atoms, or alkoxyalkyl, alkenyl or alkenyloxy having 2 to 7 C atoms, preferably having 2 to 4 C atoms, preferably alkenyloxy, particularly preferably one of R³¹ and R³², preferably R³¹, denotes an alkyl or alkenyl radical and the other denotes an alkyl, alkenyl, alkoxy or alkenyloxy radical, particularly preferably R³¹ denotes straight-chain alkyl, in particular CH₃—, C₂H₅—, n-C₃H₇, n-C₄H₉— or n-C₅H₁₁—, or alkenyl, in particular CH₂=CH—, E-CH₃—CH=CH—, CH₂=CH—CH₂—CH₂—, E-CH₃—CH=CH—CH₂—CH₂— or E-n-C₃H₇—CH=CH—, one of the rings

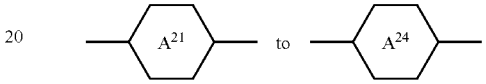

present denotes

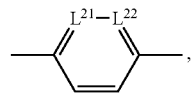

$L^{21}$ and $L^{22}$, independently of one another, denote =C($X^2$)— and one of $L^{21}$ and $L^{22}$ alternatively also denotes =N—, where preferably at least one of $L^{21}$ and $L^{22}$ denotes =C(—F)— and the other denotes =C(—F)— or =C(—Cl)—, particularly preferably $L^{21}$ and $L^{22}$ both denote =C(—F)—, $X^2$ denotes F, Cl, OCF₃, CF₃, CH₃, CH₂F, CHF₂, preferably F or Cl, particularly preferably F, and the other rings, if present, in each case independently of one another, denote

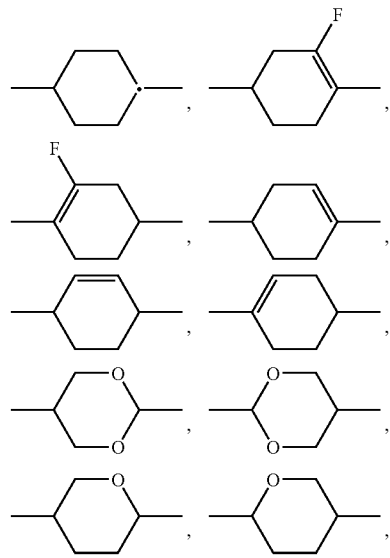

-continued

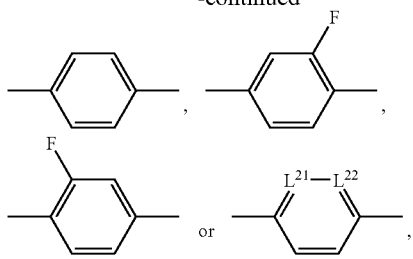

preferably

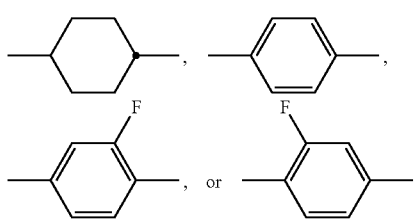

particularly preferably

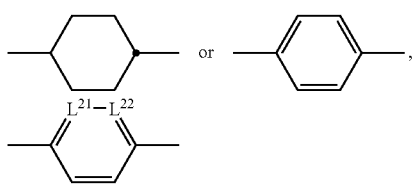

preferably denotes

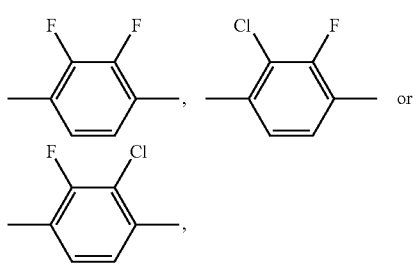

particularly preferably denotes

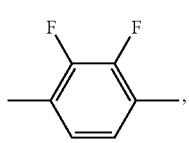

one of the rings

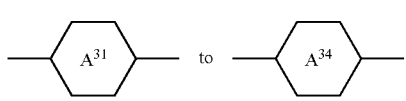

present denote

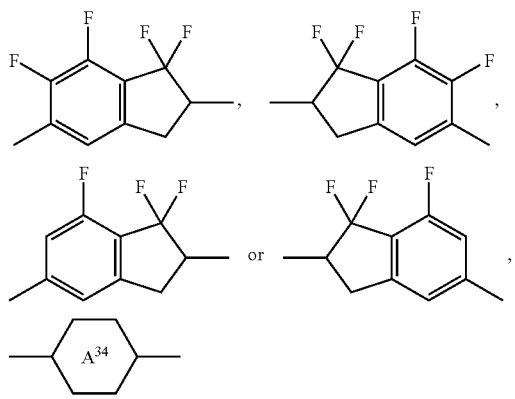

preferably denotes

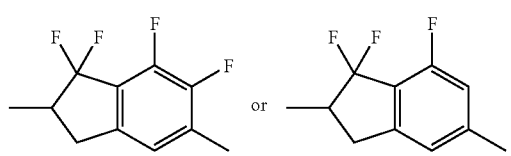

and the others, if present, in each case independently of one another, denote

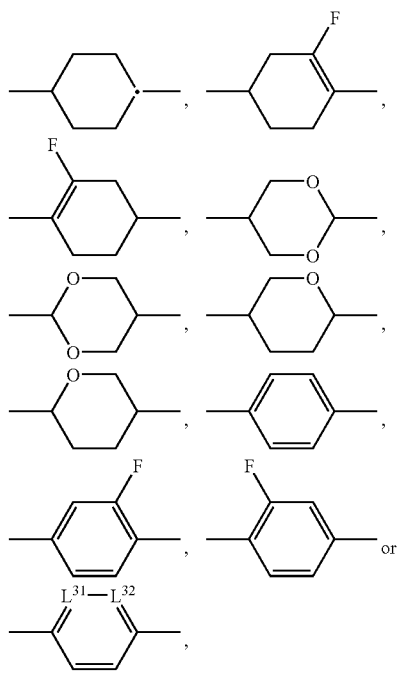

where $L^{31}$ and $L^{32}$, independently of one another, denote $=C(X^3)-$ and one of $L^{31}$ and $L^{32}$ alternatively also denotes $=N-$, where preferably at least one of $L^{31}$ and $L^{32}$ denotes $=C(-F)-$ and the other denotes $=C(-F)-$ or $=C(-Cl)-$, particularly preferably $L^{31}$ and $L^{32}$ both denote $=C(-F)-$, and $X^3$ denotes F, Cl, OCF$_3$, CF$_3$, CH$_3$, CH$_2$F, CHF$_2$, preferably F or Cl, particularly preferably F, preferably F, preferably

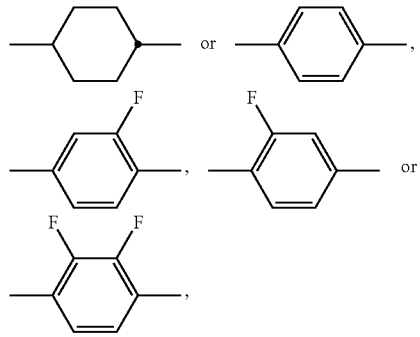

particularly preferably

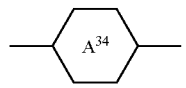

denotes

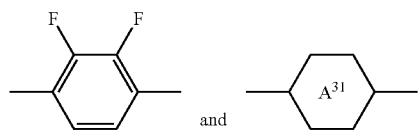

denotes

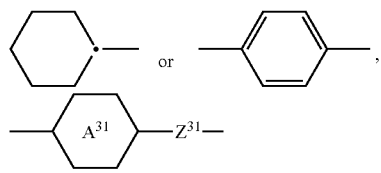

together optionally also denote a single bond, where, in the case where

denotes

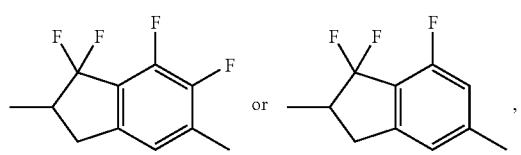

then preferably
R$^{32}$ denotes H,
one of the rings

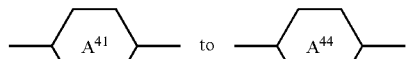

present denotes

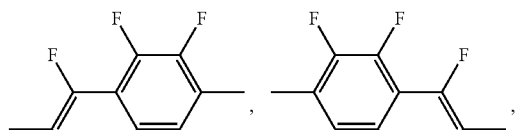

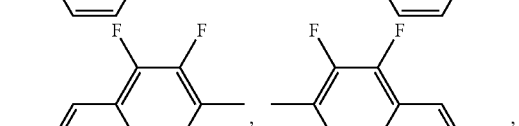

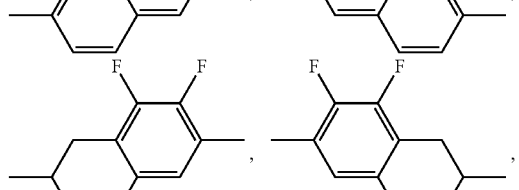

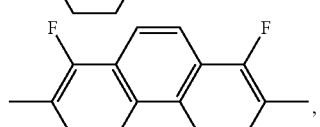

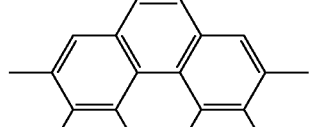

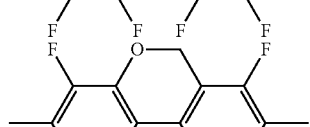

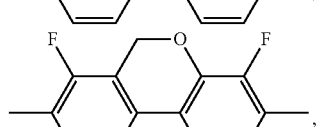

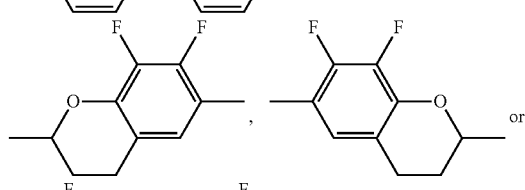

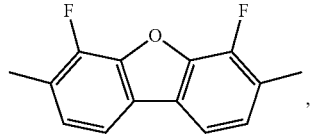

and the others, if present, in each case independently of one another, denote

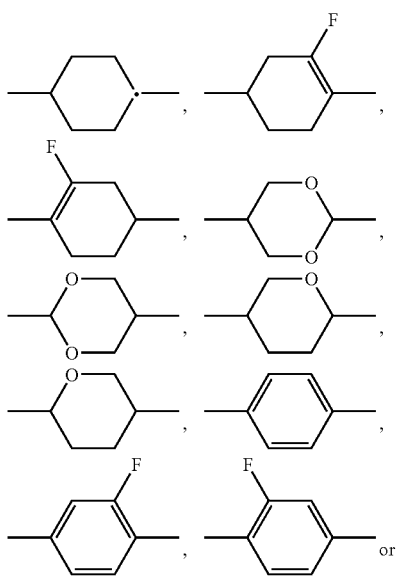

-continued

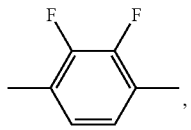

preferably

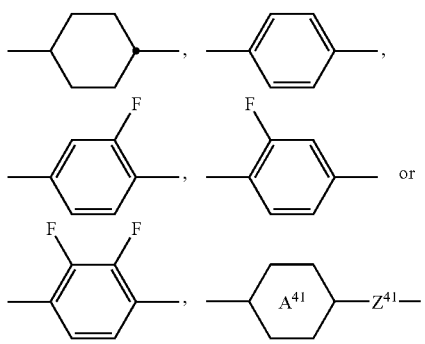

together optionally also denote a single bond,
$Z^{21}$ to $Z^{23}$,
$Z^{31}$ to $Z^{33}$ and
$Z^{41}$ to $Z^{43}$ each, independently of one another, have one of the meanings given for $Z^{11}$ to $Z^{12}$ and preferably denote —CH$_2$—CH$_2$—, —CH$_2$—O—, —CH=CH—, —C≡C—, —COO— or a single bond, preferably —CH$_2$—CH$_2$—, —CH$_2$—O— or a single bond and particularly preferably —CH$_2$—O— or a single bond,
$Z^{21}$ to $Z^{43}$ preferably each, independently of one another, denote —CH$_2$—CH$_2$—, —CH$_2$—CF$_2$—, —CF$_2$—CH$_2$—, —CF$_2$—CF$_2$—, —CH=CH—, —CF=CH—, —CH=CF—, —C≡C—, —CH$_2$—O—, —O—CH$_2$—, —CO—O—, —O—CO—, —CF$_2$—O—, —O—CF$_2$— or a single bond, preferably —CH$_2$—CH$_2$—, —CH=CH—, —C≡C—, —CF$_2$—O—, —O—CF$_2$— or a single bond, particularly preferably one or, if present, in each case a plurality of $Z^{21}$ to $Z^{23}$, or $Z^{31}$ to $Z^{33}$, or $Z^{41}$ to $Z^{43}$ denote a single bond, and very particularly preferably all denote a single bond, r and s each, independently of one another, denote 0 or 1,
(r+s) preferably denotes 0 or 1,
t and u each, independently of one another, denote 0 or 1,
(t+u) preferably denotes 0 or 1, preferably 0,
l and o each, independently of one another, denote 0 or 1, and
(l+o) preferably denotes 0 or 1,
and optionally
c) a dielectrically neutral component (component C), which consists of one or more compounds of the formula V

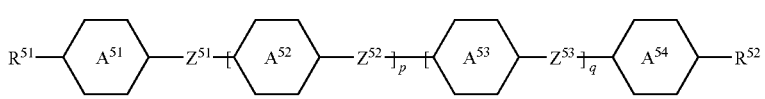

in which $R^{51}$ and $R^{52}$ each, independently of one another, have one of the meanings given for $R^{11}$ and $R^{12}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

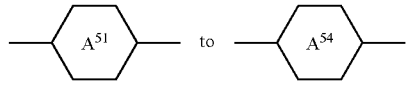

each, independently of one another, denote

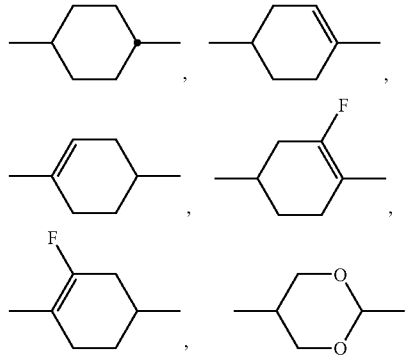

-continued

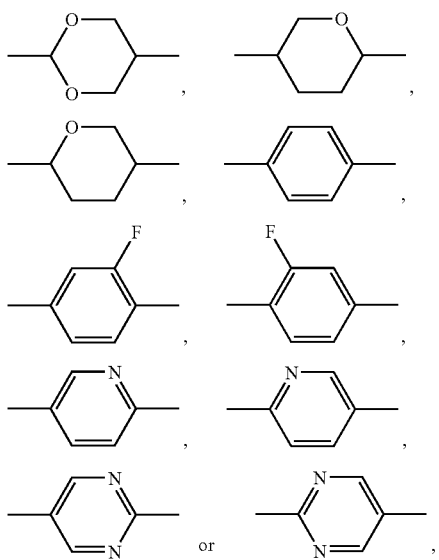

preferably

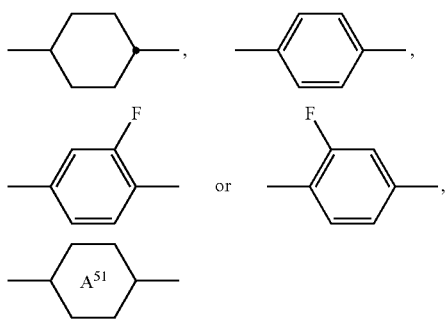

preferably denotes

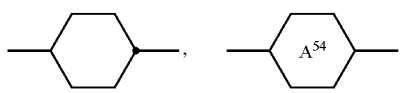

preferably denotes

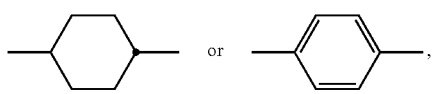

and, if present,

preferably denotes

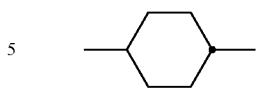

$Z^{51}$ to $Z^{53}$ each, independently of one another, have one of the meanings given for $Z^{11}$ to $Z^{12}$ and preferably denote —$CH_2$—$CH_2$—, —CH=CH—, —C≡C—, —COO— or a single bond, preferably —$CH_2$—$CH_2$— or a single bond and particularly preferably a single bond, p and q each, independently of one another, denote 0 or 1, preferably denotes 0 or 1, preferably 0, and optionally d) a chiral component (component D), which consists of one or more chiral compounds.

The media according to the invention are preferably dielectrically negative.

The medium according to the invention preferably comprises one, two, three, four or more, preferably two or three or more, compounds of the formula I.

Particular preference is given to compounds of the formula I in which a) $R^{11}$ and/or $R^{12}$ denote H, alkyl, alkenyl, alkoxy, oxaalkyl or alkenyloxy, preferably having up to 6 C atoms, $R^{11}$ very particularly preferably denotes alkoxy or alkenyloxy, and $R^{12}$ very particularly preferably denotes alkyl or oxaalkyl, or b) $R^{11}$ and $R^{12}$ both denote alkyl, where the alkyl radicals may be identical or different, or c) $R^{11}$ denotes straight-chain alkoxy and $R^{12}$ denotes straight-chain alkyl or oxaalkyl.

If $R^{11}$ and/or $R^{12}$ denote alkenyl, this is preferably $CH_2$=CH—, $CH_3$—CH=CH—, $CH_2$=CH—$C_2H_4$— or $CH_3$—CH=CH—$C_2H_4$—.

If $R^{11}$ and/or $R^{12}$ denote oxaalkyl, this is preferably $CH_3$—O—$CH_2$—, $CH_3$—O—$C_2H_4$—, $C_2H_5$—CH=CH—$CH_2$—, $C_2H_5$—CH=CH—$C_2H_4$— or $CH_3$—O—$C_3H_6$—, preferably $CH_3$—O—$CH_2$—, $CH_3$—O—$C_2H_4$— or $CH_3$—O—$C_3H_6$— and particularly preferably $CH_3$—O—$CH_2$—.

If $R^{11}$ and/or $R^{12}$ denote alkyl, this is preferably methyl, ethyl, n-propyl, n-butyl or n-pentyl, preferably methyl, ethyl, n-propyl or n-pentyl and particularly preferably ethyl or n-propyl.

If $R^{11}$ and/or $R^{12}$ denote alkoxy, this is preferably methoxy, ethoxy or n-butoxy, preferably ethoxy or n-butoxy.

The compounds of the formula I are preferably selected from the group of the compounds of the formulae I-1 to I-4, preferably from the group of the formulae I-1 and I-4, particularly preferably of the formulae I-1 and/or I-3:

I-1
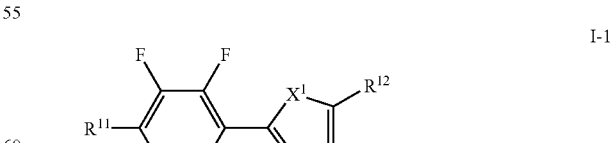

I-2
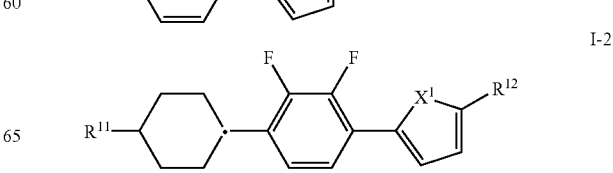

-continued

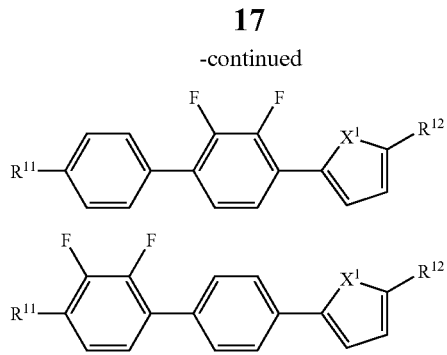

I-3

I-4 in which the parameters have the respective meanings indicated above under formula I.

The compounds of the formula I are particularly preferably selected from the group of the compounds of the formulae I-1a to I-4-a, preferably from the group of the formulae I-1a and I-3a, particularly preferably of the formulae I-1a and/or I-3a:

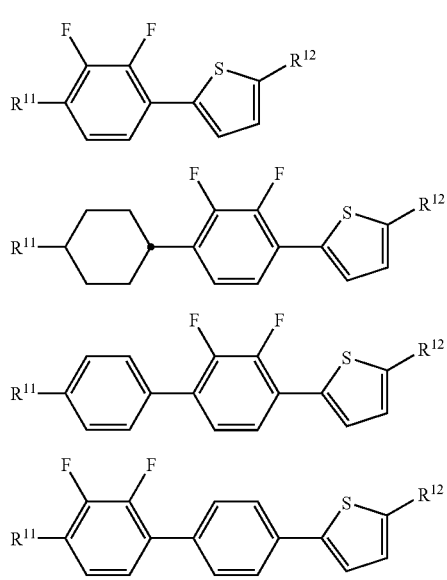

I-1a

I-2a

I-3a

I-4a in which the parameters have the respective meanings indicated above under formula I.

In a further preferred embodiment, the compounds of the formula I are preferably compounds selected from the group of the compounds of the formulae I-1b to I-4b, preferably from the group of the formulae I-1b to I-3b, particularly preferably of the formulae I-1b and/or I-3b:

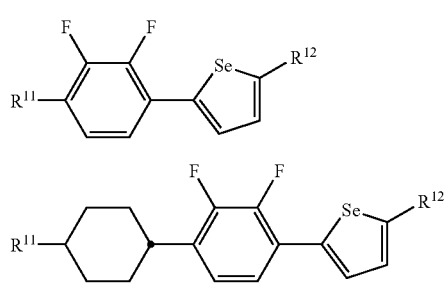

I-1b

I-2b

-continued

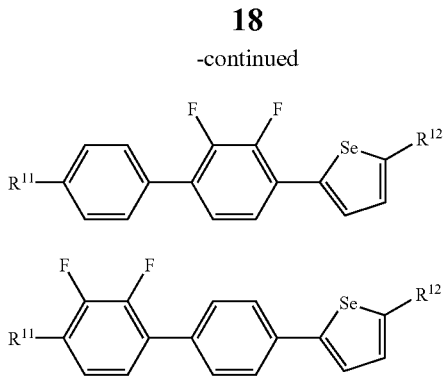

I-3b

I-4b in which the parameters have the respective meanings indicated above under formula I.

In a preferred embodiment, the medium comprises one or more compounds of the formula II, selected from the group of the compounds of the formulae IIA to IID, preferably IIA to IIC and very particularly preferably IIA and IIB:

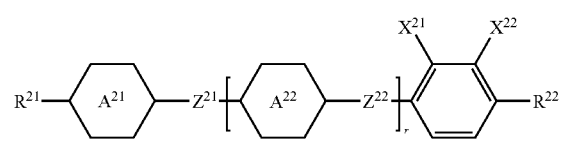

IIA

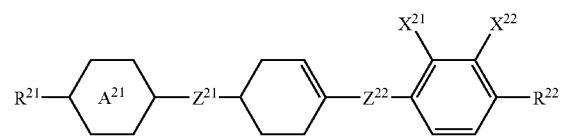

IIB

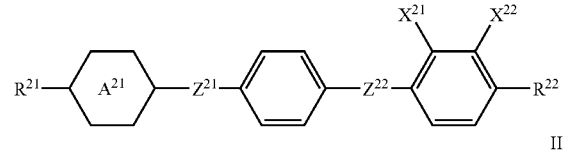

IIC

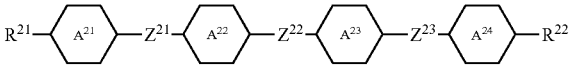

IID in which the parameters have the respective meanings indicated above, but in formula IIA, in the case where r=1,

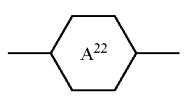

does not denote

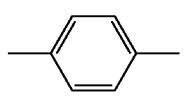

and does not denote

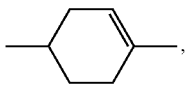

and preferably

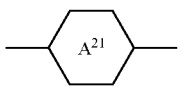 and 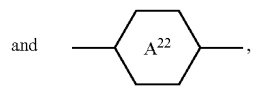

independently of one another, denote

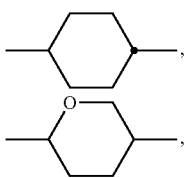 or and particularly preferably

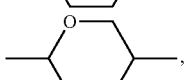

denotes

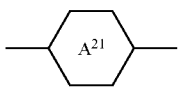, $R^{21}$ denotes alkyl,
$R^{22}$ denotes alkyl or alkoxy, particularly preferably $(O)C_vH_{2v+1}$,
$X^{21}$ and $X^{22}$ both denote F,
$Z^{21}$ and $Z^{22}$, independently of one another, denote a single bond, —CH$_2$—CH$_2$—, —CH=CH—, —CH$_2$O—, —OCH$_2$—, —O—, —CH$_2$—, —CF$_2$O— or —OCF$_2$—, preferably a single bond or —CH$_2$CH$_2$—, particularly preferably a single bond, and
v denotes 1 to 6.

In a preferred embodiment, the medium comprises one or more compounds of the formula II, selected from the group of the corm pounds of the formulae II-1 to II-16:

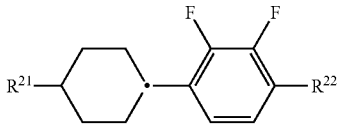
II-1

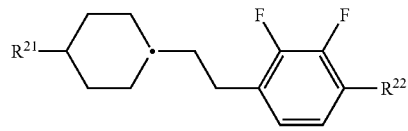
II-2

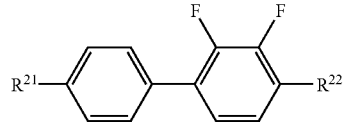
II-3

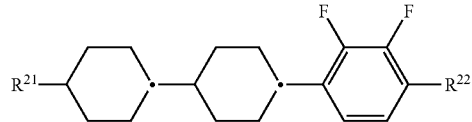
II-4

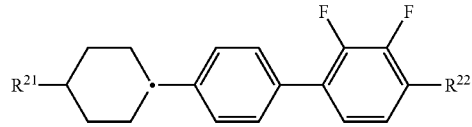
II-5

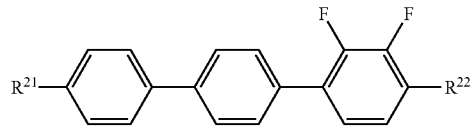
II-6

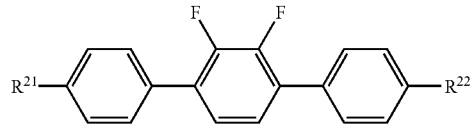
II-7

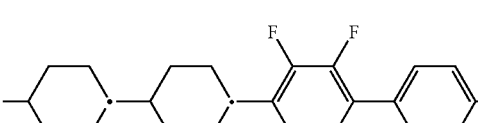
II-8

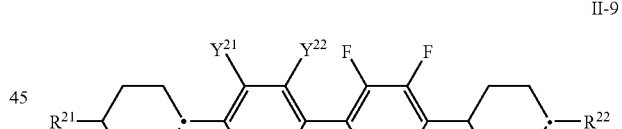
II-9

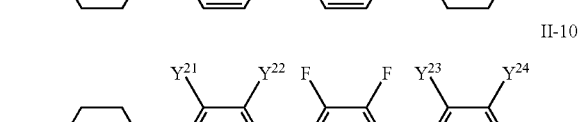
II-10

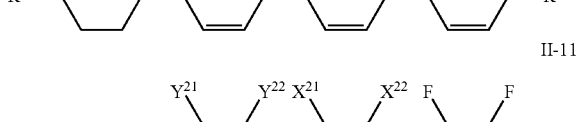
II-11

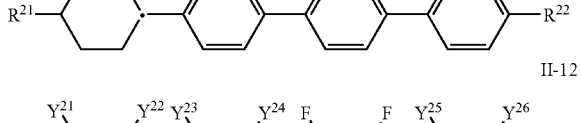
II-12

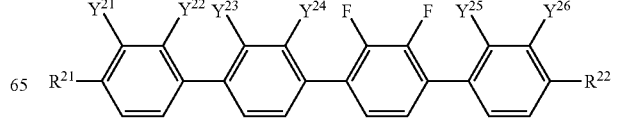

-continued

II-13

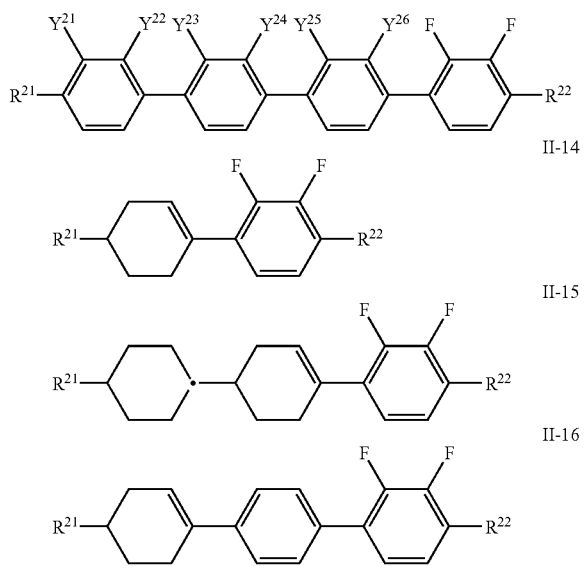

II-14

II-15

II-16 in which $Y^{21}$ to $Y^{26}$, independently of one another, denote H or F, and $X^{21}$ and $X^{22}$ both denote H or one of $X^{21}$ and $X^{22}$ denotes H and the other denotes F, but preferably at most four, particularly preferably at most three and very particularly preferably one or two of $Y^{21}$ to $Y^{26}$, $X^{21}$ and $X^{22}$ denote F, and the other parameters have the respective meanings indicated above for formula II and preferably $R^{21}$ denotes alkyl or alkenyl and $R^{22}$ denotes alkyl, alkenyl, alkoxy or alkenyloxy, preferably $(O)C_vH_{2v+1}$, and v denotes an integer from 1 to 6.

In a further preferred embodiment, the medium comprises one or more compounds of the formula II-1, selected from the group of the compounds of the formulae II-1a to II-1d, preferably of the formulae II-1b and/or II-1d, particularly preferably of the formula II-1b:

II-1a

II-1b

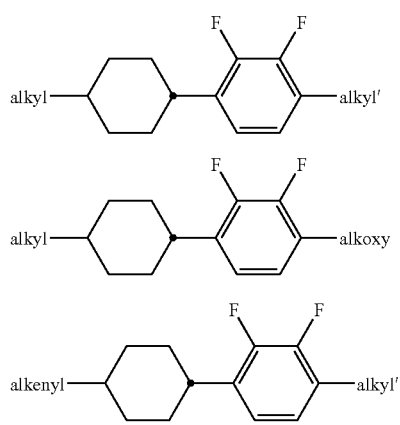

II-1c

-continued

II-1d

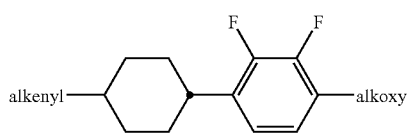

in which alkyl and alkyl', independently of one another, denote alkyl having 1 to 7 C atoms, preferably having 2 to 5 C atoms, alkoxy denotes alkoxy having 1 to 7 C atoms, preferably having 2 to 4 C atoms, and alkenyl denotes alkenyl having 2 to 7 C atoms, preferably having 2 to 5 C atoms.

Preferred compounds of the formulae II-1c and II-1d are the compounds of the following formulae:

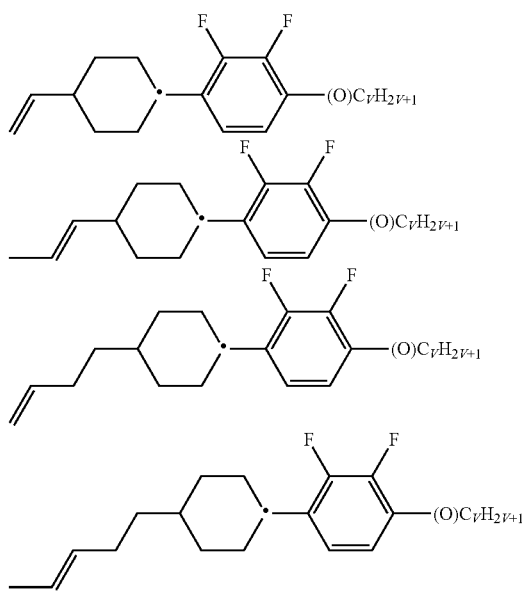

in which v has the meaning indicated above.

Further preferred compounds of the formula II-1 are the compounds of the following formulae:

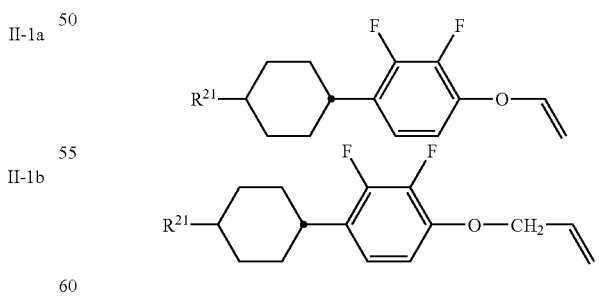

in which $R^{21}$ has the meaning indicated above for formula II.

In a preferred embodiment, the medium comprises one or more compounds of the formula II-3, selected from the group of the compounds of the formulae II-3a to II-3d, preferably of the formulae II-3b and/or II-3d, particularly preferably of the formula II-3b:

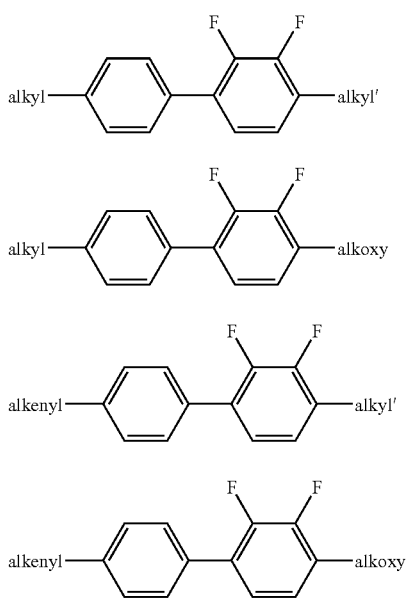

in which
alkyl and alkyl', independently of one another, denote alkyl having 1 to 7 C atoms, preferably having 2 to 5 C atoms,
alkoxy denotes alkoxy having 1 to 7 C atoms, preferably having 2 to 4 C atoms, and
alkenyl denotes alkenyl having 2 to 7 C atoms, preferably having 2 to 5 C atoms.

The concentration of these biphenyl compounds in the mixture as a whole is preferably 3% or more, in particular 5% or more and very particularly preferably from 5 to 25%.

In a further preferred embodiment, the medium comprises one or more compounds of the formula II-4, selected from the group of the compounds of the formulae II-4a to II-4d, preferably of the formulae II-4a and/or II-4b, particularly preferably of the formula II-4b:

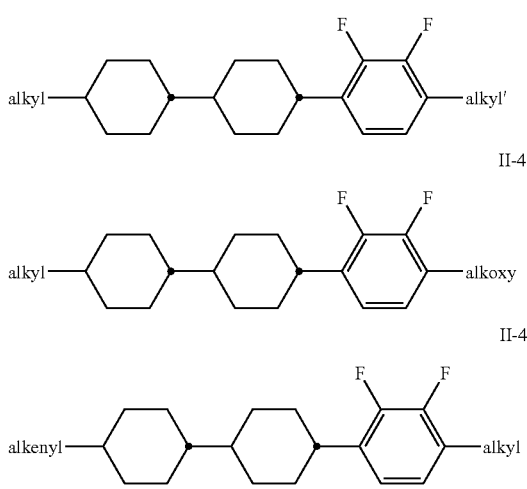

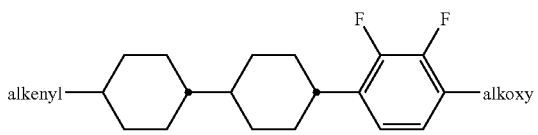

in which
alkyl and alkyl', independently of one another, denote alkyl having 1 to 7 C atoms, preferably having 2 to 5 C atoms,
alkoxy denotes alkoxy having 1 to 7 C atoms, preferably having 2 to 4 C atoms, and
alkenyl denotes alkenyl having 2 to 7 C atoms, preferably having 2 to 5 C atoms.

Preferred compounds of the formulae II-4c and II-4d are the compounds of the following formulae:

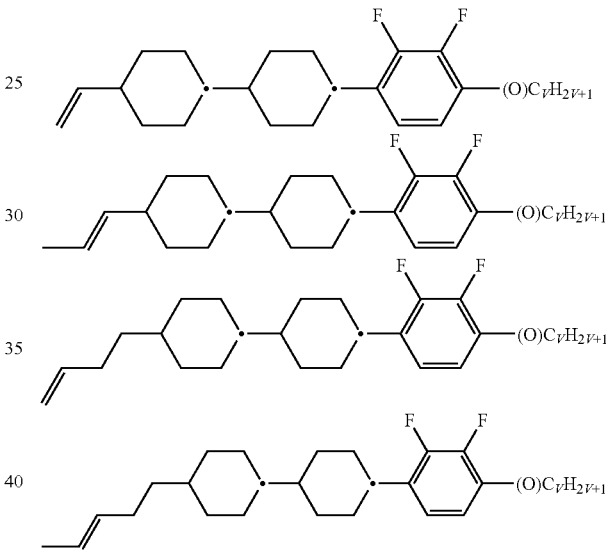

in which v has the meaning indicated above.

In a further preferred embodiment, the medium comprises one or more compounds of the formula II-4 of the following sub-formula II-4e:

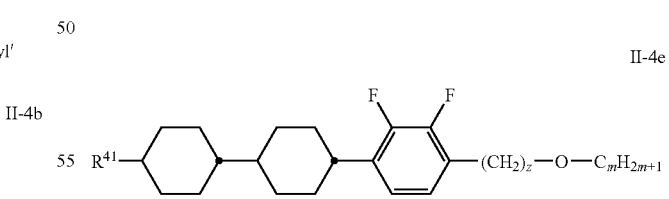

in which
$R^{21}$ has the meaning indicated above and
m and z each independently denote an integer from 1 to 6, and m+z preferably denotes an integer from 1 to 6.

In a further preferred embodiment, the medium comprises one or more compounds of the formula II-5, selected from the group of the compounds of the formulae II-5a to II-5d, preferably of the formulae II-5b and/or II-5d:

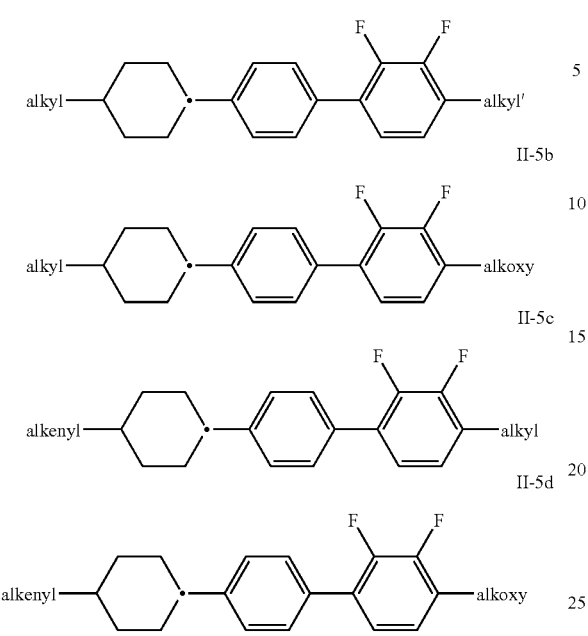

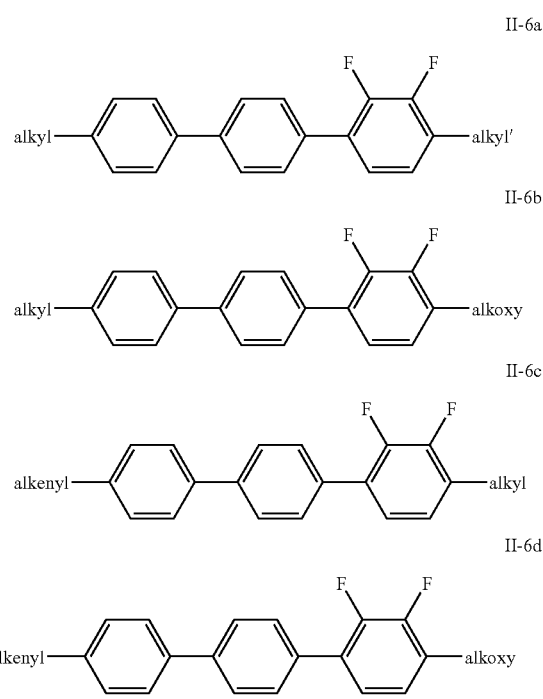

in which
alkyl and alkyl', independently of one another, denote alkyl having 1 to 7 C atoms, preferably having 2 to 5 C atoms,
alkoxy denotes alkoxy having 1 to 7 C atoms, preferably having 2 to 4 C atoms, and
alkenyl denotes alkenyl having 2 to 7 C atoms, preferably having 2 to 5 C atoms.

Preferred compounds of the formulae II-5c and II-5d are the compounds of the following formulae:

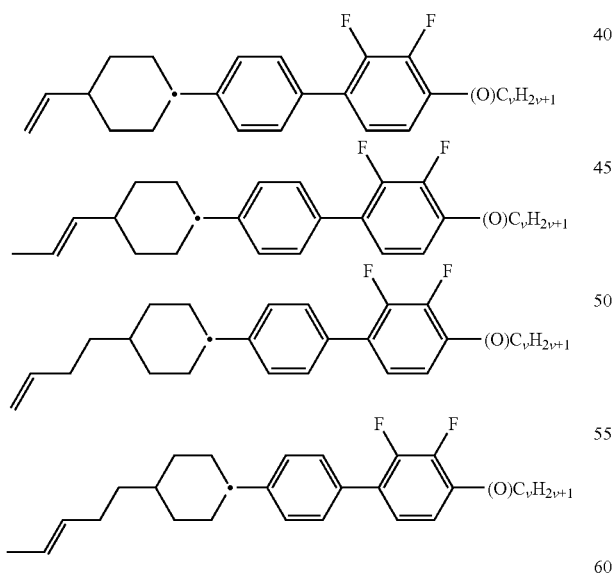

in which v has the meaning indicated above.

In a further preferred embodiment, the medium comprises one or more compounds of the formula II-6, selected from the group of the compounds of the formulae II-6a to II-6d, preferably of the formulae II-6a and/or II-6c, particularly preferably of the formula II-6a:

in which
alkyl and alkyl', independently of one another, denote alkyl having 1 to 7 C atoms, preferably having 2 to 5 C atoms,
alkoxy denotes alkoxy having 1 to 7 C atoms, preferably having 2 to 4 C atoms, and
alkenyl denotes alkenyl having 2 to 7 C atoms, preferably having 2 to 5 C atoms, and/or the group of the compounds of the formulae II-6e to II-6m:

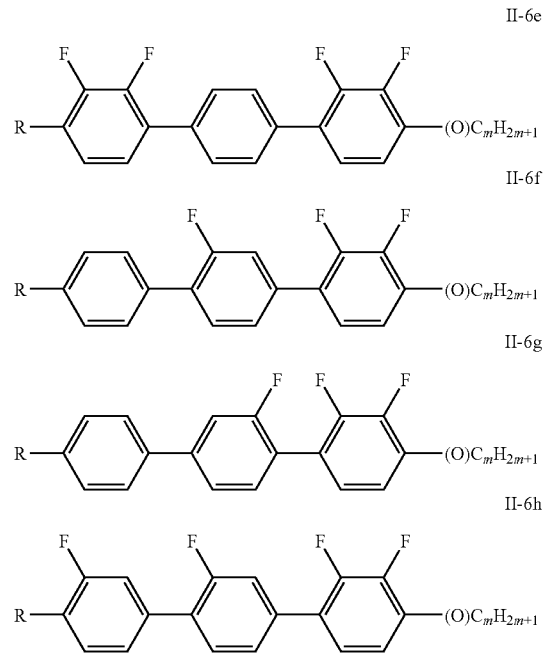

-continued

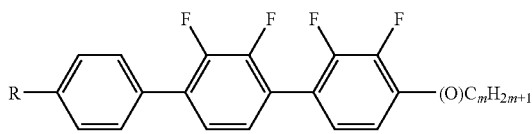
II-6i

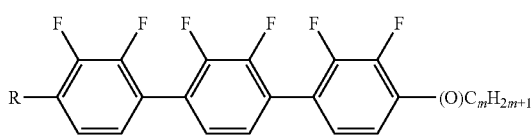
II-6j

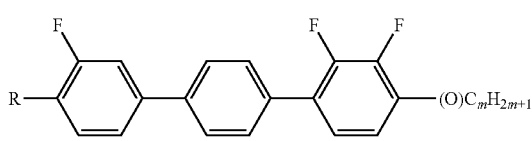
II-6k

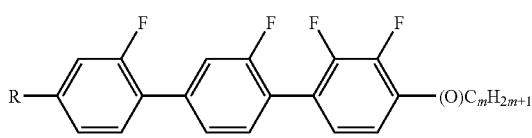
II-6l

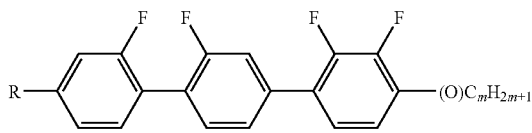
II-6m in which
R has the meaning indicated above for $R^{21}$, and
m denotes an integer from 1 to 6.

R preferably denotes straight-chain alkyl or alkoxy, each having 1 to 6 C atoms, or alkoxyalkyl, alkenyl or alkenyloxy having 2-6 C atoms, particularly preferably alkyl having 1-5 C atoms, preferably methyl, ethyl, propyl, butyl, or furthermore alkoxy having 1-5 C atoms, preferably methoxy, ethoxy, propoxy or butoxy.

In a further preferred embodiment, the medium comprises one or more compounds of the formula II-7, selected from the group of the compounds of the formulae II-7a to II-7d, preferably of the formulae II-7a and/or II-7c, particularly preferably of the formula II-7a:

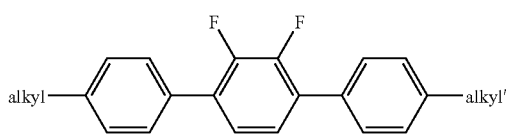
II-7a

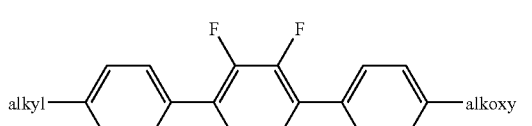
II-7b

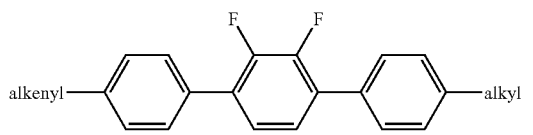
II-7c

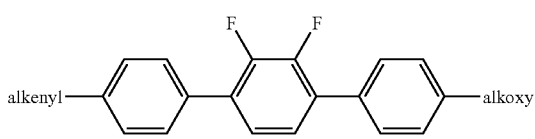
II-7d in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms, and
alkenyl denotes alkenyl having 2 to 7 C atoms, preferably having 2 to 5 C atoms,
and/or the group of the compounds of the formulae II-7e to II-7i:

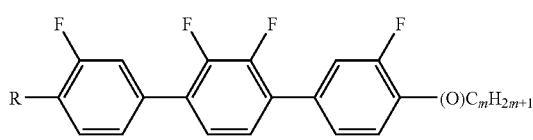
II-7e

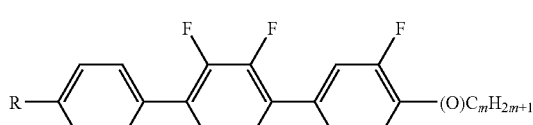
II-7f

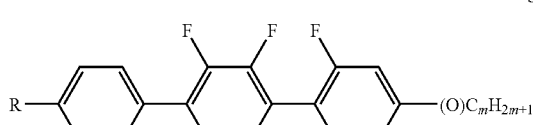
II-7g

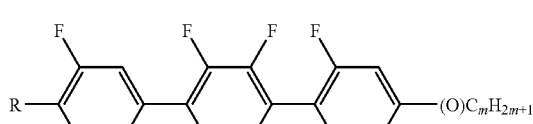
II-7h

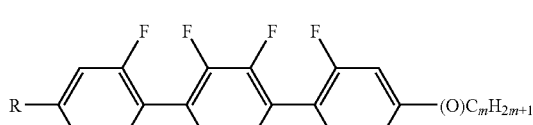
II-7i in which
R has the meaning indicated above for $R^{21}$, and
m denotes an integer from 1 to 6.

R preferably denotes straight-chain alkyl or alkoxy, each having 1 to 6 C atoms, or alkylalkoxy, alkenyl or alkenyloxy having 2-6 C atoms, particularly preferably alkyl having 1-5 C atoms, preferably methyl, ethyl, propyl, butyl, or furthermore alkoxy having 1-5 C atoms, preferably methoxy, ethoxy, propoxy or butoxy.

In a further preferred embodiment, the medium comprises one or more compounds of the formula II-8, selected from the group of the compounds of the formulae II-8a and II-8b, particularly preferably II-8b:

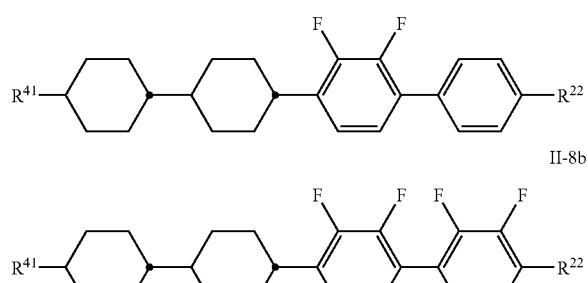

II-8a

II-8b in which the parameters have the respective meanings indicated above.

In a further preferred embodiment, the medium comprises one or more compounds of the formula II-9, selected from the group of the compounds of the formulae II-9a to II-9d:

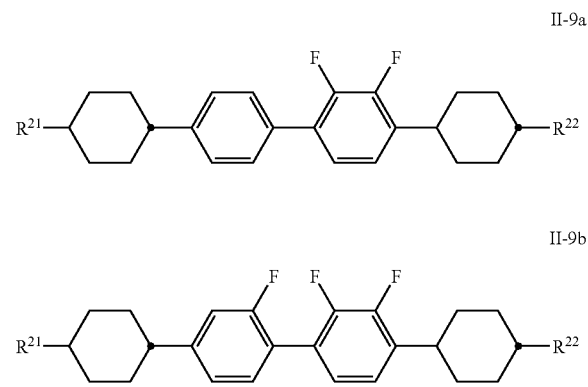

II-9a

II-9b

II-9c

II-9d in which the parameters have the respective meanings indicated above and preferably $R^{22}$ denotes $C_vH_{2v+1}$ and v denotes an integer from 1 to 6.

In a further preferred embodiment, the medium comprises one or more compounds of the formula II-10, selected from the group of the compounds of the formulae II-10a to II-10e:

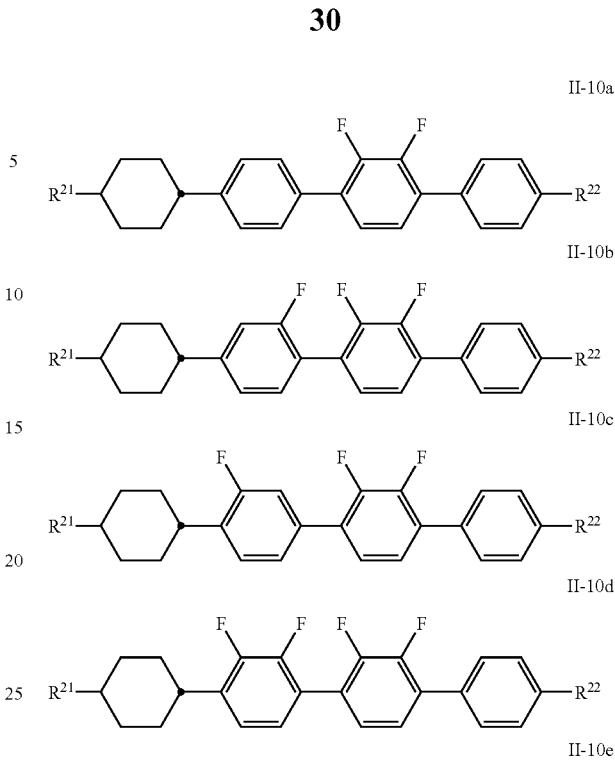

II-10a

II-10b

II-10c

II-10d

II-10e in which the parameters have the respective meanings indicated above and preferably $R^{22}$ denotes $C_vH_{2v+1}$ and v denotes an integer from 1 to 6.

In a further preferred embodiment, the medium comprises one or more compounds of the formula II-11, selected from the group of the compounds of the formulae II-11a and II-11b, particularly preferably II-11b:

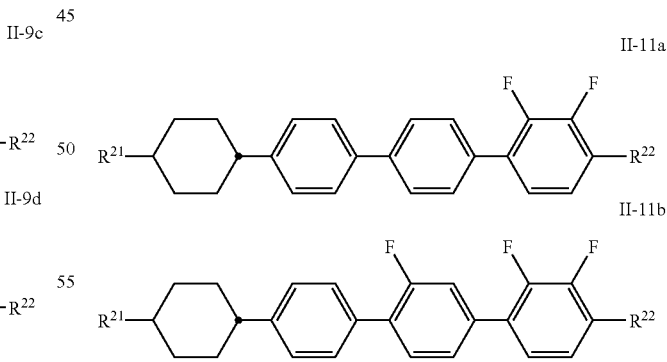

II-11a

II-11b in which the parameters have the respective meanings indicated above.

In a further preferred embodiment, the medium comprises one or more compounds of the formula II-14, selected from the group of the compounds of the formulae II-14a to II-14d, preferably of the formulae II-14a and/or II-14b, particularly preferably of the formula II-14b:

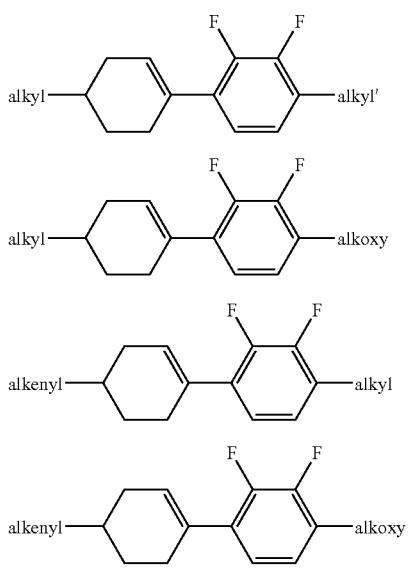

II-14a

II-14b

II-14c

II-14d in which
alkyl and alkyl', independently of one another, denote alkyl having 1 to 7 C atoms, preferably having 2 to 5 C atoms,
alkoxy denotes alkoxy having 1 to 7 C atoms, preferably having 2 to 4 C atoms, and
alkenyl denotes alkenyl having 2 to 7 C atoms, preferably having 2 to 5 C atoms.

In a further preferred embodiment, the medium comprises one or more compounds of the formula II-15, selected from the group of the compounds of the formulae II-15a to II-15d, preferably of the formulae II-15a and/or II-15b, particularly preferably of the formula II-15b:

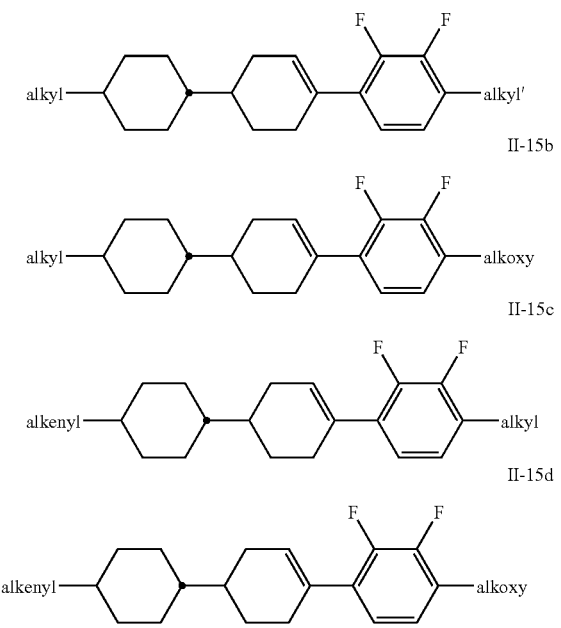

II-15a

II-15b

II-15c

II-15d in which
alkyl and alkyl', independently of one another, denote alkyl having 1 to 7 C atoms, preferably having 2 to 5 C atoms,
alkoxy denotes alkoxy having 1 to 7 C atoms, preferably having 2 to 4 C atoms, and
alkenyl denotes alkenyl having 2 to 7 C atoms, preferably having 2 to 5 C atoms.

The medium preferably comprises one or more compounds of the formula III, selected from the group of the compounds of the formulae III-1 and III-2, preferably of the formula III-2:

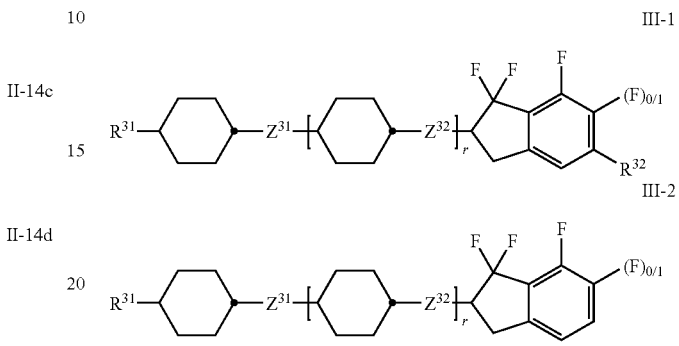

III-1

III-2 in which the parameters have the respective meanings indicated above for formula III and preferably
$R^{31}$ denotes alkyl or alkenyl,
$R^{32}$ denotes alkyl, alkenyl, alkoxy or alkenyloxy,
$Z^{31}$ denotes a single bond and
r denotes 0.

Very particular preference is given to the compounds of the formula III-2a

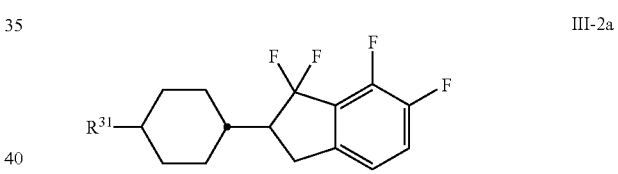

III-2a in which $R^{31}$ has the meaning indicated above and preferably denotes alkyl having 1 to 7, preferably having 1 to 5, C atoms, preferably n-alkyl.

In a further preferred embodiment, the medium (additionally) comprises one or more compounds of the formula IV, preferably selected from the group of the compounds of the formulae IV-1 to IV-8, preferably of the formulae IV-7 and/or IV-8:

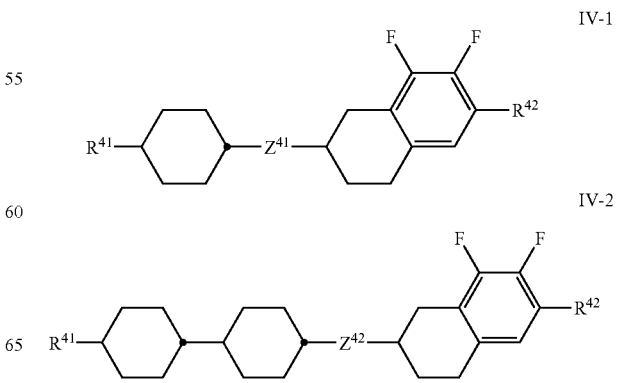

IV-1

IV-2

-continued

IV-3
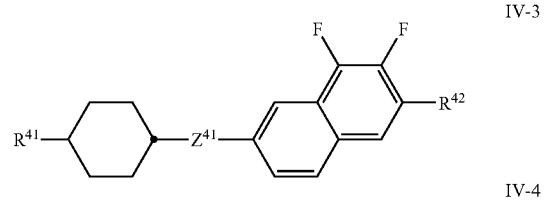

IV-4
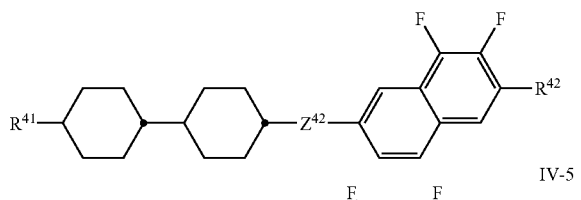

IV-5
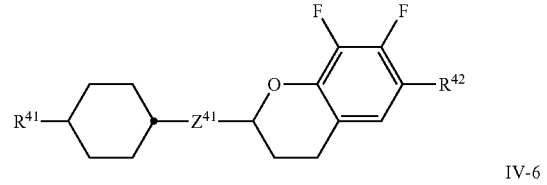

IV-6
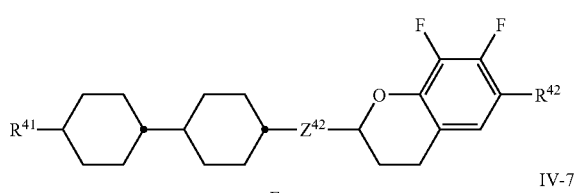

IV-7
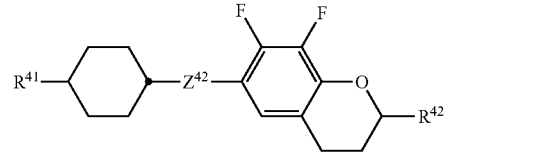

IV-8
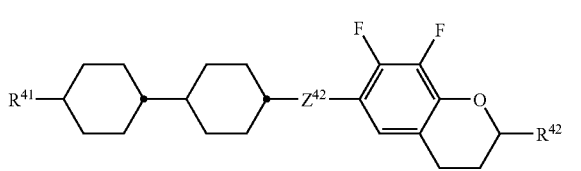

in which the parameters have the respective meanings indicated above for formula IV and preferably
$R^{41}$ denotes alkyl or alkenyl and
$R^{42}$ denotes alkyl, alkenyl, alkoxy or alkenyloxy.

In this embodiment, preferably if the medium comprises one or more compounds of the formulae IV-7 and/or IV-8, the medium can essentially consist of compounds of the formulae I, II, IV and V.

In a further preferred embodiment, the medium (additionally) comprises one or more compounds which contain a fluorinated phenanthrene unit, preferably compounds of the formula IV, preferably selected from the group of the compounds of the formulae IV-9 and IV-10:

IV-9
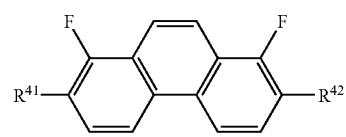

IV-10
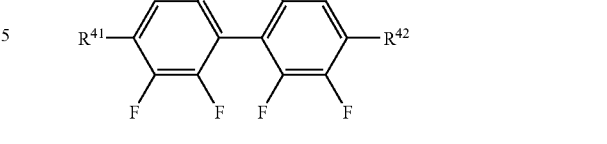

in which the parameters have the respective meanings indicated above for formula IV and preferably
$R^{41}$ denotes alkyl or alkenyl and
$R^{42}$ denotes alkyl, alkenyl, alkoxy or alkenyloxy.

In a further preferred embodiment, the medium (additionally) comprises one or more compounds which contain a fluorinated dibenzofuran unit, preferably compounds of the formula IV, preferably of the formula IV-11, IV-11
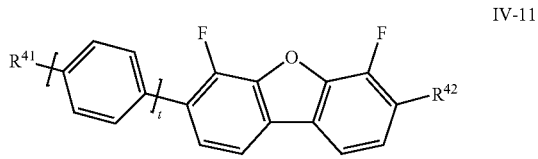

in which the parameters have the respective meanings indicated above for formula IV and preferably
$R^{41}$ denotes alkyl or alkenyl and
$R^{42}$ denotes alkyl, alkenyl, alkoxy or alkenyloxy.

In a further preferred embodiment, the medium (additionally) comprises one or more compounds of the formula IV selected from the group of the compounds of the formulae IV-12 to IV-15, preferably from the group of the formulae IV-12 and IV-14, particularly preferably of the formula IV-12:

IV-12
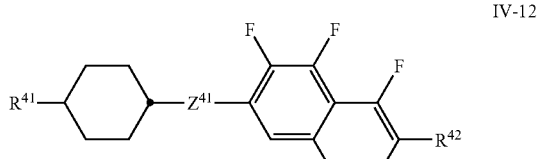

IV-13
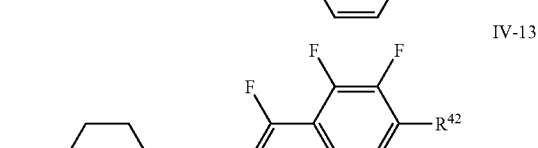

IV-14
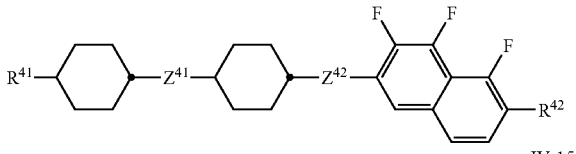

IV-15
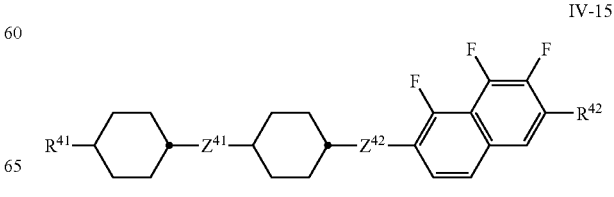

in which the parameters have the respective meanings indicated above under formula IV and preferably in formulae IV-12 and IV-13

$Z^{41}$ denotes —CH$_2$—CH$_2$—, —CH$_2$—O— or a single bond, preferably —CH$_2$—O— or a single bond, particularly preferably —CH$_2$—O—, in formulae IV-14 and IV-15

$Z^{41}$ denotes —CH$_2$—CH$_2$— or a single bond, preferably a single bond, and $Z^{42}$ denotes —CH$_2$—CH$_2$—, —CH$_2$—O— or a single bond, preferably —CH$_2$—O— or a single bond, particularly preferably —CH$_2$—O—.

Very particular preference is given to the compounds of the formulae IV-12 and IV-14 and in particular the compounds of the following formulae IV-12a, IV-12b, IV-14a and IV-14b:

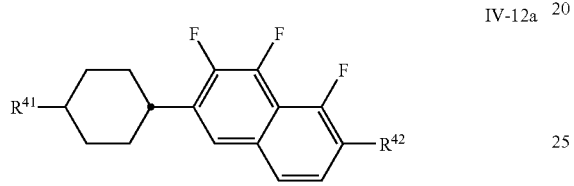

IV-12a

IV-12b

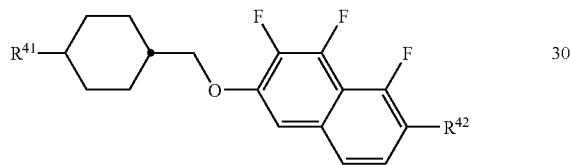

IV-14a

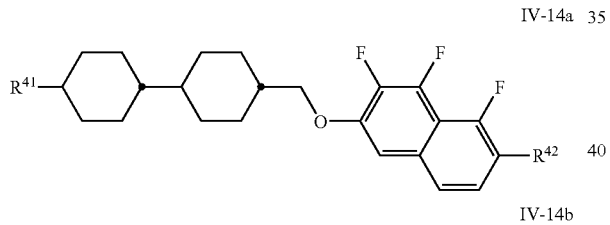

IV-14b

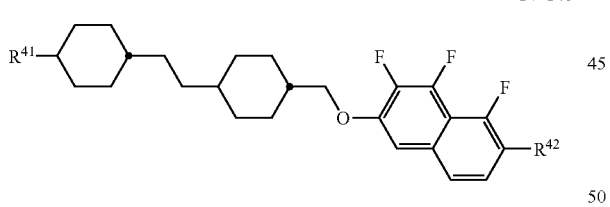

in which the parameters have the respective meanings indicated above under formula IV, and $R^{41}$ preferably denotes alkyl having 1 to 7, preferably having 1 to 5, C atoms, preferably n-alkyl, and $R^{42}$ preferably denotes alkoxy having 1 to 5, preferably having 2 to 4, C atoms.

In a further preferred embodiment, the medium comprises one or more compounds of the formula V in which at least two of the rings

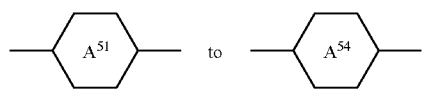

each, independently of one another, denote

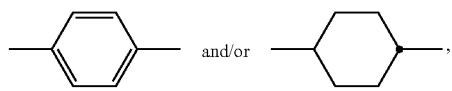

where two adjacent rings are very particularly preferably linked directly, and preferably denote

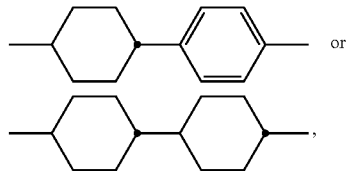

where one or more H atoms in the phenylene ring may be replaced, independently of one another, by F or CN, preferably by F, and one or two non-adjacent CH$_2$ groups of the cyclohexylene ring or one of the two cyclohexylene rings may be replaced by O atoms.

In a further preferred embodiment, the medium comprises one or more compounds of the formula V from the group of the compounds of the formulae V-1 to V-14, preferably selected from the group of the compounds of the formulae V-1 to V-12, preferably from the group V-1 to V-7, V-11 and V-12 and particularly preferably from the group V-1 and V-4:

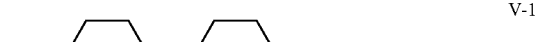

V-1

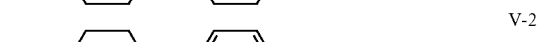

V-2

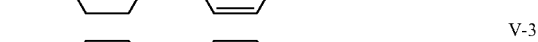

V-3

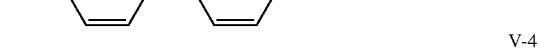

V-4

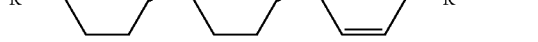

V-5

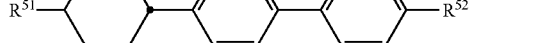

V-6

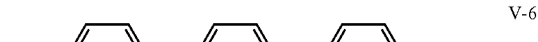

V-7

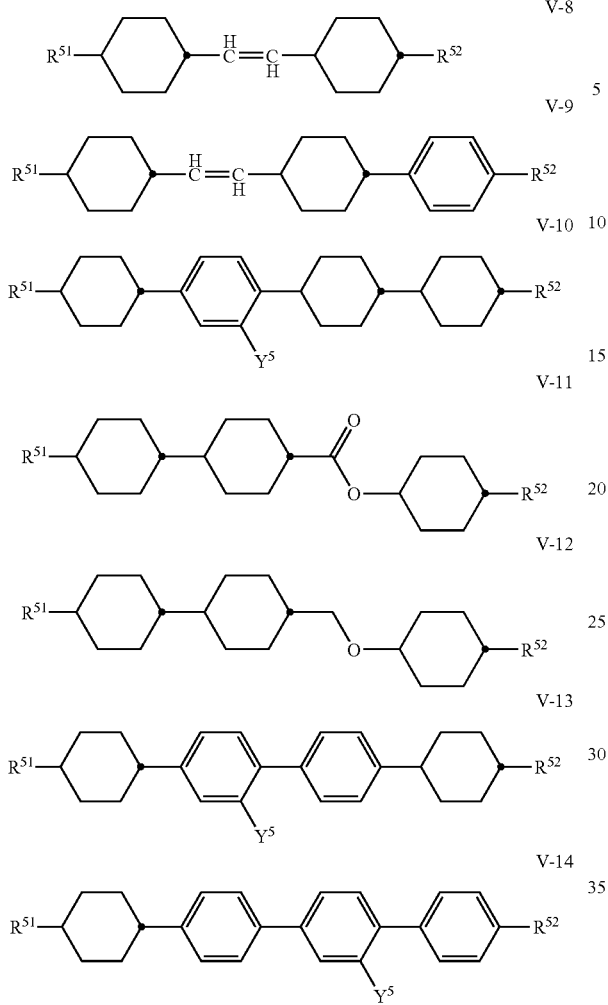

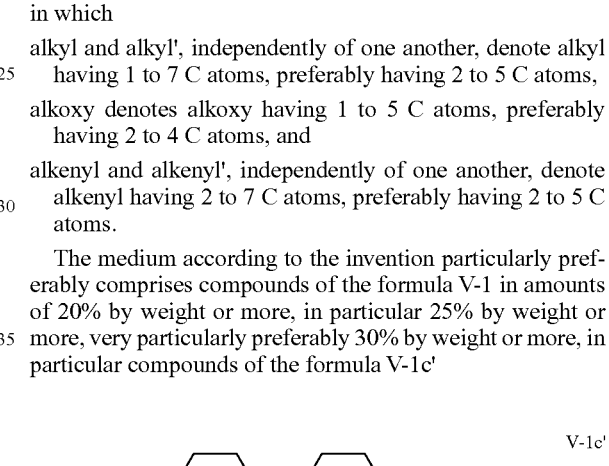

in which the parameters have the respective meanings indicated above for formula V and $Y^5$ denotes H or F and preferably $R^{51}$ denotes alkyl or alkenyl and $R^{52}$ denotes alkyl, alkenyl or alkoxy, preferably alkyl or alkenyl, particularly preferably alkenyl.

The medium particularly preferably comprises one or more compound(s) of the formula V-1, selected from the group
of the formula V-1c, particularly preferably
of the formula V-1 in which $R^{51}$ denotes vinyl or 1-propenyl and $R^{52}$ denotes alkyl, preferably n-alkyl, particularly preferably $R^{51}$ denotes vinyl and $R^{52}$ denotes propyl, and
of the formula V-1d, particularly preferably
of the formula V-1 in which $R^{51}$ and $R^{52}$, independently of one another, denote vinyl or 1-propenyl, preferably $R^{51}$ denotes vinyl and particularly preferably $R^{51}$ and $R^{52}$ denote vinyl.

In a further preferred embodiment, the medium comprises one or more compounds of the formula V-1, selected from the group of the compounds of the formulae V-1a to V-1e, preferably of the formulae V-1a and/or V-1c and/or V-1d, particularly preferably of the formulae V-1c and/or V-1d and very particularly preferably of the formulae V-1c and V-1d:

in which alkyl and alkyl', independently of one another, denote alkyl having 1 to 7 C atoms, preferably having 2 to 5 C atoms, alkoxy denotes alkoxy having 1 to 5 C atoms, preferably having 2 to 4 C atoms, and alkenyl and alkenyl', independently of one another, denote alkenyl having 2 to 7 C atoms, preferably having 2 to 5 C atoms.

The medium according to the invention particularly preferably comprises compounds of the formula V-1 in amounts of 20% by weight or more, in particular 25% by weight or more, very particularly preferably 30% by weight or more, in particular compounds of the formula V-1c' in which n denotes 3, 4 or 5, and $R^e$ denotes H, $CH_3$ or $C_2H_5$.

In a further preferred embodiment, the medium comprises one or more compounds of the formula V-1, selected from the group of the compounds of the formulae V-1a and V-1 b, preferably of the formulae V-1a and/or V-1 b, particularly preferably of the formula V-1a. In this embodiment, the medium preferably comprises no compounds of the formula V, preferably of the formula V-1, containing an alkenyl end group or a plurality of alkenyl end groups, i.e. preferably no compounds of the formulae V-1c to V-1e. In this embodiment, the medium particularly preferably comprises one or more compounds selected from the group of the compounds of the formulae CC-2-3, CC-2-5, CC-3-4 and CC-3-5, where the acronyms (abbreviations) are explained in Tables A to C and illustrated by examples in Table D.

In a further preferred embodiment, the medium comprises one or more compounds of the formula V-2, selected from the group of the compounds of the formulae V-2a to V-2d, preferably of the formulae V-2a and/or V-2b, particularly preferably of the formula V-2b:

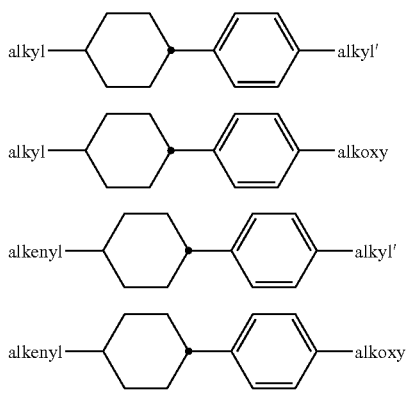

in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms, and
alkenyl denotes alkenyl having 2 to 7 C atoms, preferably having 2 to 5 C atoms.

In a further preferred embodiment, the medium comprises one or more compounds of the formula V-3, selected from the group of the compounds of the formulae V-3a to V-3c:

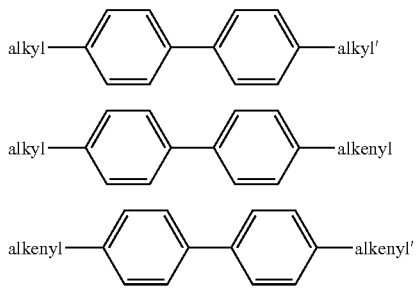

in which
alkyl and alkyl', independently of one another, denote alkyl having 1 to 7 C atoms, preferably having 2 to 5 C atoms, and
alkenyl denotes alkenyl having 2 to 7 C atoms, preferably having 2 to 5 C atoms.

The proportion of these biphenyls in the mixture as a whole is preferably 3% by weight or more, in particular 5% by weight or more.

Preferred compounds of the formulae V-3a and V-3b are the compounds of the following formulae:

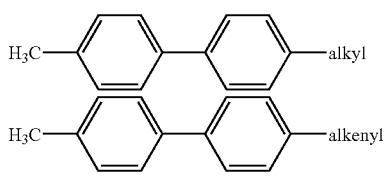

in which the parameters have the respective meanings indicated above.

Particularly preferred compounds of the formula V-3b are the compounds of the following formulae:

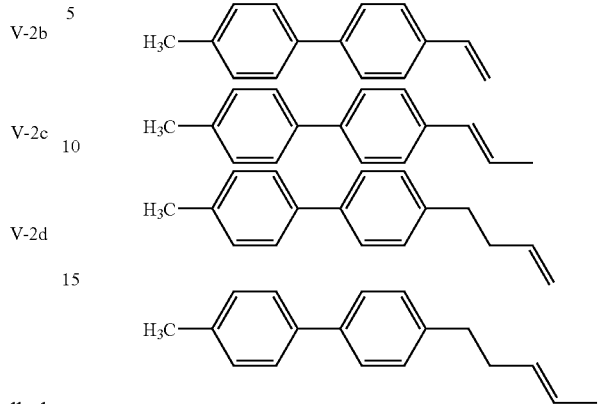

and of these in particular those of the final formula.

In a preferred embodiment, the medium comprises one or more compounds of the formula V-4, particularly preferably one or more compound(s) in which $R^{51}$ denotes vinyl or 1-propenyl and $R^{52}$ denotes alkyl, preferably n-alkyl, particularly preferably $R^{51}$ denotes vinyl and $R^{52}$ denotes methyl.

In a further preferred embodiment, the medium comprises one or more compounds of the formula V-4, selected from the group of the compounds of the formulae V-4a to V-4d, preferably of the formulae V-4a and/or V-4b, particularly preferably of the formula V-4b:

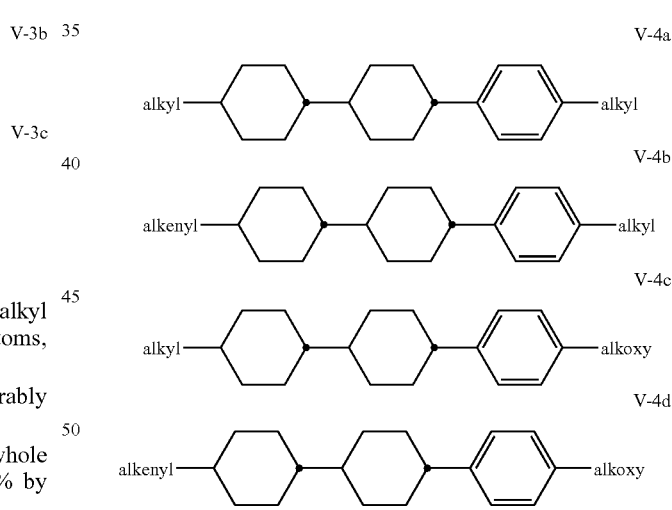

in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms, and
alkenyl denotes alkenyl having 2 to 7 C atoms, preferably having 2 to 5 C atoms.

In a preferred embodiment, the medium comprises one or more compounds of the formula V-5, particularly preferably one or more compound(s) in which $R^{51}$ denotes alkyl, vinyl or 1-propenyl and $R^{52}$ denotes alkyl, preferably n-alkyl.

In a further preferred embodiment, the medium comprises one or more compounds of the formula V-5, selected from the group of the compounds of the formulae V-5a to V-5d, preferably of the formulae V-5a and/or V-5b, particularly preferably of the formula V-5a:

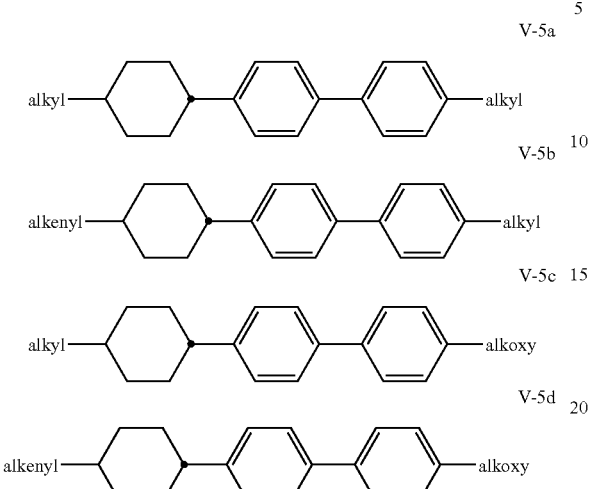

in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms, and
alkenyl denotes alkenyl having 2 to 7 C atoms, preferably having 2 to 5 C atoms,
and/or of the formulae V-5e to V-5h, preferably of the formulae V-5e and/or V-5f, particularly preferably of the formula V-5e:

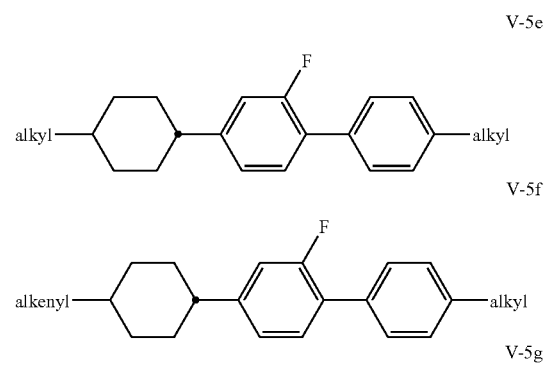

in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms, and
alkenyl denotes alkenyl having 2 to 7 C atoms, preferably having 2 to 5 C atoms.

In a further preferred embodiment, the medium comprises one or more compounds of the formula V-6, selected from the group of the compounds of the formulae V-6a to V-6c, preferably of the formulae V-6a and/or V-6b, particularly preferably of the formula V-6a:

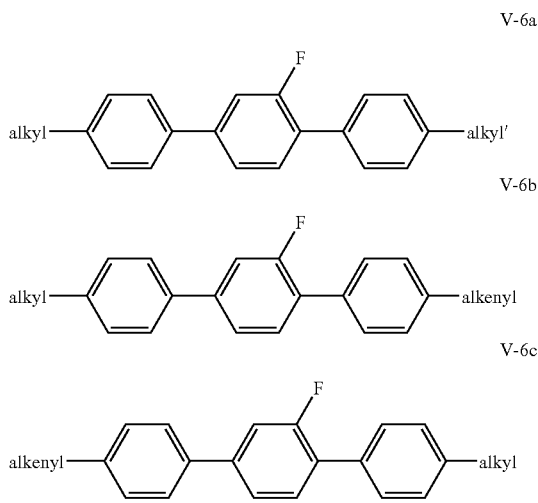

in which
alkyl and alkyl', independently of one another, denote alkyl having 1 to 7 C atoms, preferably having 2 to 5 C atoms,
alkoxy denotes alkoxy having 1 to 5 C atoms, preferably having 2 to 4 C atoms, and
alkenyl denotes alkenyl having 2 to 7 C atoms, preferably having 2 to 5 C atoms.

The media according to the invention particularly preferably comprise one or more compounds selected from the compounds of the formula V-6a, preferably selected from the group of the compounds PGP-2-3, PGP-3-3 and PGP-3-4, and of the formula V-6b, preferably selected from the group of the formulae PGP-1-2V, PGP-2-2V and PGP-3-2V, where the acronyms (abbreviations) are explained in Tables A to C and illustrated by examples in Table D.

In a further preferred embodiment, the medium comprises one or more compounds of the formula V-13, selected from the group of the compounds of the formulae V-13a and V-13b:

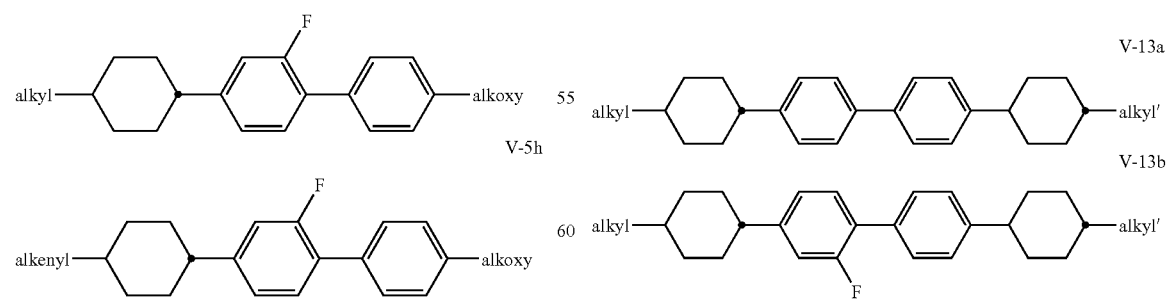

in which
alkyl and alkyl', independently of one another, denote alkyl having 1 to 7 C atoms, preferably having 2 to 5 C atoms.

In a further preferred embodiment, the medium comprises one or more compounds of the formula V-14, selected from the group of the compounds of the formula V-14a V-14a

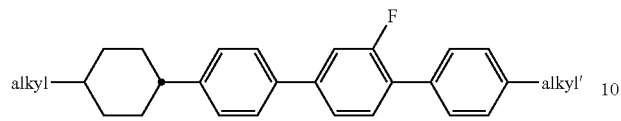

in which
alkyl and alkyl', independently of one another, denote alkyl having 1 to 7 C atoms, preferably having 2 to 5 C atoms.

The chiral compound or the chiral compounds which can be used in component D of the liquid-crystal media in accordance with the present invention is or are selected from the known chiral dopants. Component D preferably consists predominantly, particularly preferably essentially and very particularly preferably virtually completely of one or more compounds selected from the group of the compounds of the following formulae VI to VIII:

VI

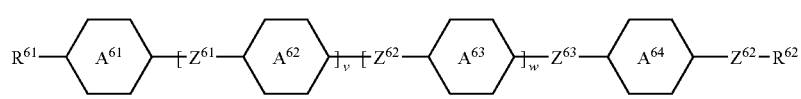

VII

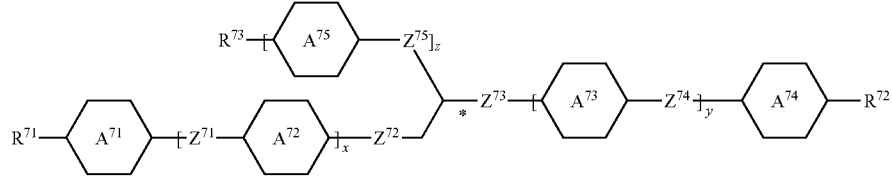

VIII

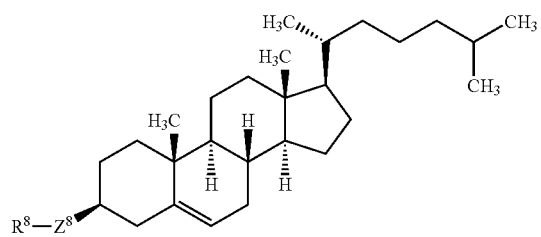

in which
$R^{61}$ and $R^{62}$, $R^{71}$ to $R^{73}$ and $R^8$ each, independently of one another, have the meaning indicated above for $R^{51}$ under formula V, and alternatively denote H, CN, F, Cl, $CF_3$, $OCF_3$, $CF_2H$ or $OCF_2H$, and at least one of $R^{61}$ and $R^{62}$ denotes a chiral group, $Z^{61}$ to $Z^{63}$, $Z^{71}$ to $Z^{75}$ and $Z^8$ each, independently of one another, denote $-CH_2CH_2-$, $-CH=CH-$, $-COO-$, $-O-CO-$ or a single bond, preferably $Z^{61}$, $Z^{62}$, $Z^{71}$, $Z^{74}$ and $Z^{75}$ denote a single bond, $Z^{63}$, $Z^{72}$ and $Z^{73}$ denote $-COO-$ or a single bond, $Z^{72}$ preferably denotes $-COO-$, and $Z^{73}$ and $Z^8$ denote $-O-CO-$,

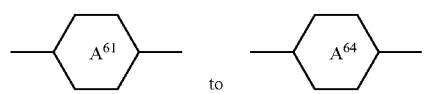

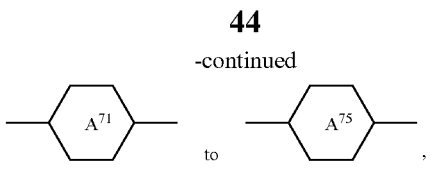

each, independently of one another, denote

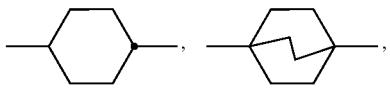

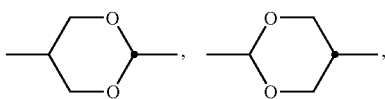

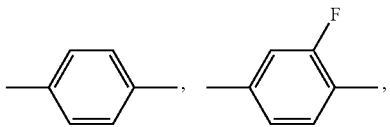

-continued

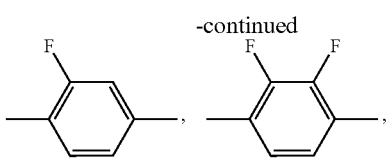

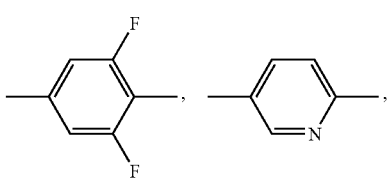

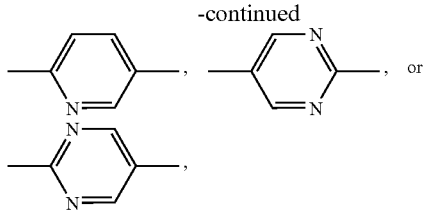

v and w, and x, y and z each, independently of one another, denote 0 or 1, preferably v and w both denote 0 and x and y both denote 1.

Particularly preferred embodiments of the present invention satisfy one or more of the following conditions.

i. The liquid-crystalline medium has a birefringence of 0.095 or more.
ii. The liquid-crystalline medium comprises one or more compounds selected from the group of the sub-formulae I-1 to I-4.
iii. The concentrations of the individual homologous compounds of the formula I in the medium are in the range from 1 to 25%, preferably from 2 to 20% and particularly preferably from 5 to 15%.
iv. The proportion of compounds of the formula II in the medium is 10% by weight or more.
v. The concentrations of the individual homologous compounds of the formula II are in the range from 2 to 16%, preferably from 3 to 12% and particularly preferably from 4 to 10%.
vi. The liquid-crystalline medium comprises one or more particularly preferred compounds selected from the group of the compounds of the formulae II-1, II-2, II-3 and/or II-14, preferably of the formulae CY-n-Om, CY-V-On, CY-nV-Om, CEY-n-Om, CEY-V-On, CEY-nV-Om, PY-n-Om, PY-V-On, PY-nV-Om, LY-n-Om, LY-V-On and/or LY-nV-Om, where the concentration of the individual homologous compounds is preferably in the range from 2% or more to 15% or less and the total concentration of the compounds in the medium is 60% or less.
vii. The liquid-crystalline medium comprises one or more particularly preferred compounds selected from the group of the compounds of the formulae II-4, II-5, II-15 and/or II-16, preferably of the formulae CCY-n-m, CCY-V-n, CCY-n-m, CCY-n-Om, CCY-V-On, CCY-nV-Om, CPY-n-m, CPY-V-n, CPY-nV-m, CPY-n-Om, CPY-V-On, CPY-nV-Om, CLY-n-m, CLY-V-n, LY-nV-m, CLY-n-Om, CLY-V-On, CLY-nV-Om, where the concentration of the individual homologous compounds is preferably in the range from 2% or more to 20% or less and the total concentration of the compounds in the medium is 50% or less.
viii. The liquid-crystalline medium comprises one or more particularly preferred compounds selected from the group of the compounds of the formulae II-6 and/or II-17, preferably of the formulae PPY-n-m, PPY-V-n, PPY-nV-m, PYP-n-m, PYP-V-n and/or PYP-nV-m, where the concentration of the individual homologous compounds in the case of PYP-n-m, PYP-V-n and PYP-nV-m is preferably in the range from 2% or more to 20% or less and in the case of PPY-n-m, PPY-V-n and PPY-nV-m is preferably in the range from 2% or more to 10% or less and the total concentration of the compounds in the medium is 30% or less.
ix. The medium comprises one or more compounds of the formula III, preferably of the formulae III-1 and/or III-2, particularly preferably of the formula III-2a, where the concentration of the individual homologous compounds in the medium is preferably 2% or more to 15% or less and the total concentration is 30% or less.
x. The medium comprises one or more compounds of the formula IV.
xi. The medium comprises one or more compounds of the formula V, preferably in a total concentration of 10% or more to 80% or less.
xii. The medium comprises one or more particularly preferred compounds selected from the group of the compounds of the formulae V-1 and V-4, particularly preferably of the formulae V-1c' and/or V-4b.
xiii. The medium comprises one or more particularly preferred compounds selected from the group of the compounds of the formulae V-2, preferably V-2a and/or V-2b, V-3, preferably V-3b, V-4, preferably V-4a, V-5, preferably V-5a, V-12 and V-13 and/or V-7.
xiv. The liquid-crystalline medium comprises one or more particularly preferred compounds of the formulae V-1c and V-1d, selected from the sub-formulae mentioned below:

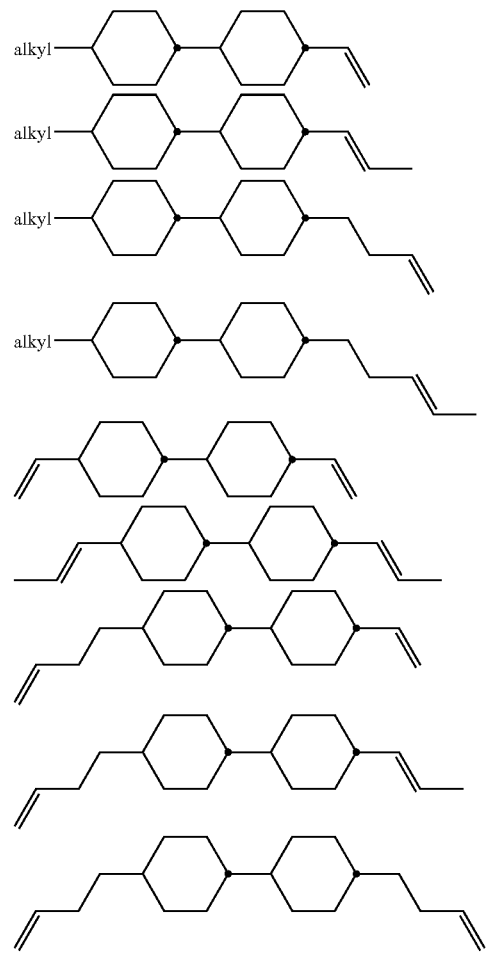

in which alkyl has the meaning indicated above and preferably denotes, in each case independently of one another, alkyl having 1 to 6, preferably having 2 to 5, C atoms and particularly preferably n-alkyl.

xv. The liquid-crystalline medium comprises one or more compounds of the formula V selected from the group of the following formulae:

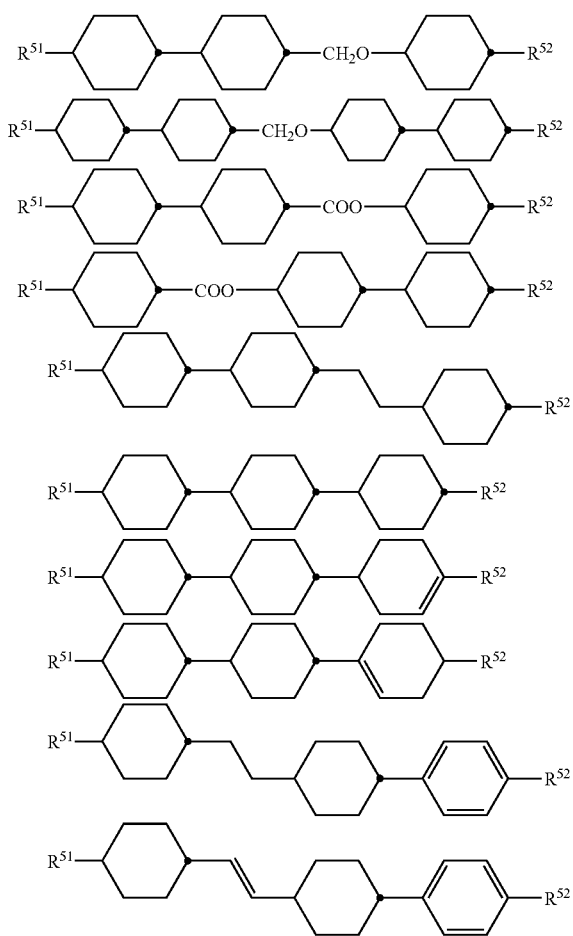

in which $R^{51}$ and $R^{52}$ each have the meanings indicated above, and $R^{51}$ and $R^{52}$ each, independently of one another, preferably denote a straight-chain alkyl, alkoxy or alkenyl radical having 1 or 2 to 7 C atoms respectively, particularly preferably straight-chain alkyl, furthermore alkenyl.

The proportion of these compounds in the mixture is preferably 5 to 40% by weight.

xvi. The liquid-crystalline medium comprises one or more compounds of the formula V, selected from the group of the compounds of the following formulae: CC-n-V and/or CC-n-Vm, CPP-n-m, CGP-n-m and CCOC-n-m, in which the meanings of the acronyms (abbreviations) are explained in Tables A to C and illustrated by examples in Table D, preferably in a total concentration of up to 10% or more to 70% or less.

xvii. The liquid-crystalline medium essentially consists of
2% by weight to 80% by weight of one or more compounds of the formula I,
2% by weight to 80% by weight of one or more compounds of the formula II,
2% by weight to 80% by weight of one or more compounds selected from the group of the compounds of the formulae III and/or IV, and/or
2% by weight to 80% by weight of one or more compounds of the formula V.

xviii. The liquid-crystalline medium comprises one or more compounds of the formula I containing two or three six-membered or five-membered rings in amounts of 1% to 15%, in particular 2% to 12% and very particularly preferably 3% to 8%, per individual compound.

xix. The liquid-crystalline medium comprises one or more compounds of the formula II, preferably in amounts of 2% or more, in particular 5% or more and very particularly preferably 5% or more to 30% or less, in particular in the range from 2% or more to 12% or less, per homologous individual compound.

xx. The liquid-crystalline medium comprises one or more compounds of the formulae II-4 and/or II-5, preferably of the formulae II-4b and/or II-4d and/or II-5b and/or II-5d, particularly preferably II-4b and/or II-5b, preferably in a total concentration of 60% or less and in a concentration of 2% or more, in particular 5% or more and very particularly preferably 5% or more to 20% or less, per homologous individual compound.

xxi. The liquid-crystalline medium comprises one or more compounds of the formulae II-6 and/or II-7, preferably of the formulae II-6a and/or II-7a, preferably in a total concentration of 50% or less and preferably in a concentration of 2% or more to 10% or less, per homologous individual compound of the formula II-6 and in a concentration of 2% or more to 20% or less per homologous individual compound of the formula II-7.

xxii. The liquid-crystalline medium comprises one or more compounds of the formula II, preferably in amounts of 2% or more, in particular 5% or more and very particularly preferably 5% to 25%, in particular in the range from 2% to 12%, per individual compound.

xxiii. The liquid-crystalline medium comprises one or more compounds of the formula V, preferably in amounts of 3% or more, in particular 5% or more and very particularly preferably 5% to 25%, in particular in the range from 2% to 20%, per individual compound.

The invention furthermore relates to an electro-optical display having active-matrix addressing based on the ECB effect, characterised in that it contains, as dielectric, a liquid-crystalline medium in accordance with the present invention.

The liquid-crystal mixture preferably has a nematic phase range of at least 60 degrees, preferably at least 70 degrees and very particularly preferably at least 90 degrees, and a flow viscosity $v_{20}$ of at most 30 mm$^2$·s$^{-1}$ at 20° C.

The liquid-crystal medium according to the invention preferably has a Δε of −0.5 or less to −8.0 or more, in particular −2.5 or less to −6.0 or more, where Δε denotes the dielectric anisotropy.

The rotational viscosity $\gamma_1$ is preferably 135 mPa·s or less, preferably 105 mPa·s or less and in particular 85 mPa·s or less.

The birefringence Δn of the liquid-crystal mixture is generally in the range from 0.06 or more to 0.16 or less, preferably in the range from 0.08 or more to 0.12 or less.

The threshold voltage $V_0$ of the liquid-crystal mixture is generally in the range from 1.2 V or more to 3.0 V or less, preferably in the range from 2.0 V or more to 2.5 V or less.

The mixtures according to the invention are suitable for all VA-TFT applications, such as, for example, VAN, MVA, (S)-PVA and ASV. They are furthermore suitable for IPS, FFS and PALC applications of negative Δε.

The nematic liquid-crystal mixtures in the displays according to the invention generally comprise two or three components, components A and B and/or C, which themselves each consist of one or more individual compounds.

For component A, one (or more) individual compound(s) having a value of Δε≦−0.8 is (are) preferably selected. This value must be more negative the smaller the proportion of A in the mixture as a whole.

For component B, one (or more) individual compound(s) having a value of $\Delta\epsilon \leq -0.8$ is (are) preferably selected. This value must be more negative the smaller the proportion of B in the mixture as a whole.

Component C has pronounced nematogeneity and a flow viscosity of not greater than 30 mm²·s⁻¹, preferably not greater than 25 mm²·s⁻¹, at 20° C.

For component B, one (or more) individual compound(s) having an absolute value of $\Delta\epsilon$ of <0.8 is (are) preferably selected.

Particularly preferred individual compounds in component C are extremely-low-viscosity nematic liquid crystals having a flow viscosity of not greater than 18 mm²·s⁻¹, preferably not greater than 12 mm²·s⁻¹, at 20° C.

Component C is monotropically or enantiotropically nematic and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

A multiplicity of suitable materials is known to the person skilled in the art from the literature. Particular preference is given here to compounds of the formula V.

The liquid-crystal mixtures according to the invention preferably comprise 4 to 15, in particular 5 to 12, and particularly preferably 10 or fewer, compounds of the formulae I and (II and/or III and/or IV) and/or V.

Besides compounds selected from the group of the formulae I to V, other constituents may also be present in liquid-crystal mixtures according to the invention, for example in an amount of up to 45% of the mixture as a whole, but preferably up to 35%, in particular up to 10%.

The other constituents of the liquid-crystal mixtures according to the invention are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal mixtures of this type can be characterised by the formula IX

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G denotes

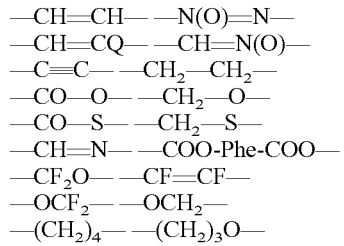

or a C—C single bond, Q denotes halogen, preferably chlorine, or —CN, and $R^{91}$ and $R^{92}$ each denote alkyl, alkenyl, alkoxy, alkanoyloxy or alkoxycarbonyloxy having up to 18, preferably up to 8, carbon atoms, or one of these radicals alternatively denotes CN, NC, $NO_2$, NCS, $CF_3$, $OCF_3$, F, Cl or Br.

In most of these compounds, $R^{91}$ and $R^{92}$ are different from one another, one of these radicals usually being an alkyl or alkoxy group. Other variants of the proposed substituents are also common. Many such substances or also mixtures thereof are commercially available. All these substances can be prepared by methods known from the literature.

The concentration of the compounds of the formula IX in the mixture as a whole is preferably 1% to 25%, particularly preferably 1% to 15% and very particularly preferably 2% to 9%.

The media according to the invention may optionally also comprise a dielectrically positive component, whose total concentration is preferably 10% or less, based on the entire medium.

In a preferred embodiment, the liquid-crystal media according to the invention comprise in total, based on the mixture as a whole, 5% or more to 60% or less, preferably 10% or more to 50% or less, preferably 15% or more to 40% or less and particularly preferably 20% or more to 35% or less and very particularly preferably 25% or more to 30% or less of component A and 1% or more to 45% or less, preferably 2% or more to 40% or less, preferably 3% or more to 35% or less and particularly preferably 5% or more to 30% or less and very particularly preferably 10% or more to 20% or less of component B and 5% or more to 80% or less, preferably 25% or more to 75% or less, particularly preferably 35% or more to 70% or less and very particularly preferably 40% or more to 65% or less of component C.

The liquid-crystal media according to the invention preferably have a nematic phase from in each case at least −20° C. or less to 70° C. or more, particularly preferably from −30° C. or less to 80° C. or more, very particularly preferably from −40° C. or less to 85° C. or more and most preferably from −40° C. or less to 105° C. or more.

The expression "have a nematic phase" here means on the one hand that no smectic phase and no crystallisation are observed at low temperatures at the corresponding temperature and on the other hand that no clearing occurs on heating out of the nematic phase. The investigation at low temperatures is carried out in a flow viscometer at the corresponding temperature and checked by storage in test cells having a cell thickness corresponding to the electro-optical application for at least 100 hours. If the storage stability at a temperature of −20° C. in a corresponding test cell is 1000 h or more, the medium is regarded as stable at this temperature. At temperatures of −30° C. and −40° C., the corresponding times are 500 h and 250 h respectively. At high temperatures, the clearing point is measured in capillaries by conventional methods.

In addition, the liquid-crystal media according to the invention have high values for the voltage holding ratio in liquid-crystal cells.

In freshly filled cells at 20° C. in the cells, these are greater than or equal to 95%, preferably greater than or equal to 97%, particularly preferably greater than or equal to 98% and very particularly preferably greater than or equal to 99%, and after 5 minutes in the oven at 100° C. in the cells, these are greater than or equal to 90%, preferably greater than or equal to 93%, particularly preferably greater than or equal to 96% and very particularly preferably greater than or equal to 98%.

These preferred values for the individual physical properties are preferably also in each case maintained by the media according to the invention in combination with one another.

In the present application, the term "compounds", also written as "compound(s)", means both one and also a plurality of compounds, unless explicitly indicated otherwise.

For the present invention, the following definitions apply in connection with the specification of the constituents of the compositions, unless indicated otherwise in individual cases:

"comprise": the concentration of the constituents in question in the composition is preferably 5% or more, particularly preferably 10% or more, very particularly preferably 20% or more, "predominantly consist of": the concentration of the constituents in question in the composition is preferably 50% or more, particularly preferably 55% or more and very particularly preferably 60% or more, "essentially consist of": the concentration of the constituents in question in the composition is preferably 80% or more, particularly preferably 90% or more and very particularly preferably 95% or more, and "virtually completely consist of": the concentration of the constituents in question in the composition is preferably 98% or more, particularly preferably 99% or more and very particularly preferably 100.0%.

This applies both to the media as compositions with their constituents, which can be components and compounds, and also to the components with their constituents, the compounds. Only in relation to the concentration of an individual compound relative to the medium as a whole does the term comprise mean: the concentration of the compound in question is preferably 1% or more, particularly preferably 2% or more, very particularly preferably 4% or more.

For the present invention, "≦" means less than or equal to, preferably less than, and "≧" means greater than or equal to, preferably greater than.

For the present invention,

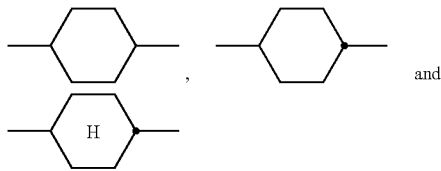

denote trans-1,4-cyclohexylene and

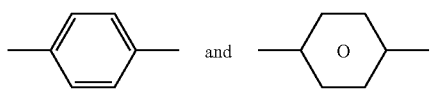

denote 1,4-phenylene.

For the present invention, the expression "dielectrically positive compounds" means compounds having a $\Delta\epsilon$ of $>1.5$, the expression "dielectrically neutral compounds" means those where $-1.5 \leq \Delta\epsilon \leq 1.5$ and the expression "dielectrically negative compounds" means those where $\Delta\epsilon < -1.5$. The dielectric anisotropy of the compounds is determined here by dissolving 10% of the compounds in a liquid-crystalline host and determining the capacitance of the resultant mixture in each case in at least one test cell having a cell thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

The host mixture used for dielectrically positive and dielectrically neutral compounds is ZLI-4792 and that used for dielectrically negative compounds is ZLI-2857, both from Merck KGaA, Germany. The values for the respective compounds to be investigated are obtained from the change in the dielectric constant of the host mixture after addition of the compound to be investigated and extrapolation to 100% of the compound employed. The compound to be investigated is dissolved in the host mixture in an amount of 10%. If the solubility of the substance is too low for this purpose, the concentration is halved in steps until the investigation can be carried out at the desired temperature.

The liquid-crystal media according to the invention may, if necessary, also comprise further additives, such as, for example, stabilisers and/or pleochroic dyes and/or chiral dopants in the usual amounts. The amount of these additives employed is preferably in total 0% or more to 10% or less, based on the amount of the entire mixture, particularly preferably 0.1% or more to 6% or less. The concentration of the individual compounds employed is preferably 0.1% or more to 3% or less. The concentration of these and similar additives is generally not taken into account when specifying the concentrations and concentration ranges of the liquid-crystal compounds in the liquid-crystal media.

In a preferred embodiment, the liquid-crystal media according to the invention comprise a polymer precursor which comprises one or more reactive compounds, preferably reactive mesogens, and, if necessary, also further additives, such as, for example, polymerisation initiators and/or polymerisation moderators, in the usual amounts. The amount of these additives employed is in total 0% or more to 10% or less, based on the amount of the entire mixture, preferably 0.1% or more to 2% or less. The concentration of these and similar additives is not taken into account when specifying the concentrations and concentration ranges of the liquid-crystal compounds in the liquid-crystal media.

The compositions consist of a plurality of compounds, preferably 3 or more to 30 or fewer, particularly preferably 6 or more to 20 or fewer and very particularly preferably 10 or more to 16 or fewer compounds, which are mixed in a conventional manner. In general, the desired amount of the components used in lesser amount is dissolved in the components making up the principal constituent of the mixture. This is advantageously carried out at elevated temperature. If the selected temperature is above the clearing point of the principal constituent, completion of the dissolution operation is particularly easy to observe. However, it is also possible to prepare the liquid-crystal mixtures in other conventional ways, for example using pre-mixes or from a so-called "multibottle system".

It goes without saying to the person skilled in the art that the media according to the invention for use in VA, IPS, FFS or PALC displays may also comprise compounds in which, for example, H, N, O, Cl, F have been replaced by the corresponding isotopes.

The structure of the liquid-crystal displays according to the invention corresponds to the conventional geometry, as described, for example, in EP-A 0 240 379.

The liquid-crystal phases according to the invention can be modified by means of suitable additives in such a way that they can be employed in any type of, for example, ECB, VAN, IPS, GH or ASM-VA LCD display that has been disclosed to date.

Table E below indicates possible dopants which can be added to the mixtures according to the invention. If the mixtures comprise one or more dopants, it is (they are) employed in amounts of 0.01 to 4% by weight, preferably 0.1 to 1.0% by weight.

Stabilisers which can be added, for example, to the mixtures according to the invention, preferably in amounts of 0.01 to 6% by weight, in particular 0.1 to 3% by weight, are mentioned below in Table F.

For the purposes of the present invention, all concentrations are, unless explicitly noted otherwise, indicated in percent by weight and relate to the corresponding mixture or mixture component, unless explicitly indicated otherwise.

All temperature values indicated in the present application, such as, for example, the melting point T(C,N), the smectic (S) to nematic (N) phase transition T(S,N) and the clearing point T(N,I), are indicated in degrees Celsius (° C.) and all temperature differences are correspondingly indicated in differential degrees (° or degrees), unless explicitly indicated otherwise.

For the present invention, the term "threshold voltage" relates to the capacitive threshold ($V_0$), also known as the Freedericks threshold, unless explicitly indicated otherwise.

All physical properties are and have been determined in accordance with "Merck Liquid Crystals, Physical Properties of Liquid Crystals", status November 1997, Merck KGaA, Germany, and apply to a temperature of 20° C., and $\Delta n$ is determined at 589 nm and $\Delta\epsilon$ at 1 kHz, unless explicitly indicated otherwise in each case.

The electro-optical properties, for example the threshold voltage ($V_0$) (capacitive measurement), are, as is the switching behaviour, determined in test cells produced at Merck Japan Ltd. The measurement cells have soda-lime glass substrates and are constructed in an ECB or VA configuration with polyimide alignment layers (SE-1211 with diluent **26 (mixing ratio 1:1), both from Nissan Chemicals, Japan), which have been rubbed perpendicular to one another and effect a homeotropic alignment of the liquid crystals. The surface area of the transparent, virtually square electrodes of ITO is 1 cm².

Unless indicated otherwise, a chiral dopant is not added to the liquid-crystal mixtures used, but the latter are also particularly suitable for applications in which doping of this type is necessary.

The voltage holding ratio is determined in test cells produced at Merck Japan Ltd. The measurement cells have soda-lime glass substrates and are constructed with polyimide alignment layers (AL-3046 from Japan Synthetic Rubber, Japan) with a layer thickness of 50 nm, which have been rubbed perpendicular to one another. The layer thickness is uniformly 6.0 μm. The surface area of the transparent electrodes of ITO is 1 cm².

The voltage holding ratio is determined at 20° C. ($HR_{20}$) and after 5 minutes in the oven at 100° C. ($HR_{100}$). The voltage used has a frequency of 60 Hz.

The rotational viscosity is determined using the rotating permanent magnet method and the flow viscosity in a modified Ubbelohde viscometer. For liquid-crystal mixtures ZLI-2293, ZLI-4792 and MLC-6608, all products from Merck KGaA, Darmstadt, Germany, the rotational viscosity values determined at 20° C. are 161 mPa·s, 133 mPa·s and 186 mPa·s respectively, and the flow viscosity values (ν) are 21 mm²·s⁻¹, 14 mm²·s⁻¹ and 27 mm²·s⁻¹ respectively.

The following symbols are used in the present application:
$V_0$ threshold voltage, capacitive [V] at 20° C.,
$n_e$ extraordinary refractive index measured at 20° C. and 589 nm,
$n_o$ ordinary refractive index measured at 20° C. and 589 nm,
$\Delta n$ optical anisotropy measured at 20° C. and 589 nm,
$\epsilon\perp$ dielectric susceptibility perpendicular to the director at 20° C. and 1 kHz,
$\epsilon\|$ dielectric susceptibility parallel to the director at 20° C. and 1 kHz,
$\Delta\epsilon$ dielectric anisotropy at 20° C. and 1 kHz,
T(N,I) or
cl.p. clearing point [° C.],
$\gamma_1$ rotational viscosity measured at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN], and
LTS low-temperature stability (phase stability), determined in test cells.

The following examples explain the present invention without limiting it. However, they show the person skilled in the art preferred mixture concepts with compounds preferably to be employed and the respective concentrations thereof and combinations thereof with one another. In addition, the examples illustrate the properties and property combinations that are accessible.

For the present invention and in the following examples, the structures of the liquid-crystal compounds are indicated by means of acronyms, with the transformation into chemical formulae taking place in accordance with Tables A to C below. All radicals $C_nH_{2n+1}$, $C_mH_{2m+1}$ and $C_lH_{2l+1}$ or $C_nH_{2n}$, $C_mH_{2m}$ and $C_lH_{2l}$ are straight-chain alkyl radicals or alkylene radicals, in each case having n, m and l C atoms respectively. Table A shows the codes for the ring elements of the nuclei of the compound, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

Ring elements

C

D          DI

TABLE A-continued

| | | | | |
|---|---|---|---|---|
| Ring elements | | | | |
| A | [tetrahydropyran, O at top, bonds at 2,5] | Al | [tetrahydropyran, O at top, bonds at 2,5 mirrored] | |
| P | [1,4-phenylene] | | | |
| G | [benzene with F at 3-position, 1,4-linked] | Gl | [benzene with F, mirrored] | |
| U | [benzene with 2 F, 1,4-linked] | Ul | [benzene with 2 F, mirrored] | |
| Y | [benzene with 2,3-diF, 1,4-linked] | | | |
| P (F, Cl)Y | [benzene with F and Cl, 1,4-linked] | P(Cl, F)Y | [benzene with Cl and F, 1,4-linked] | |
| np | [naphthalene 2,6-linked] | | | |
| n3f | [trifluoronaphthalene] | n3fl | [trifluoronaphthalene mirrored] | |
| th | [tetrahydronaphthalene] | thl | [tetrahydronaphthalene mirrored] | |
| tH2f | [difluoro-tetrahydronaphthalene] | tH2fl | [difluoro-tetrahydronaphthalene mirrored] | |
| o2f | [difluoro-chroman] | o2fl | [difluoro-chroman mirrored] | |

TABLE A-continued

Ring elements dh 

K   Kl 

L 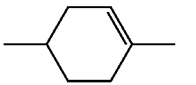  Ll 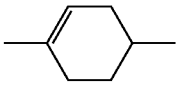

F 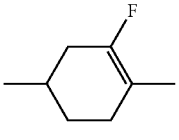  Fl 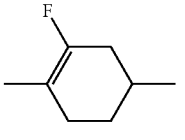

S 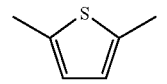

Se 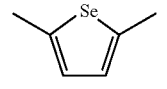

Te 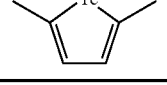

TABLE B

Bridging units

| E | —CH$_2$—CH$_2$— |
| V | —CH=CH— |
| T | —C≡C— |
| W | —CF$_2$—CF$_2$— |
| B | —CF=CF— |

TABLE B-continued

Bridging units

| Z | —CO—O— | ZI | —O—CO— |
| X | —CF=CH— | XI | —CH=CF— |
| O | —CH$_2$—O— | OI | —O—CH$_2$— |
| Q | —CF$_2$—O— | QI | —O—CF$_2$— |

TABLE C

End groups

| On the left individually or in combination | | On the right individually or in combination | |
|---|---|---|---|
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |

TABLE C-continued

| End groups | | | |
|---|---|---|---|
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |

| On the left only in combination | | On the right only in combination | |
|---|---|---|---|
| -...n...- | —$C_nH_{2n}$— | -...n... | —$C_nH_{2n}$— |
| -...M...- | —CFH— | -...M... | —CFH— |
| -...D...- | —$CF_2$— | -...D... | —$CF_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m are each integers, and the three dots "..." are place markers for other abbreviations from this table.

Besides the compounds of the formula I, the mixtures according to the invention preferably comprise one or more compounds of the compounds mentioned below.

The following abbreviations are used:

(n, m and z are, independently of one another, each an integer, preferably 1 to 6)

TABLE D

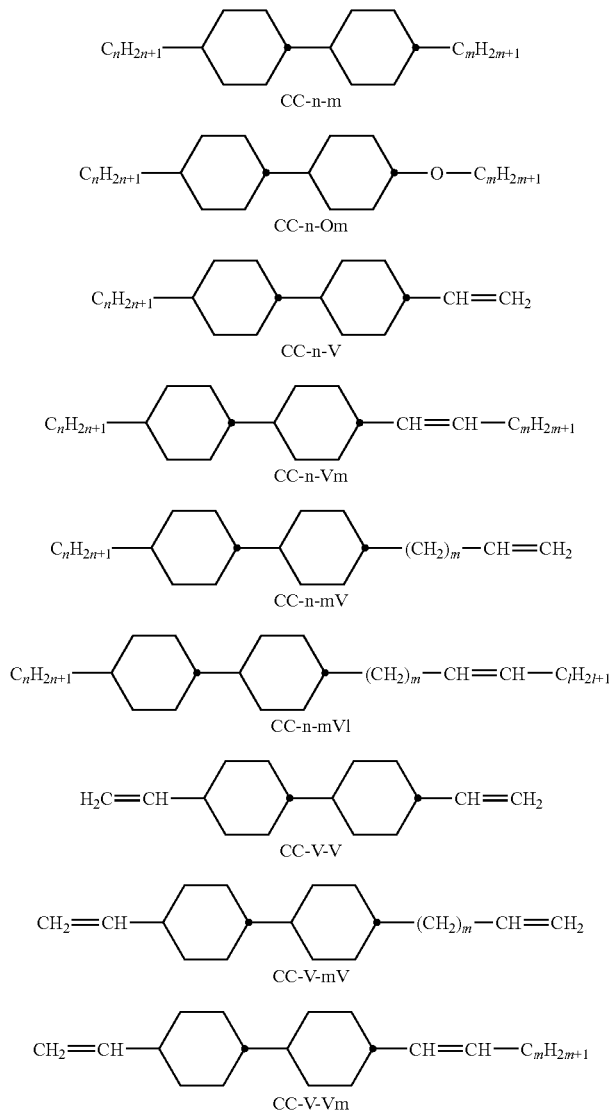

TABLE D-continued
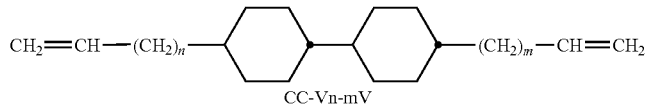
CC-Vn-mV
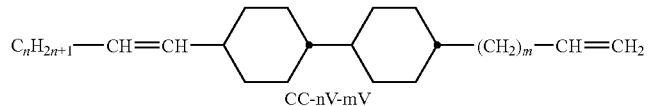
CC-nV-mV
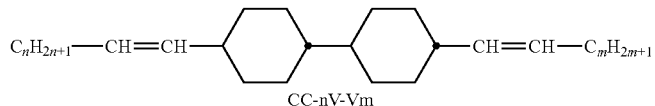
CC-nV-Vm
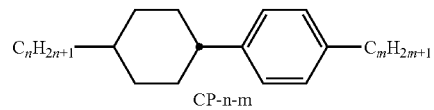
CP-n-m
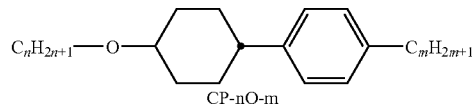
CP-nO-m
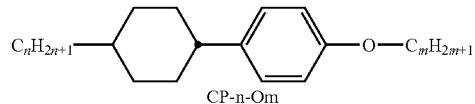
CP-n-Om
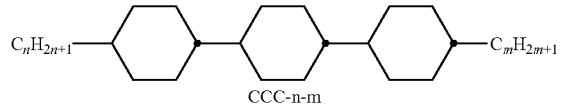
CCC-n-m
CCC-n-V
CCC-V-V
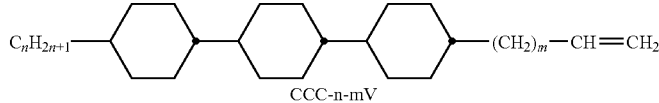
CCC-n-mV
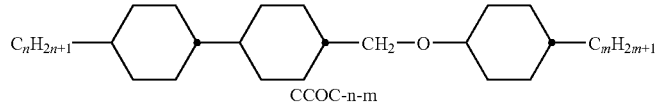
CCOC-n-m
CCVC-n-m
CCVC-V-V TABLE D-continued
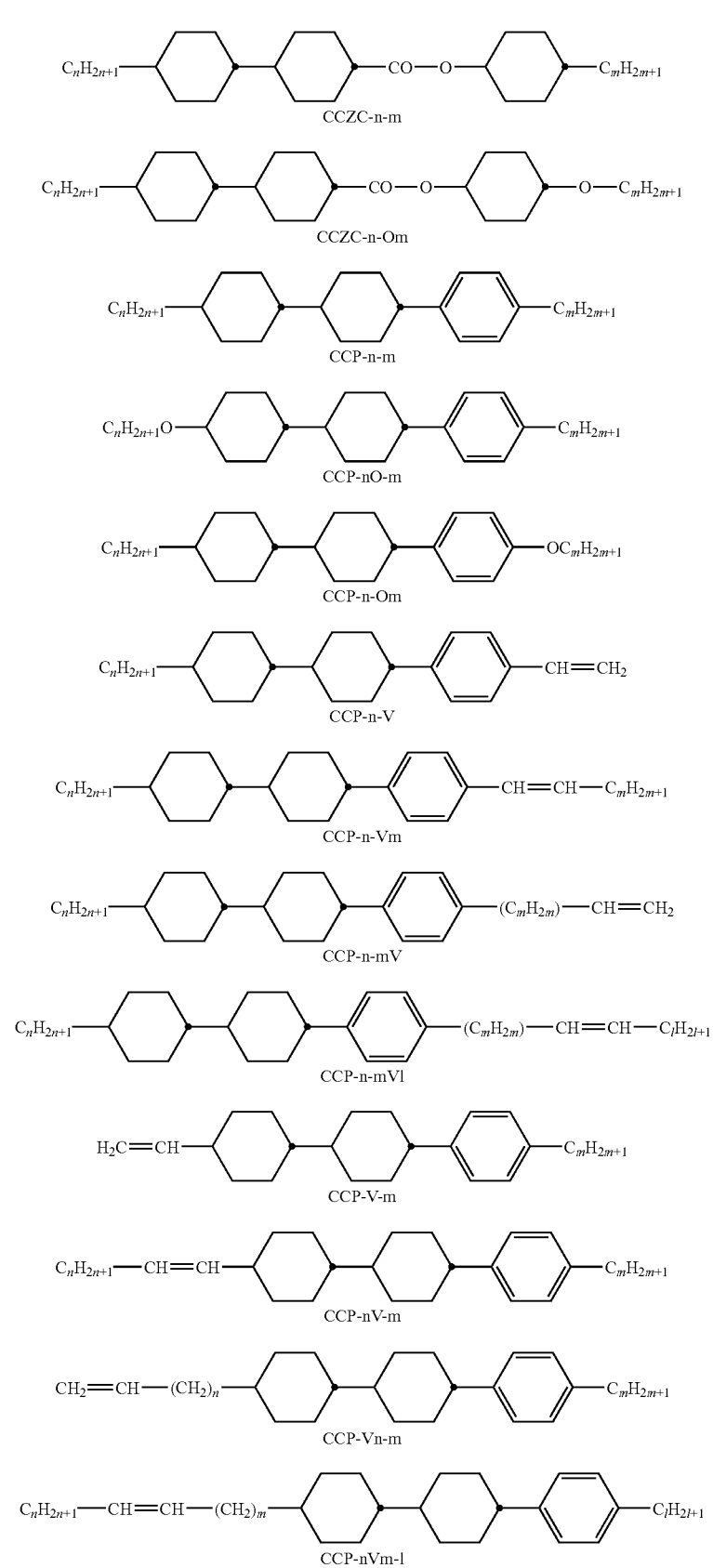

TABLE D-continued
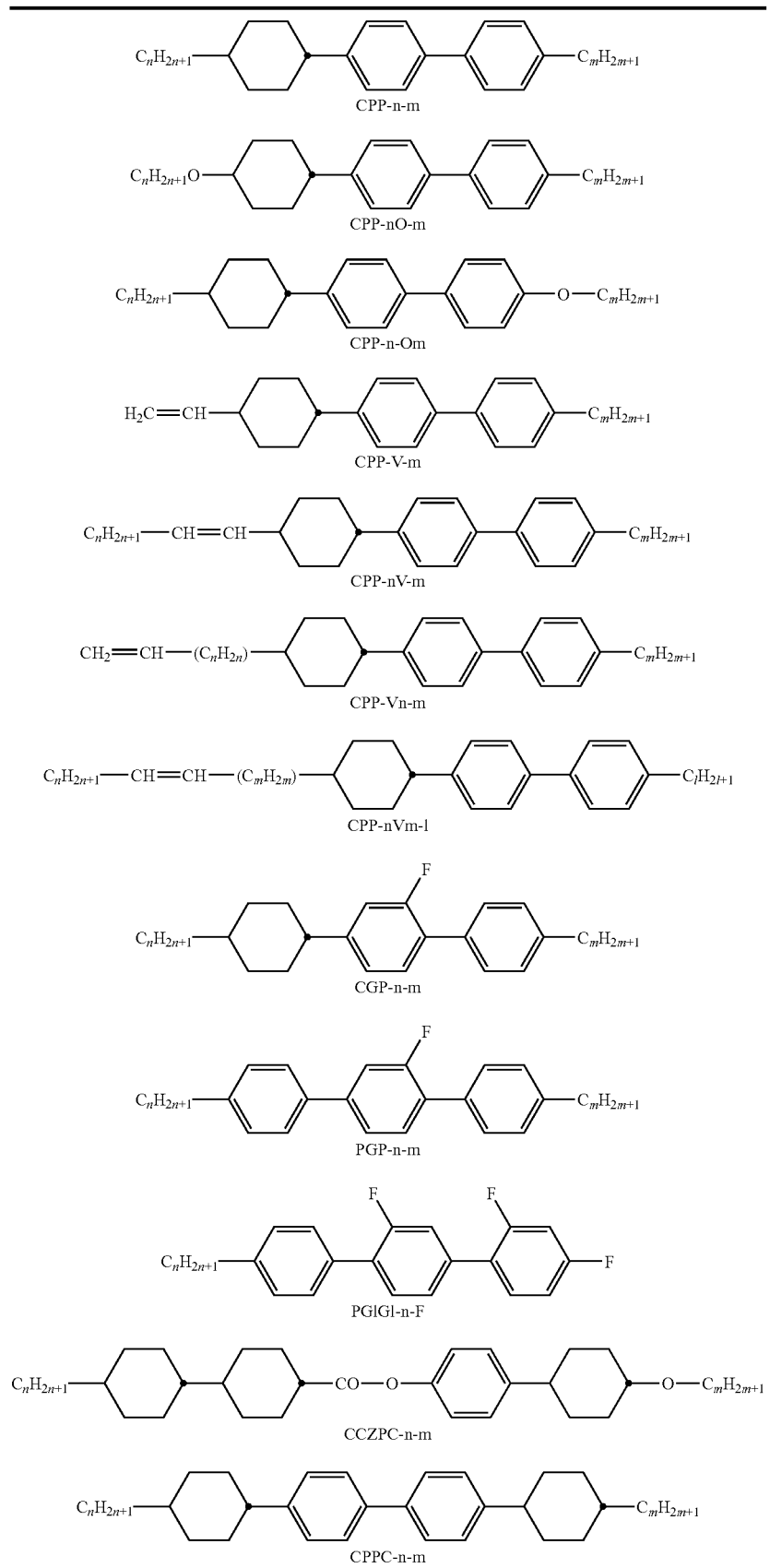

TABLE D-continued
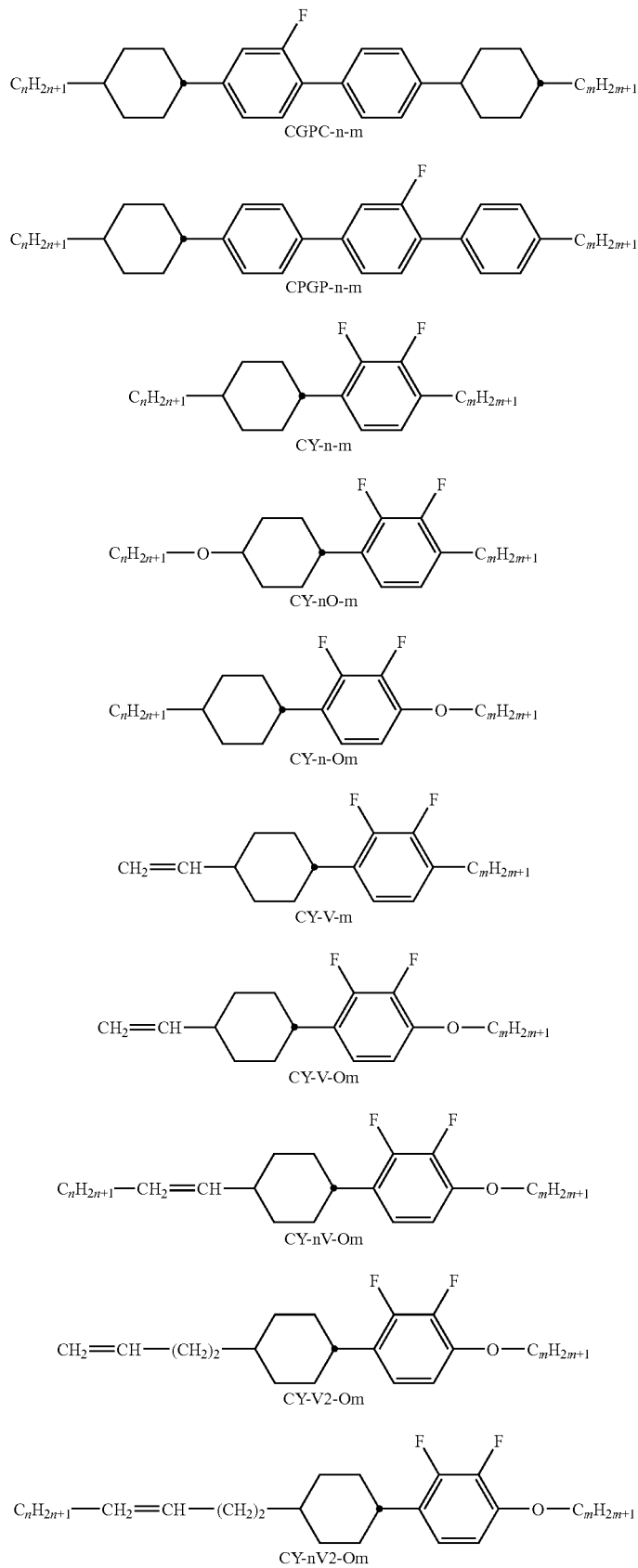

TABLE D-continued
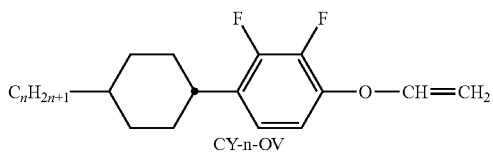
CY-n-OV
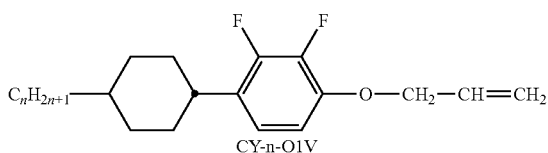
CY-n-O1V
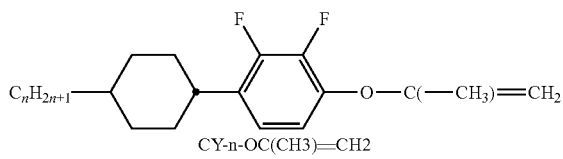
CY-n-OC(CH3)=CH2
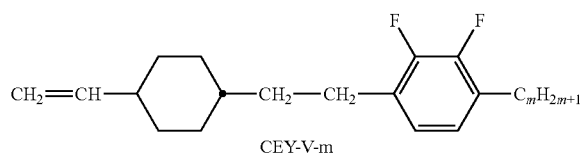
CEY-V-m
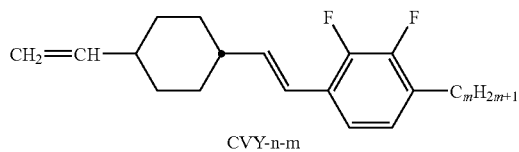
CVY-n-m
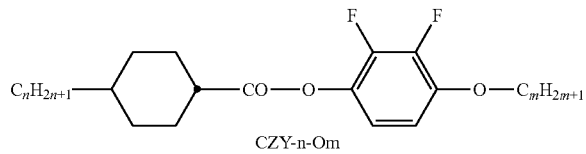
CZY-n-Om
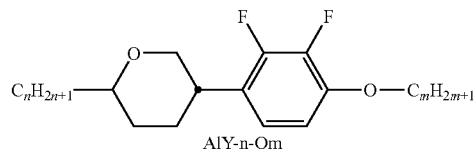
AlY-n-Om
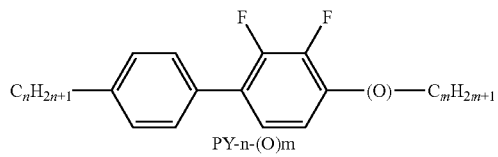
PY-n-(O)m
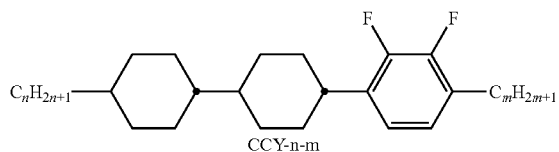
CCY-n-m
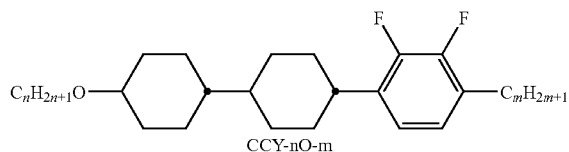
CCY-nO-m TABLE D-continued
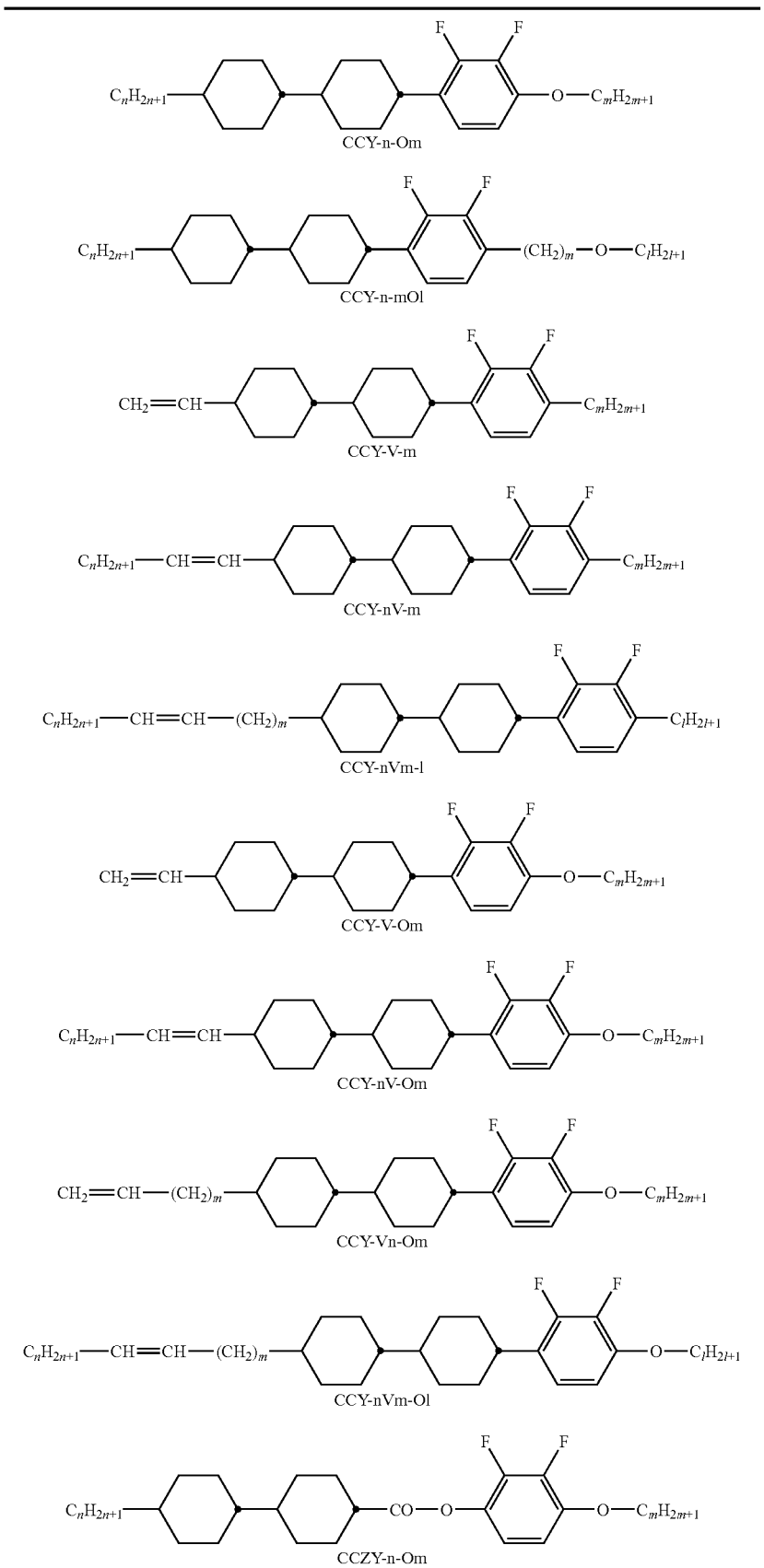

TABLE D-continued
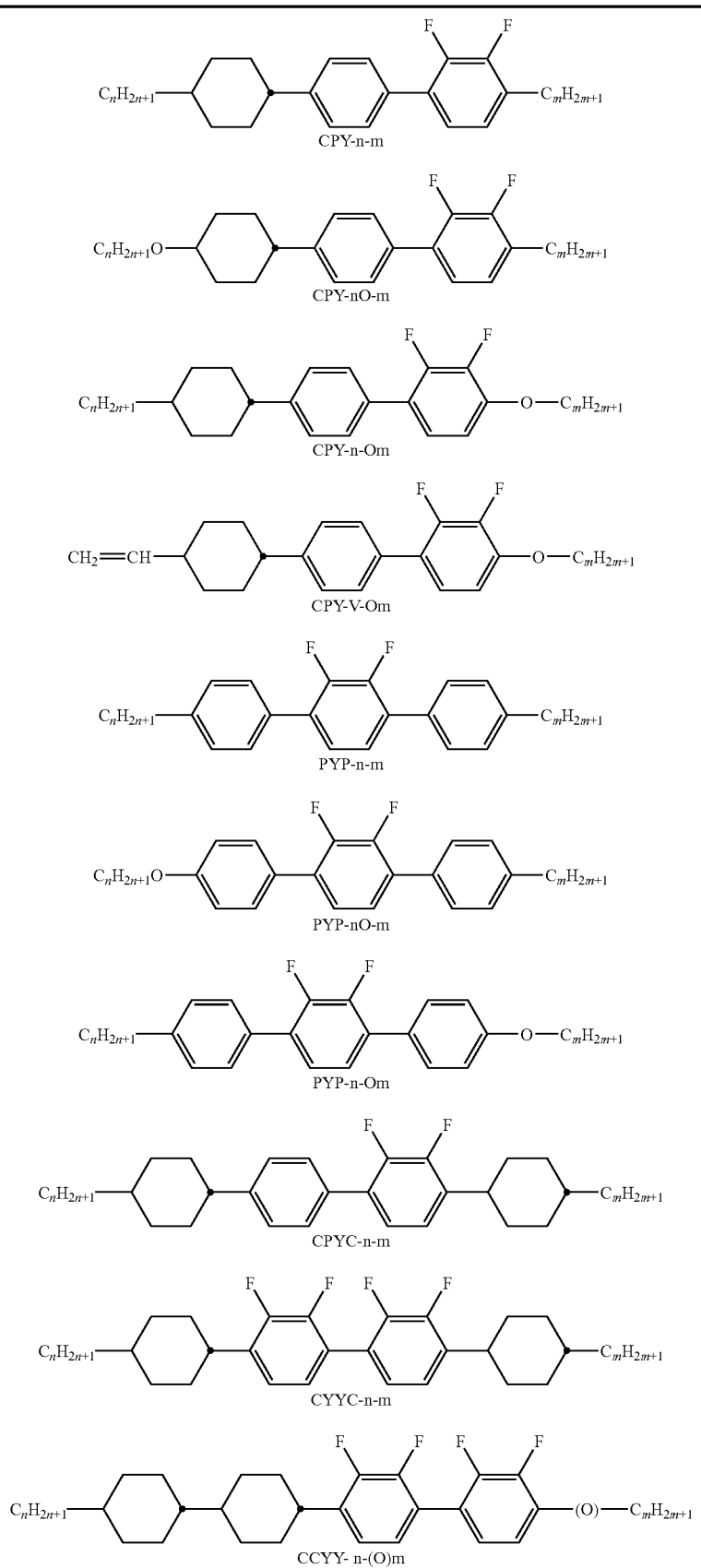

TABLE D-continued
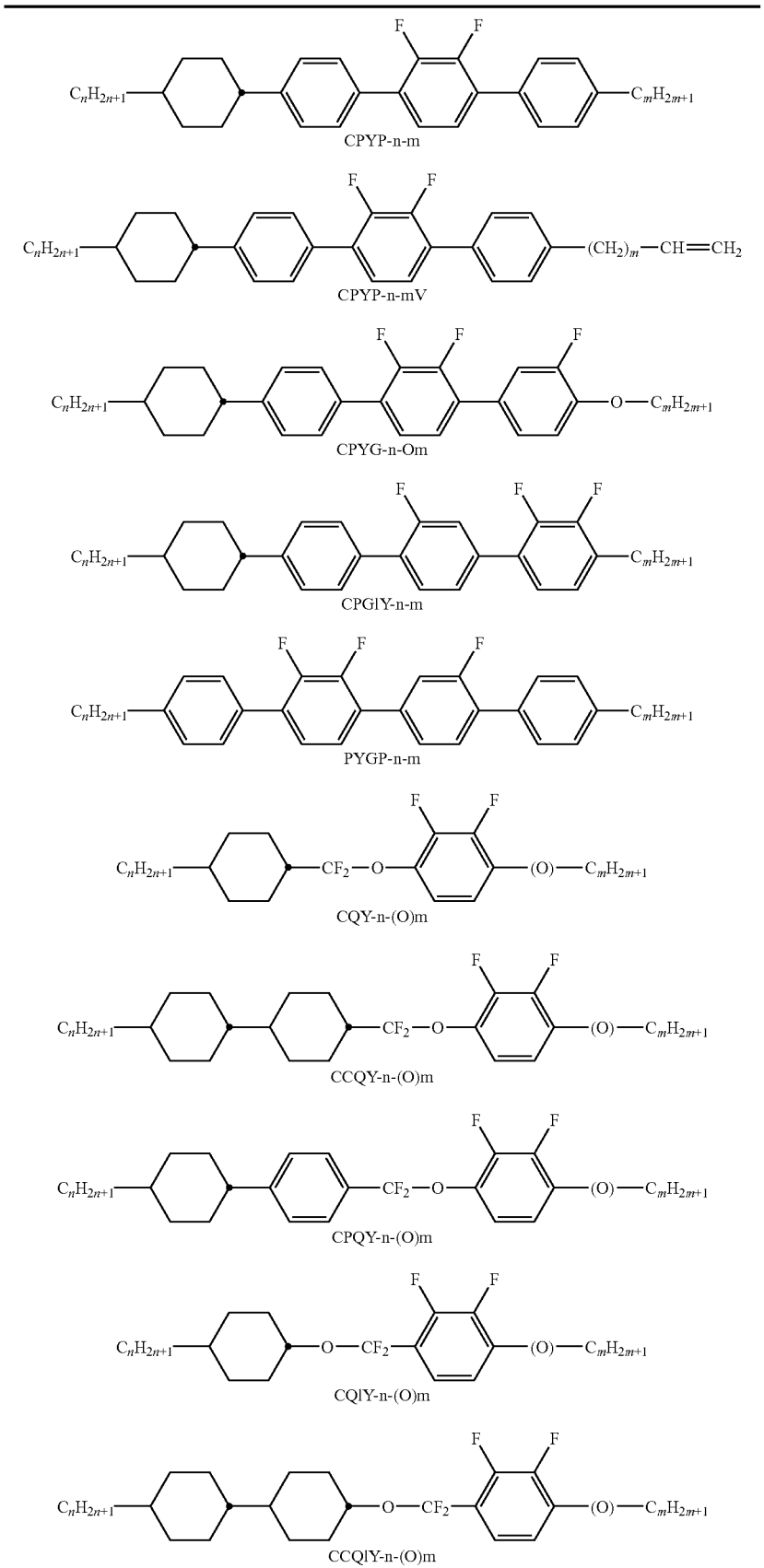

TABLE D-continued
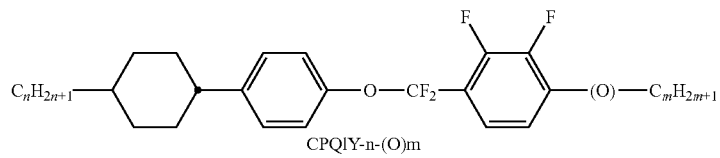
CPQIY-n-(O)m
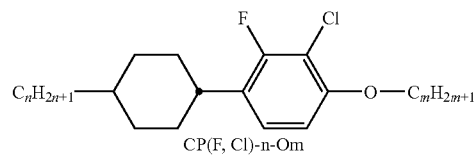
CP(F, Cl)-n-Om
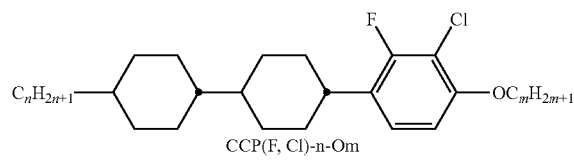
CCP(F, Cl)-n-Om
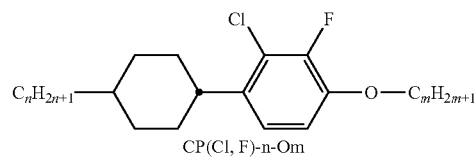
CP(Cl, F)-n-Om
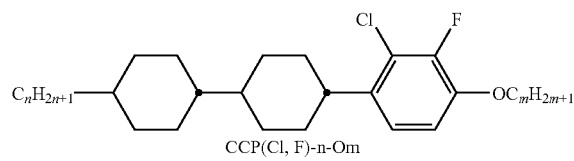
CCP(Cl, F)-n-Om
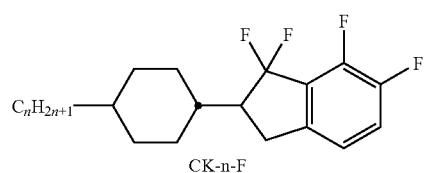
CK-n-F
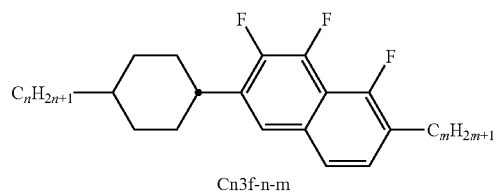
Cn3f-n-m
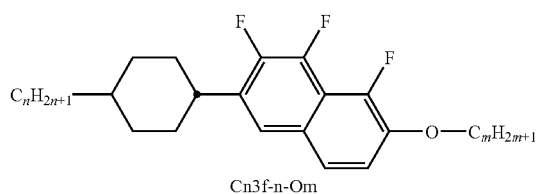
Cn3f-n-Om
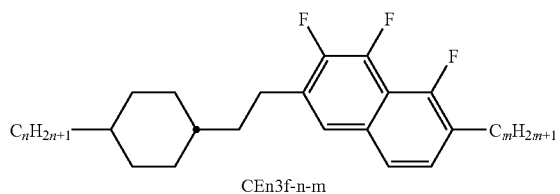
CEn3f-n-m TABLE D-continued
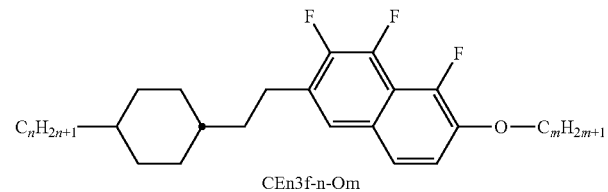
CEn3f-n-Om
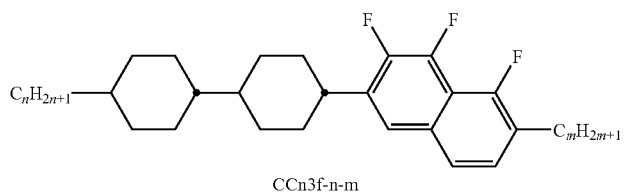
CCn3f-n-m
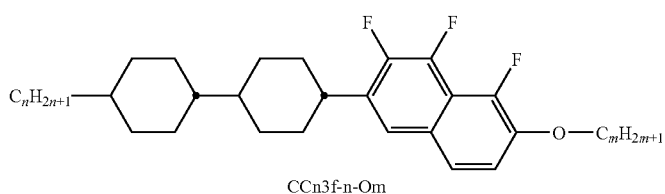
CCn3f-n-Om
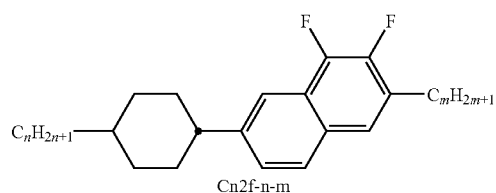
Cn2f-n-m
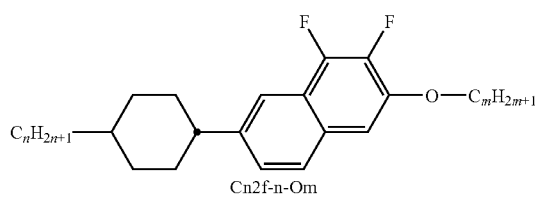
Cn2f-n-Om
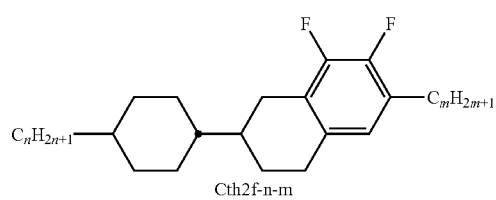
Cth2f-n-m
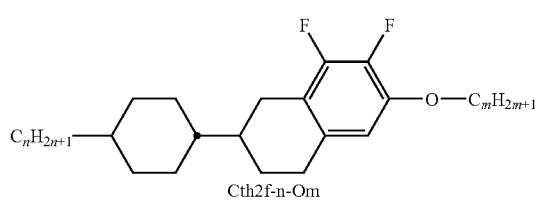
Cth2f-n-Om
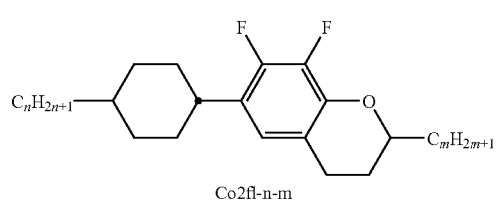
Co2fl-n-m TABLE D-continued
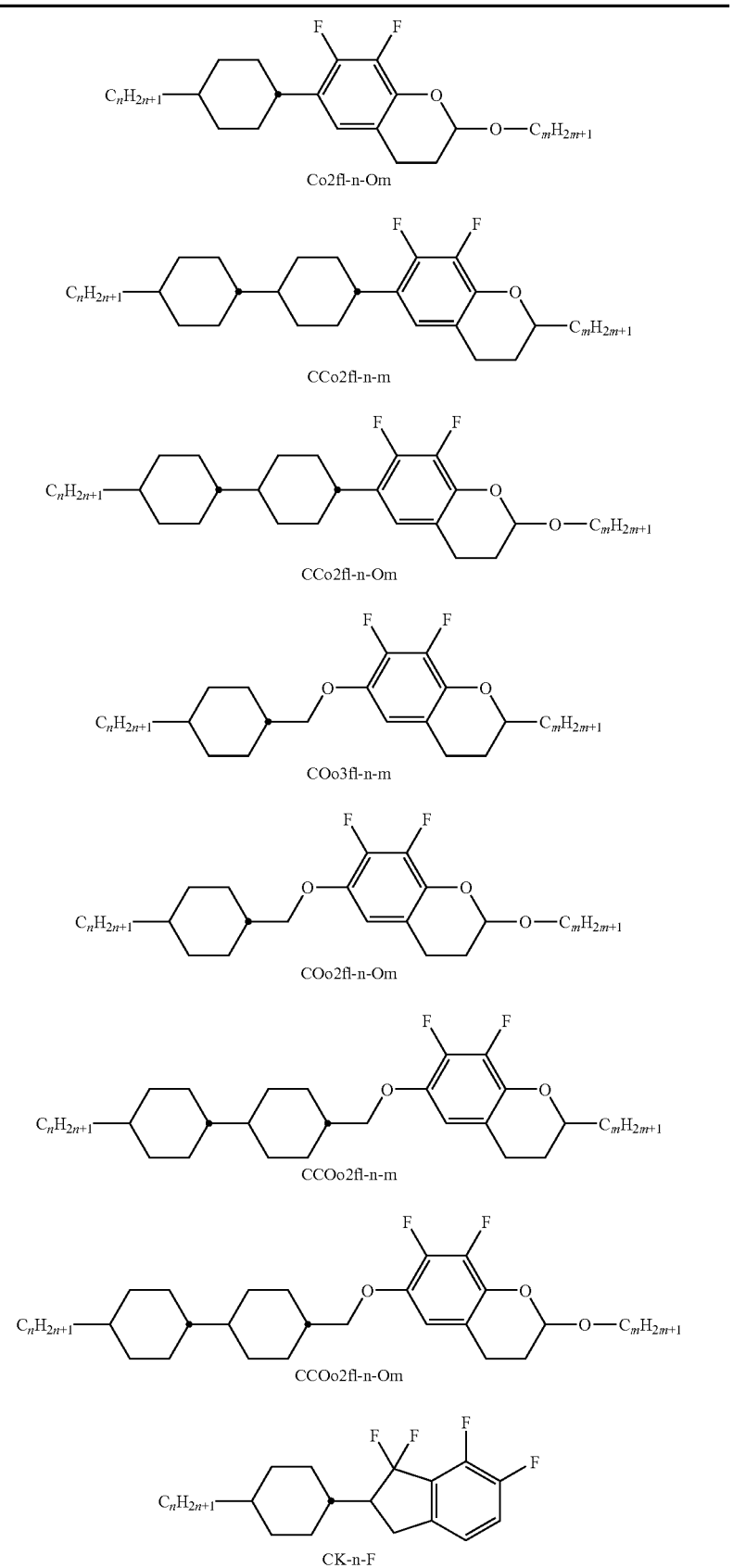

TABLE D-continued
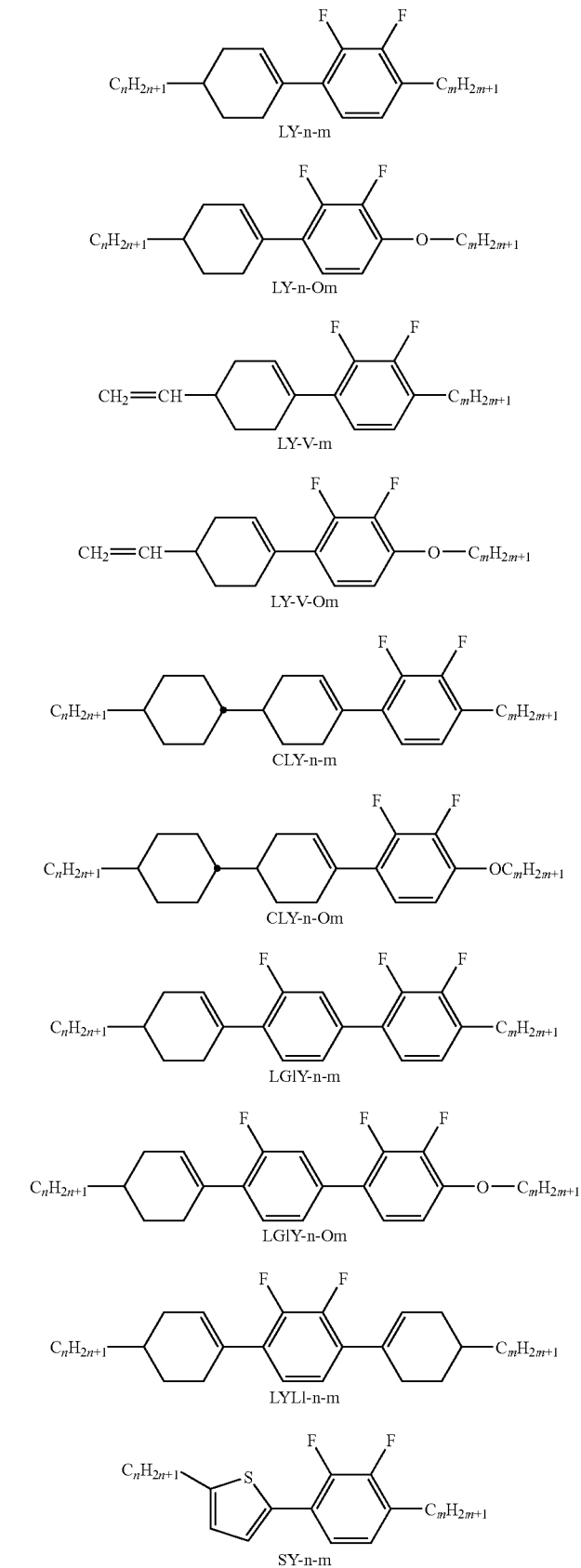

TABLE D-continued
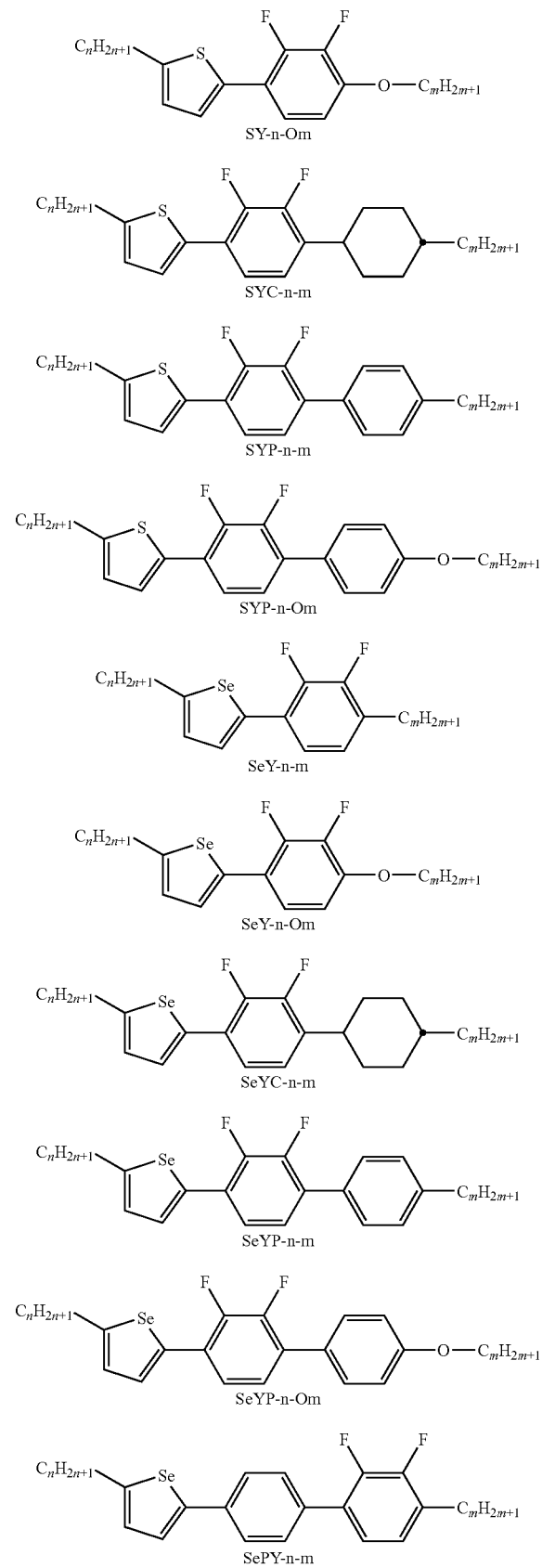

TABLE D-continued
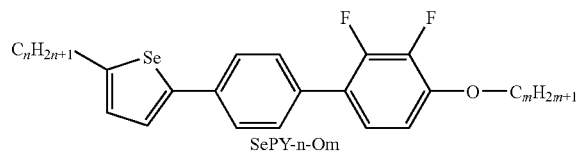
SePY-n-Om
Table E shows chiral dopants which are preferably employed in the mixtures according to the invention.
TABLE E
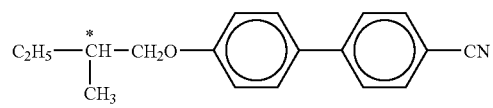
C 15
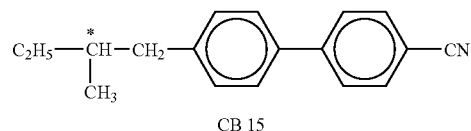
CB 15
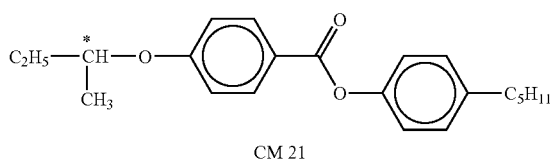
CM 21
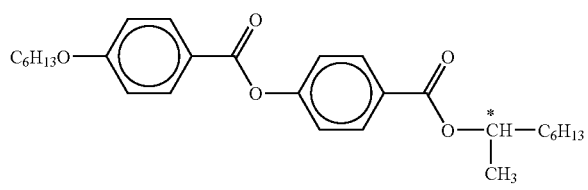
R S-811/S-811
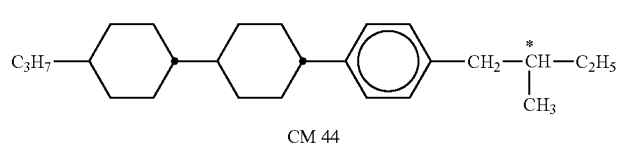
CM 44
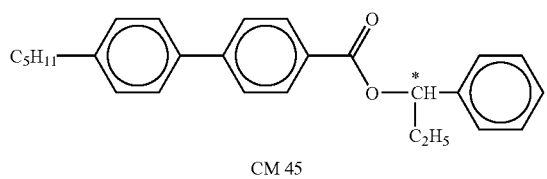
CM 45
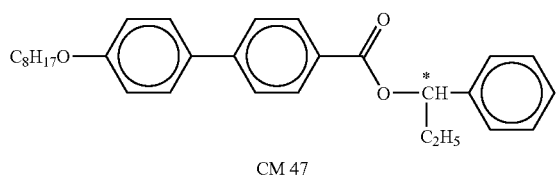
CM 47

TABLE E-continued
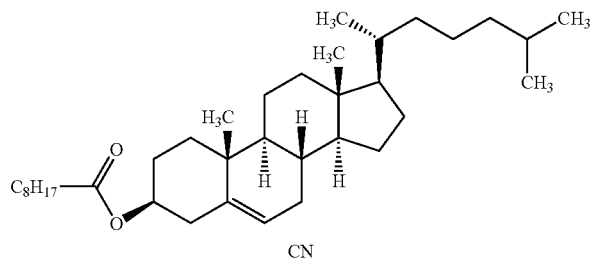
CN
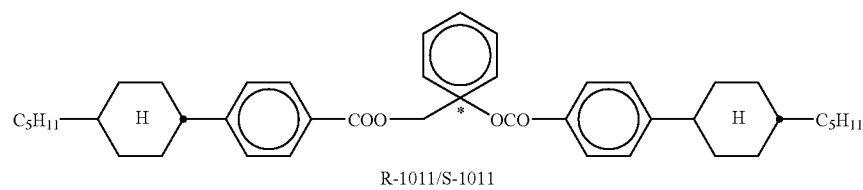
R-1011/S-1011
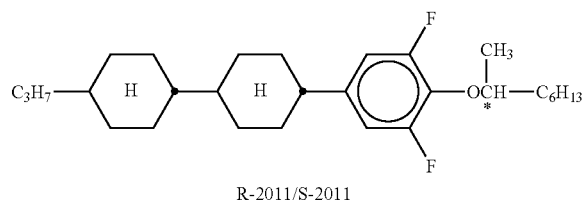
R-2011/S-2011
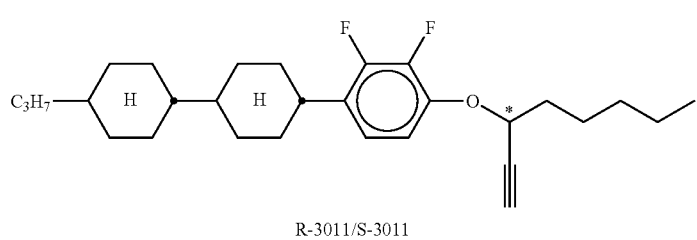
R-3011/S-3011
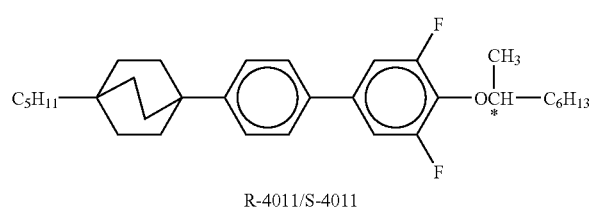
R-4011/S-4011
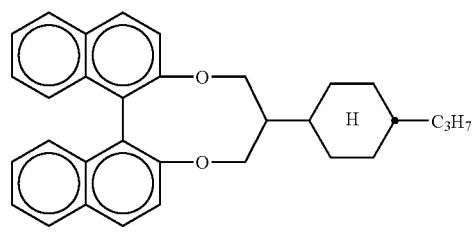
R-5011/S-5011

Compounds selected from the group of the compounds from Table E.
TABLE F
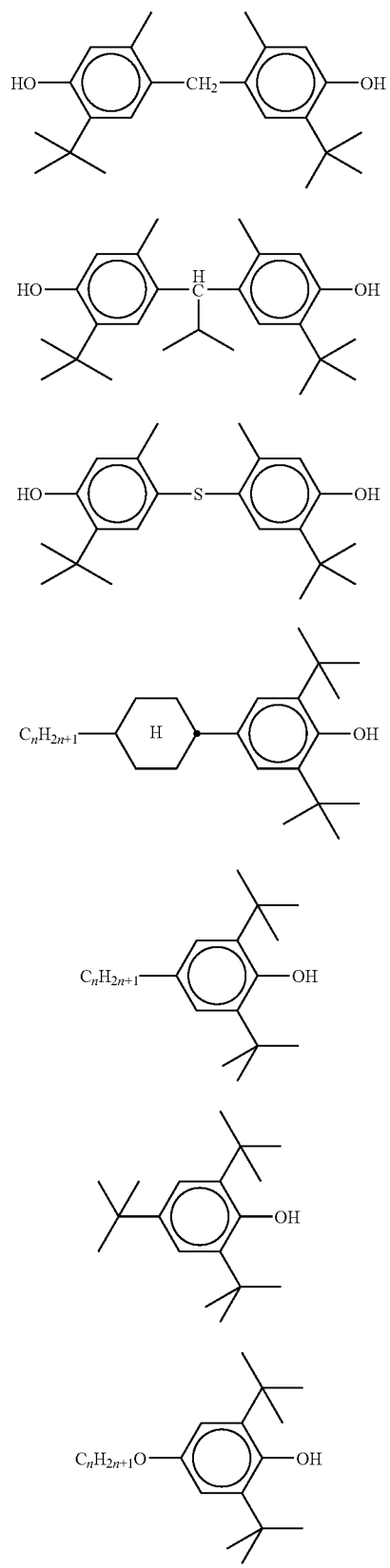

TABLE F-continued
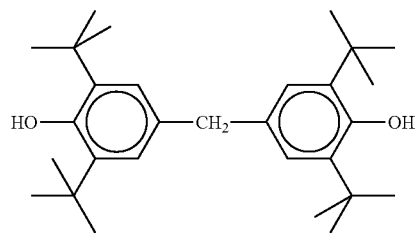
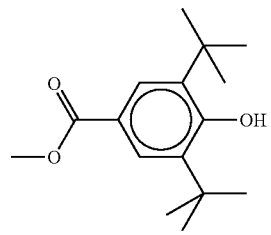
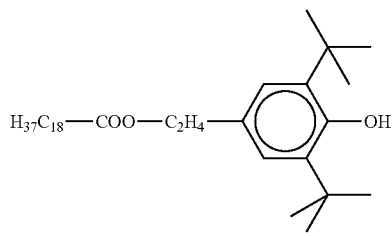
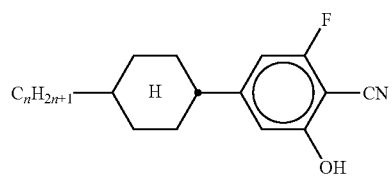
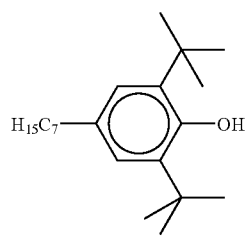
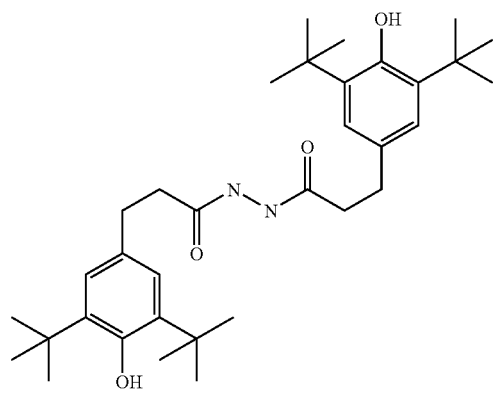

TABLE F-continued
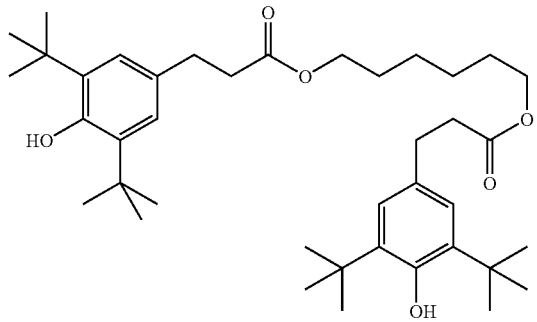
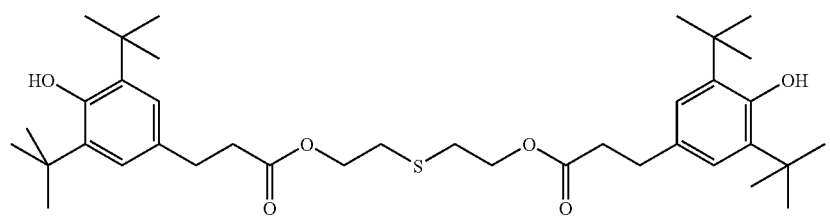
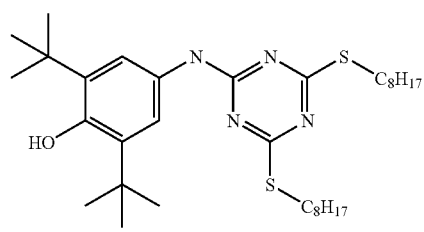
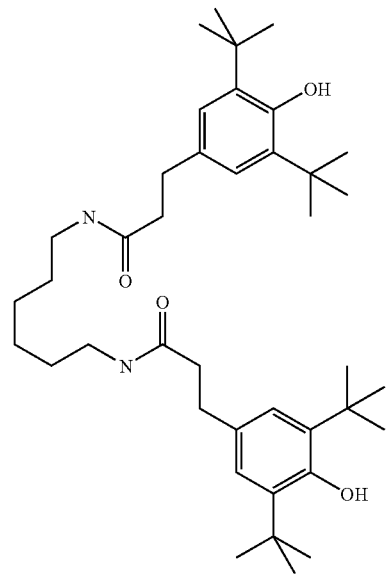

TABLE F-continued
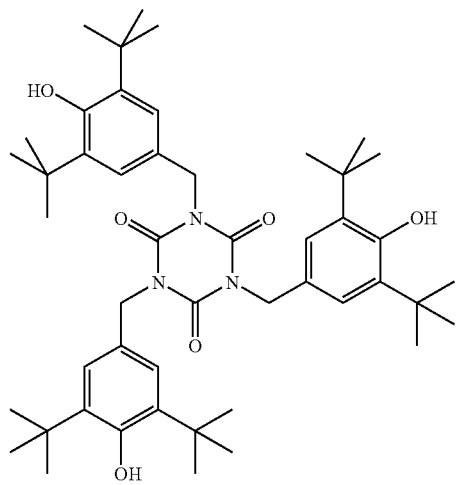
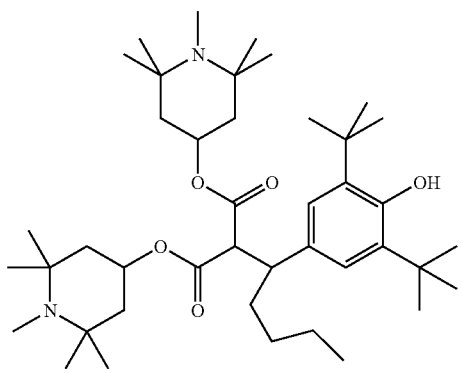
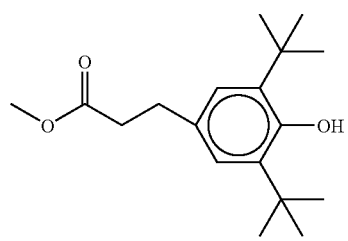
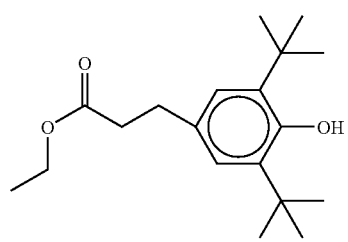
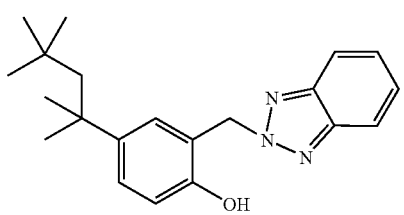

TABLE F-continued
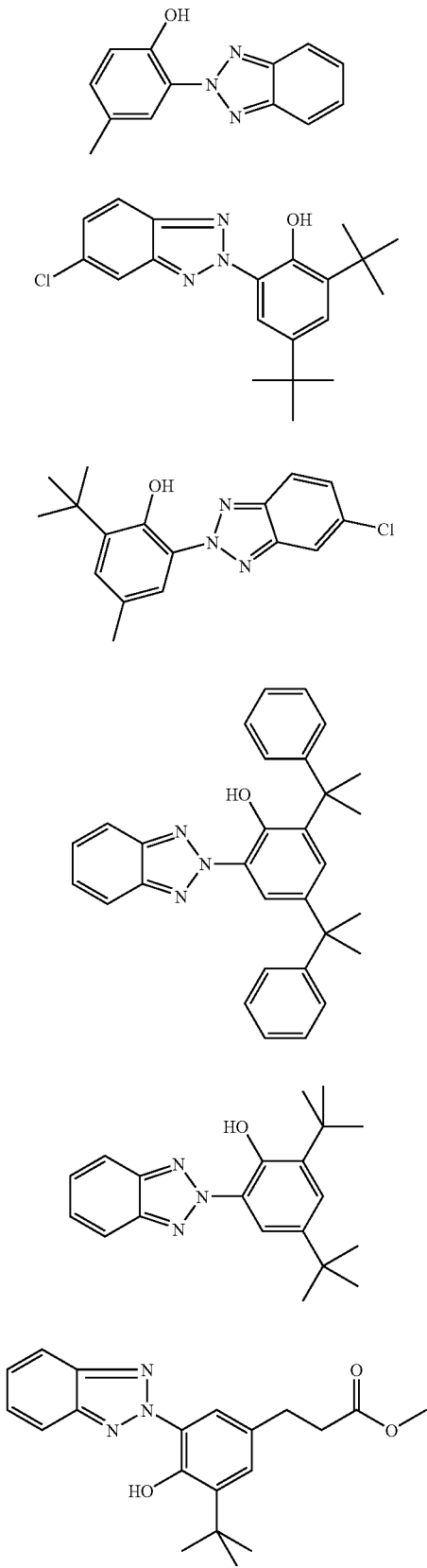

TABLE F-continued
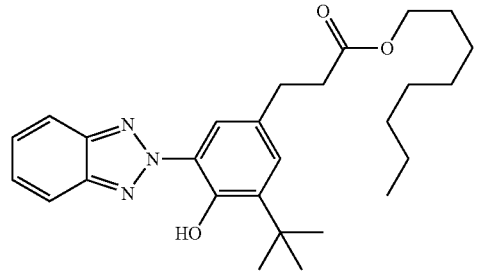
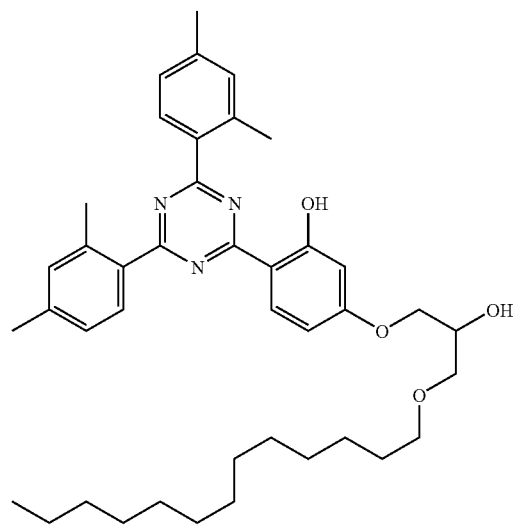
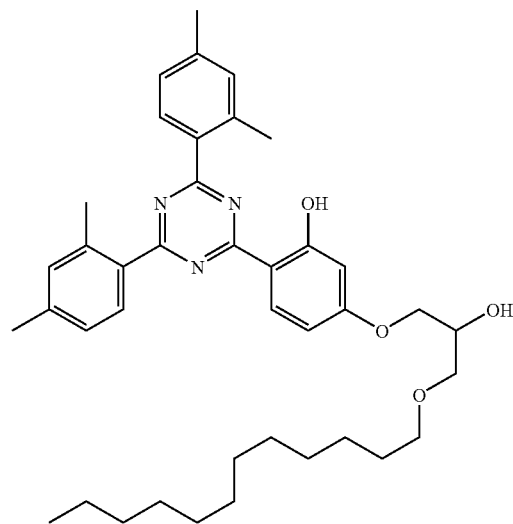

TABLE F-continued
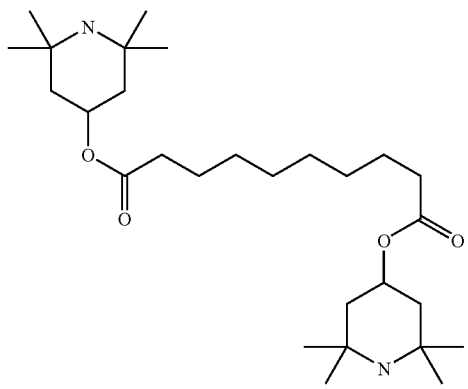
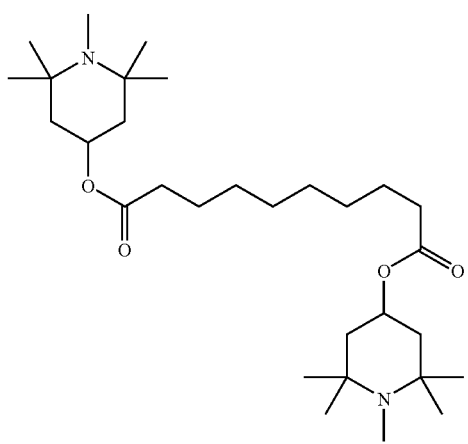
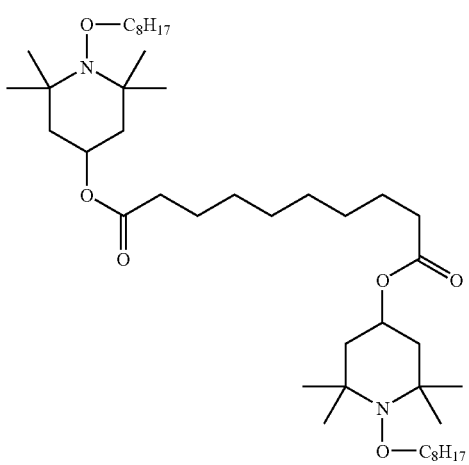
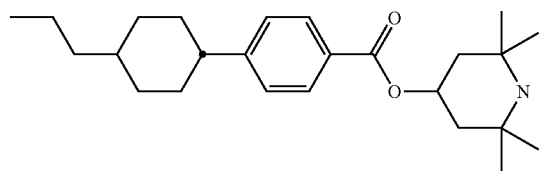

TABLE F-continued
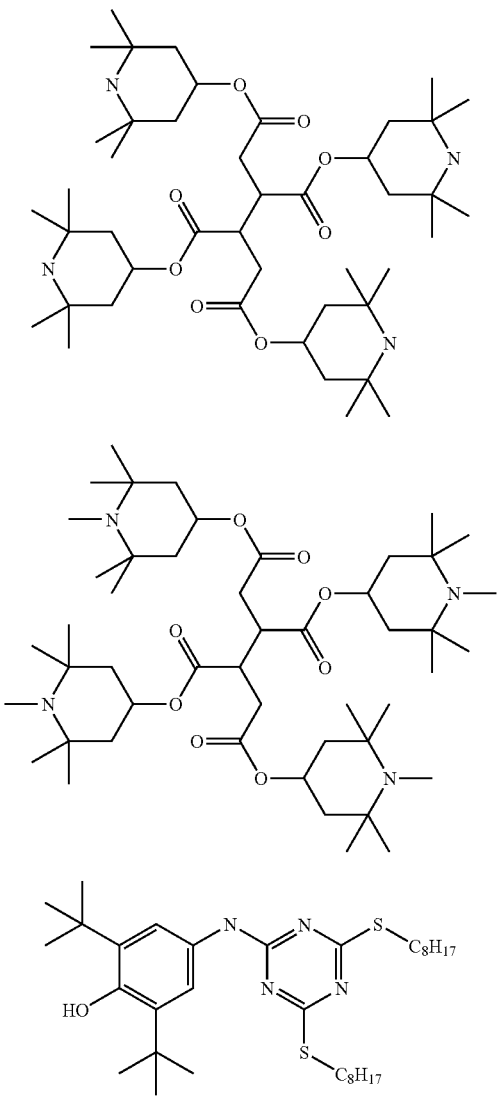
(n here denotes an integer from 1 to 12)
In a preferred embodiment of the present invention, the media according to the invention comprise one or more compounds selected from the group of the compounds from Table F.
Suitable reactive mesogens for use of the mixtures according to the invention in PS-VA applications are shown below in Table G:
TABLE G
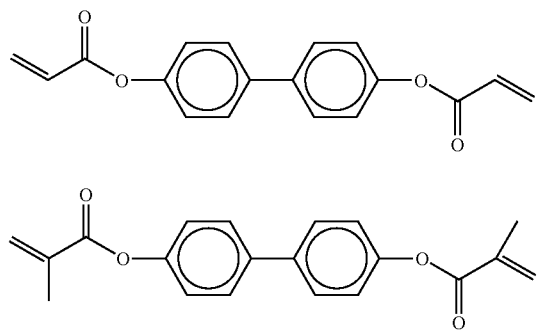

TABLE G-continued

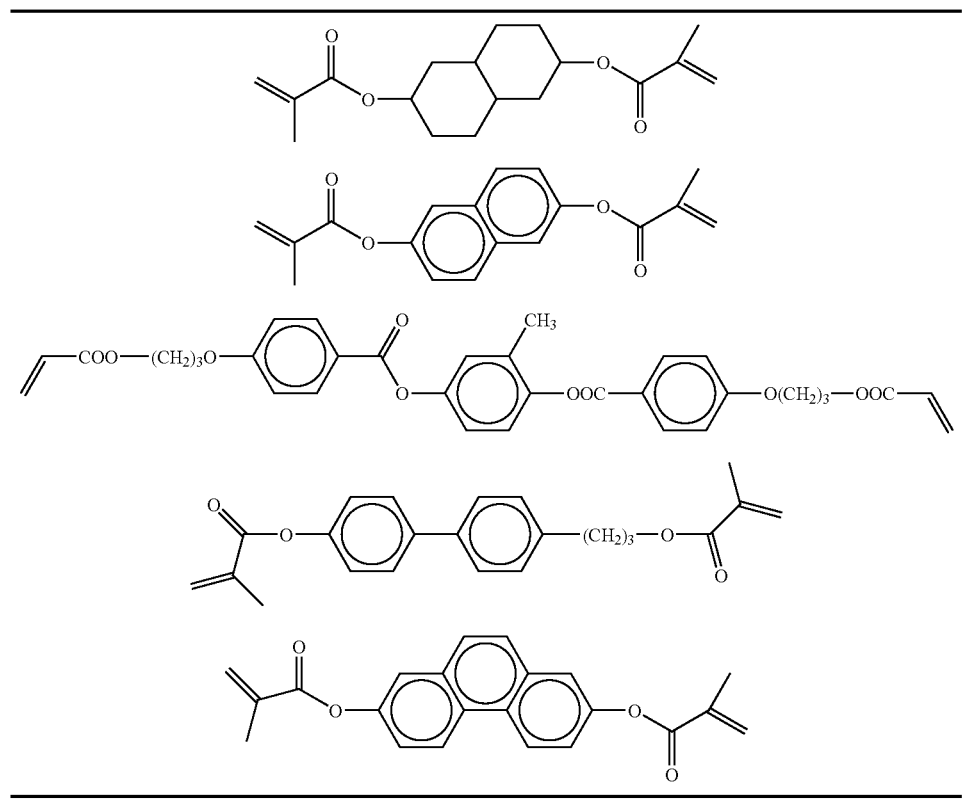

MIXTURE EXAMPLES

Example 1

| Composition | | |
|---|---|---|
| Compound | | Concentration/ |
| No. | Abbrev. | % by weight |
| 1 | SY-1-O2 | 10.0 |
| 2 | CY-3-O4 | 13.0 |
| 3 | CCY-3-O2 | 8.0 |
| 4 | CCY-3-O3 | 4.0 |
| 5 | CCY-2-1 | 11.0 |
| 6 | CCY-3-1 | 11.0 |
| 7 | PYP-2-4 | 9.0 |
| 8 | CC-3-4 | 15.0 |
| 9 | CC-3-O3 | 10.0 |
| 10 | CC-5-O1 | 4.0 |
| 11 | CCOC-3-3 | 2.0 |
| 12 | CCOC-4-3 | 3.0 |
| Σ | | 100.0 |

| Physical properties | |
|---|---|
| T(N, I) = | 76.0° C. |
| Δn(20° C., 589 nm) = | 0.0972 |
| Δε(20° C., 1 kHz) = | −2.9 |
| $\gamma_1$(20° C.) = | 128 mPa · s |

This mixture is eminently suitable for use in VA displays and is also particularly suitable as host for PS-VA applications.

Example 2

| Composition | | |
|---|---|---|
| Compound | | Concentration/ |
| No. | Abbrev. | % by weight |
| 1 | SY-1-O2 | 10.0 |
| 2 | CY-3-O2 | 14.0 |
| 3 | CCY-3-O2 | 7.0 |
| 4 | CCY-4-O2 | 9.0 |
| 5 | CPY-2-O2 | 6.0 |
| 6 | CPY-3-O2 | 6.0 |
| 7 | CC-2-3 | 22.0 |
| 8 | CC-3-4 | 8.0 |
| 9 | CP-3-O1 | 3.0 |
| 10 | CCP-3-1 | 6.0 |
| 11 | CCP-3-3 | 9.0 |
| Σ | | 100.0 |

| Physical properties | |
|---|---|
| T(N, I) = | 81.0° C. |
| Δn(20° C., 589 nm) = | 0.0953 |
| Δε(20° C., 1 kHz) = | −3.1 |
| $\gamma_1$(20° C.) = | 106 mPa · s |

This mixture is eminently suitable for use in VA displays and is also particularly suitable as host for PS-VA applications.

Example 3

| | Composition | |
|---|---|---|
| | Compound | Concentration/ |
| No. | Abbrev. | % by weight |
| 1 | SYP-1-2 | 11.0 |
| 2 | CY-3-O2 | 17.0 |
| 3 | CCY-3-O2 | 11.0 |
| 4 | CCY-3-O3 | 6.0 |
| 5 | CPY-2-O2 | 7.0 |
| 6 | CPY-3-O2 | 7.0 |
| 7 | CC-3-V | 41.0 |
| Σ | | 100.0 |

| Physical properties | |
|---|---|
| T(N, I) = | 75.5° C. |
| $n_e$(20° C., 589 nm) = | 1.5898 |
| Δn(20° C., 589 nm) = | 0.1048 |
| $\epsilon_\perp$(20° C., 1 kHz) = | 6.4 |
| Δε(20° C., 1 kHz) = | −2.9 |
| $K_1$(20° C.) = | 12.9 pN |
| $K_3/K_1$(20° C.) = | 1.11 |
| $\gamma_1$(20° C.) = | 81 mPa·s |
| $V_0$(20° C.) = | 2.34 V |

This mixture is eminently suitable for use in VA displays or as host for PS-VA applications.

Example 4

| | Composition | |
|---|---|---|
| | Compound | Concentration/ |
| No. | Abbrev. | % by weight |
| 1 | SYP-1-2 | 8.0 |
| 2 | CY-3-O4 | 24.0 |
| 3 | CCY-3-O2 | 3.0 |
| 4 | CCY-3-O3 | 7.0 |
| 5 | CCY-2-1 | 10.0 |
| 6 | CCY-3-1 | 10.0 |
| 7 | PYP-2-4 | 5.0 |
| 8 | CC-3-4 | 15.0 |
| 9 | CC-3-O3 | 7.0 |
| 10 | CC-5-O1 | 5.0 |
| 11 | CCOC-3-3 | 2.0 |
| 12 | CCOC-4-3 | 3.0 |
| 13 | CGPC-3-3 | 1.0 |
| Σ | | 100.0 |

| Physical properties | |
|---|---|
| T(N, I) = | 75.5° C. |
| Δn(20° C., 589 nm) = | 0.0952 |
| Δε(20° C., 1 kHz) = | −2.8 |
| $\gamma_1$(20° C.) = | 134 mPa·s |

This mixture is eminently suitable for use in VA displays and is also particularly suitable as host for PS-VA applications.

Example 5

| | Composition | |
|---|---|---|
| | Compound | Concentration/ |
| No. | Abbrev. | % by weight |
| 1 | SeY-2-O2 | 10.0 |
| 2 | CY-3-O4 | 15.0 |
| 3 | CCY-3-O2 | 6.0 |
| 4 | CCY-3-O3 | 6.0 |
| 5 | CCY-2-1 | 11.0 |
| 6 | CCY-3-1 | 11.0 |
| 7 | PYP-2-4 | 9.0 |
| 8 | CC-3-4 | 15.0 |
| 9 | CC-3-O3 | 8.0 |
| 10 | CC-5-O1 | 4.0 |
| 11 | CCOC-3-3 | 2.0 |
| 12 | CCOC-4-3 | 3.0 |
| Σ | | 100.0 |

| Physical properties | |
|---|---|
| T(N, I) = | 76.5° C. |
| Δn(20° C., 589 nm) = | 0.0960 |
| Δε(20° C., 1 kHz) = | −2.8 |
| $\gamma_1$(20° C.) = | 129 mPa·s |

This mixture is eminently suitable for use in VA displays and is also particularly suitable as host for PS-VA applications.

Example 6

| | Composition | |
|---|---|---|
| | Compound | Concentration/ |
| No. | Abbrev. | % by weight |
| 1 | SeY-2-O2 | 10.0 |
| 2 | CY-3-O2 | 15.0 |
| 3 | CCY-3-O2 | 7.0 |
| 4 | CCY-4-O2 | 9.0 |
| 5 | CPY-2-O2 | 7.0 |
| 6 | CPY-3-O2 | 7.0 |
| 7 | CC-2-3 | 22.0 |
| 8 | CC-3-4 | 8.0 |
| 9 | CP-3-O1 | 3.0 |
| 10 | CCP-3-1 | 5.0 |
| 11 | CCP-3-3 | 7.0 |
| Σ | | 100.0 |

| Physical properties | |
|---|---|
| T(N, I) = | 79.5° C. |
| Δn(20° C., 589 nm) = | 0.0949 |
| Δε(20° C., 1 kHz) = | −3.1 |
| $\gamma_1$(20° C.) = | 106 mPa·s |

This mixture is eminently suitable for use in VA displays and is also particularly suitable as host for PS-VA applications.

Example 7

| Composition | | |
|---|---|---|
| Compound | | Concentration/ |
| No. | Abbrev. | % by weight |
| 1 | SeYP-3-2 | 7.0 |
| 2 | SeYP-4-2 | 7.0 |
| 3 | CY-3-O2 | 17.0 |
| 4 | CCY-3-O2 | 11.0 |
| 5 | CCY-3-O3 | 6.0 |
| 6 | CPY-2-O2 | 6.5 |
| 7 | CPY-3-O2 | 7.0 |
| 8 | CC-3-V | 38.5 |
| Σ | | 100.0 |

| Physical properties | |
|---|---|
| T(N, I) = | 75.5° C. |
| $n_e$(20° C., 589 nm) = | 1.5934 |
| Δn(20° C., 589 nm) = | 0.1067 |
| $\epsilon_\perp$(20° C., 1 kHz) = | 6.5 |
| Δε(20° C., 1 kHz) = | −3.0 |
| $K_1$(20° C.) = | 13.1 pN |
| $K_3/K_1$(20° C.) = | 1.06 |
| $\gamma_1$(20° C.) = | 85 mPa·s |
| $V_0$(20° C.) = | 2.28 V |

This mixture is eminently suitable for use in VA displays or as host for PS-VA applications.

Example 8

| Composition | | |
|---|---|---|
| Compound | | Concentration/ |
| No. | Abbrev. | % by weight |
| 1 | SeYP-3-2 | 6.5 |
| 2 | SeYP-4-2 | 7.0 |
| 3 | CY-3-O4 | 25.0 |
| 4 | CCY-3-O2 | 4.0 |
| 5 | CCY-3-O3 | 5.0 |
| 6 | CCY-2-1 | 10.0 |
| 7 | CCY-3-1 | 9.0 |
| 8 | CC-3-4 | 14.5 |
| 9 | CC-3-O3 | 8.0 |
| 10 | CC-5-O1 | 4.0 |
| 11 | CCOC-3-3 | 2.0 |
| 12 | CCOC-4-3 | 3.0 |
| 13 | CGPC-3-3 | 2.0 |
| Σ | | 100.0 |

| Physical properties | |
|---|---|
| T(N, I) = | 75.5° C. |
| Δn(20° C., 589 nm) = | 0.0950 |
| Δε(20° C., 1 kHz) = | −2.8 |
| $\gamma_1$(20° C.) = | 133 mPa·s |

This mixture is eminently suitable for use in VA displays and is also particularly suitable as host for PS-VA applications.

Various of the example mixtures mentioned may optionally also be mixed with one another, giving similar, advantageous results as for the corresponding starting mixtures. In particular, the increase in the number of mixture constituents which generally accompanies the mixing of various starting mixtures usually results in an improvement in the storage stability of mixtures of this type.

Without further elaboration, it is believed that one skilled in the art can, using the preceding description, utilize the present invention to its fullest extent.

The preceding preferred specific embodiments are, therefore, to be construed as merely illustrative, and not imitative of the remainder of the disclosure in any way whatsoever.

The entire disclosure[s] of all applications, patents and publications, cited herein and of corresponding German priority application No. DE 102009016305.0, filed Apr. 6, 2009, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystalline medium of negative dielectric anisotropy which comprises a) 2-80% by weight of a first dielectrically negative component A, which comprises of one or more compounds of formula I

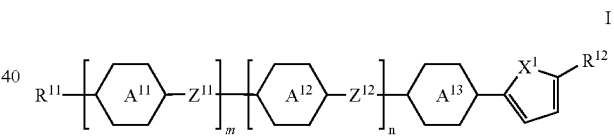

in which $R^{11}$ and $R^{12}$ each, independently of one another, denote H, an unsubstituted alkyl or alkenyl radical having up to 15 C atoms, in which one or more $CH_2$ groups may be replaced by —O—, —S—,

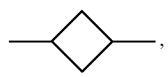

—C≡C—, —$CF_2$—O—, —O—$CF_2$—, —CO—O— or —O—CO— in such a way that O atoms are not linked directly to one another, one of the rings

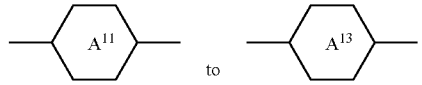

present denotes

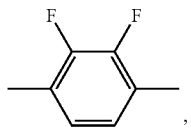

and the others, if present, in each case independently of one another, denote

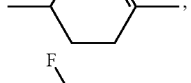
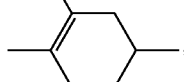
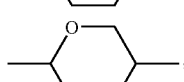
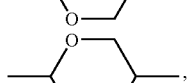
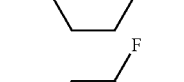
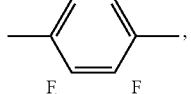
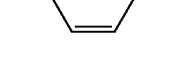
or $Z^{11}$ and $Z^{12}$ each, independently of one another, denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, $X^1$ denotes S, Se or Te, m and n, independently of one another, denote 0 or 1, *and* b) 2-80% by weight of a second dielectrically negative component B, which comprises one or more compounds of formula II, III and/or IV:

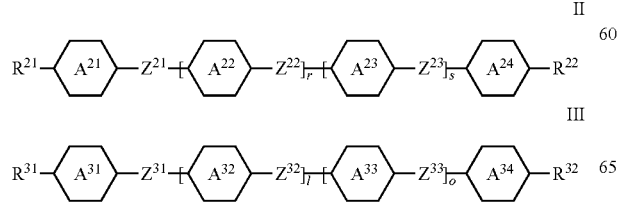

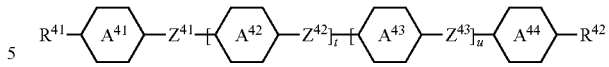

in which $R^{21}$, $R^{22}$, $R^{31}$, $R^{32}$, $R^{41}$ and $R^{42}$ each, independently of one another, denote H, an unsubstituted alkyl or alkenyl radical having up to 15 C atoms, in which one or more CH$_2$ groups may be replaced by —O—, —S—,

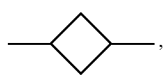

—C≡C—, —CF$_2$—O—, —O—CF$_2$—, —CO—O— or —O—CO— in such a way that O atoms are not linked directly to one another, one of the rings

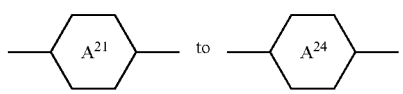

present denotes

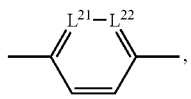

$L^{21}$ and $L^{22}$, independently of one another, denote =C(X$^2$)— and one of $L^{21}$ and $L^{22}$ alternatively also denotes =N—, $X^2$ denotes F, Cl, OCF$_3$, CF$_3$, CH$_3$, CH$_2$F, or CHF$_2$, and the other rings, if present, in each case independently of one another, denote

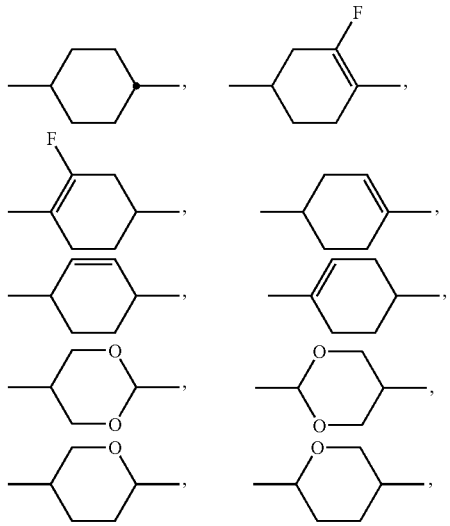

-continued
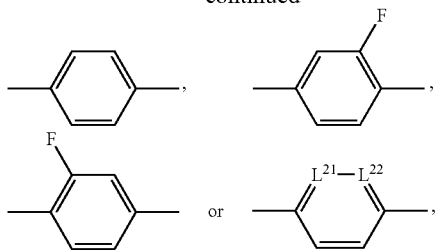
one of the rings
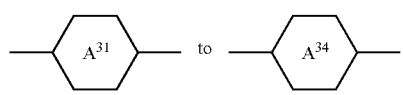
present denotes
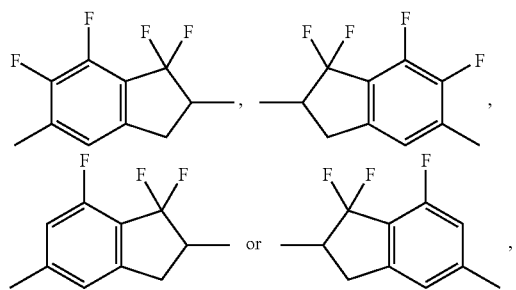
and the others, if present, in each case independently of one another, denote
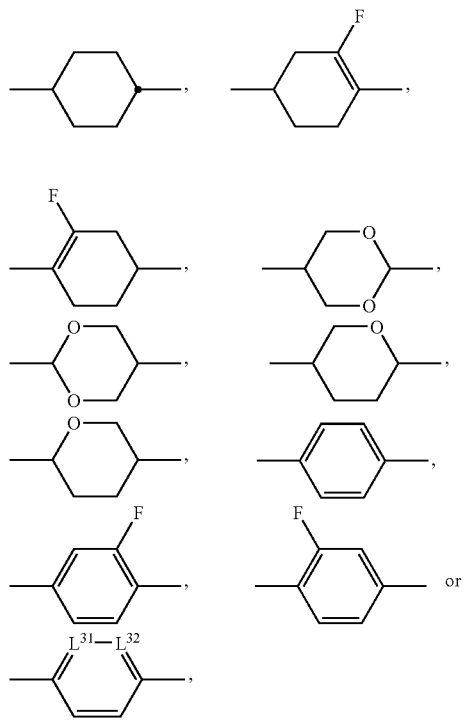
where
L$^{31}$ and L$^{32}$, independently of one another, denote =C(X$^3$)— and one of L$^{31}$ and L$^{32}$ alternatively also denotes =N—, and
X$^3$ denotes F, Cl, OCF$_3$, CF$_3$, CH$_3$, CH$_2$F, or CHF$_2$,
or
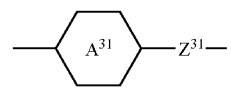
together denote a single bond,
one of the rings
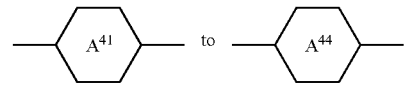
present denotes
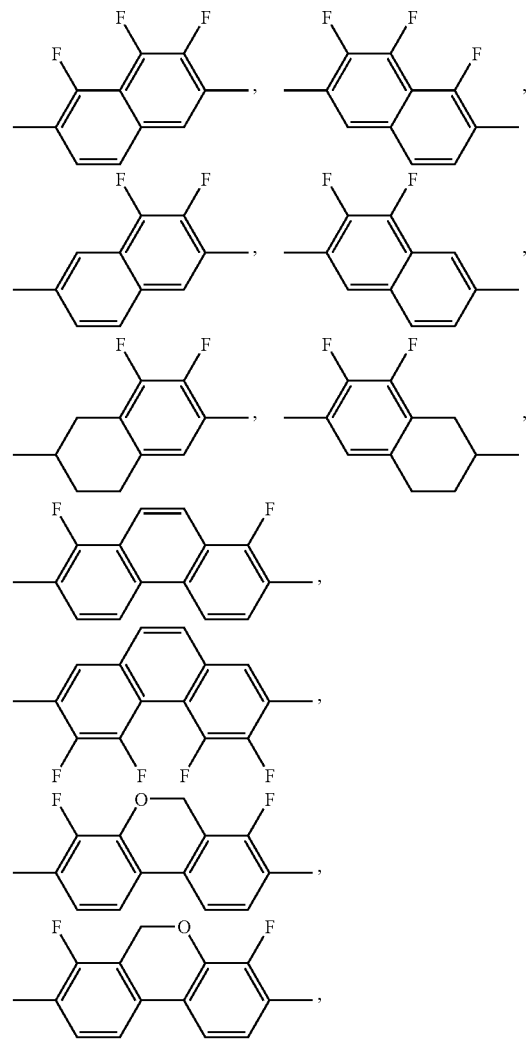

117

-continued

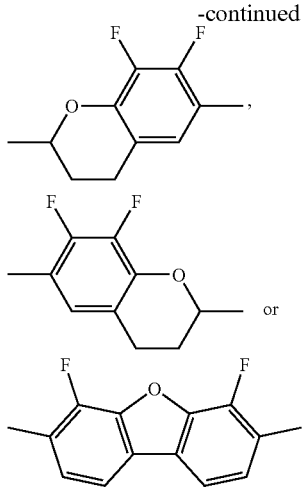

and the others, if present, in each case independently of one another, denote

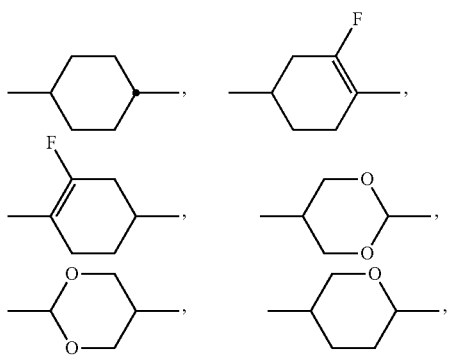

118 together denote a single bond, $Z^{21}$ to $Z^{23}$, $Z^{31}$ to $Z^{33}$ and $Z^{41}$ to $Z^{43}$ each, independently of one another, denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, r and s each, independently of one another, denote 0 or 1, t and u each, independently of one another, denote 0 or 1, l and o each, independently of one another, denote 0 or 1.

2. A medium according to claim 1, further comprising c) a dielectrically neutral component C, which comprises one or more compounds of formula V

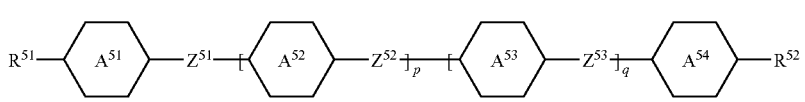

in which $R^{51}$ and $R^{52}$ each, independently of one another, denote H, an unsubstituted alkyl or alkenyl radical having up to 15 C atoms, in which one or more CH$_2$ groups may be replaced by —O—, —S—,

—C≡C—, —CF$_2$—O—, —O—CF$_2$—, —CO—O— or —O—CO— in such a way that O atoms are not linked directly to one another,

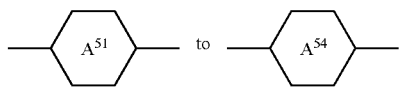

each, independently of one another, denote

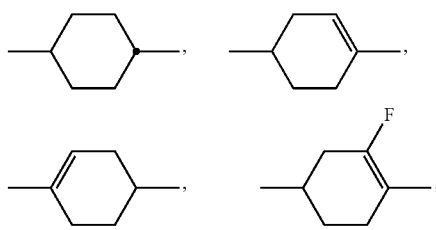

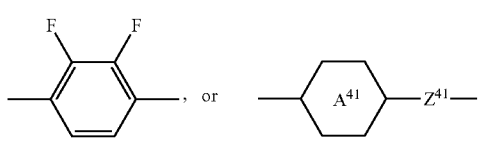

-continued

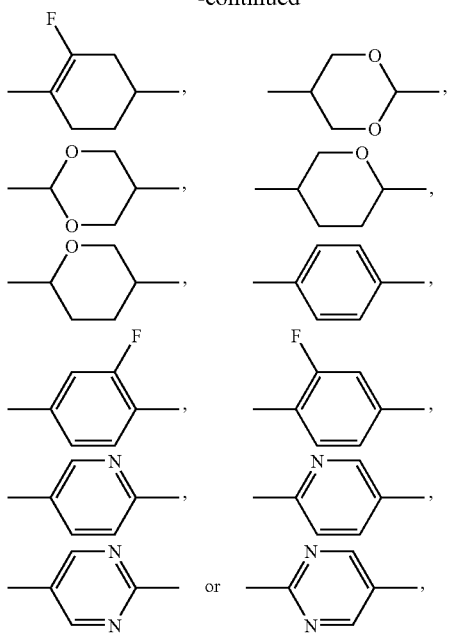

$Z^{51}$ to $Z^{53}$ each, independently of one another, denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, p and q each, independently of one another, denote 0 or 1.

3. A medium according to claim 1, further comprising
  d) a chiral component D, which comprises one or more chiral compounds.

4. A medium according to claim 1, wherein the second dielectrically negative component B comprises one or more compounds of formula II.

5. A medium according to claim 1, comprising one or more compounds of formula I-1, I-2, I-3 and/or I-4:

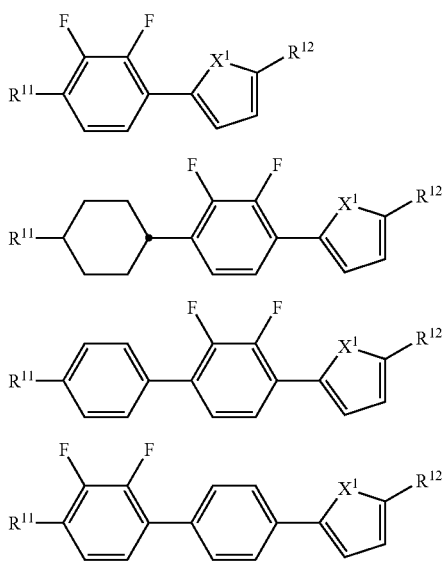

in which $R^{11}$, $R^{12}$ and $X^1$ are defines as for the compounds of formula I.

6. A medium, comprising
  2-80% by weight of one or more compounds of formula I, and
  2-80% by weight of one or more compounds of formula II, and/or
  2-80% by weight of one or more compounds of formula III, and/or
  2-80% by weight of one or more compounds of formula IV, and
  2-80% by weight of one or more compounds of formula V,
  where the total content of all compounds of the formulae I to V in the medium is 100% by weight or less,

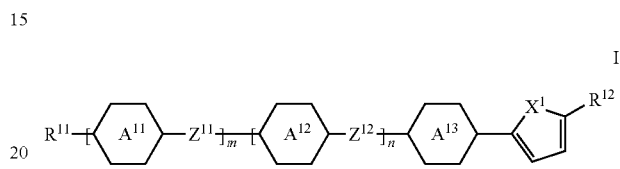

in which $R^{11}$ and $R^{12}$ each, independently of one another, denote H, an unsubstituted alkyl or alkenyl radical having up to 15 C atoms, in which one or more CH$_2$ groups may be replaced by —O—, —S—,

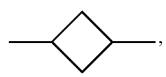

—C≡C—, —CF$_2$—O—, —O—CF$_2$—, —CO—O— or —O—CO— in such a way that O atoms are not linked directly to one another, one of the rings

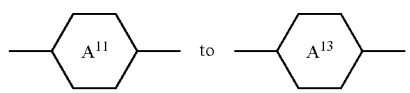

present denotes

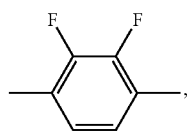

and the others, if present, in each case independently of one another, denote

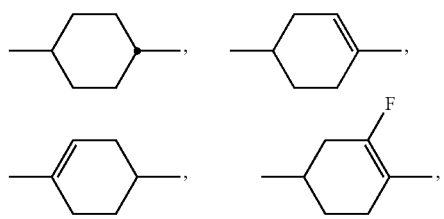

-continued

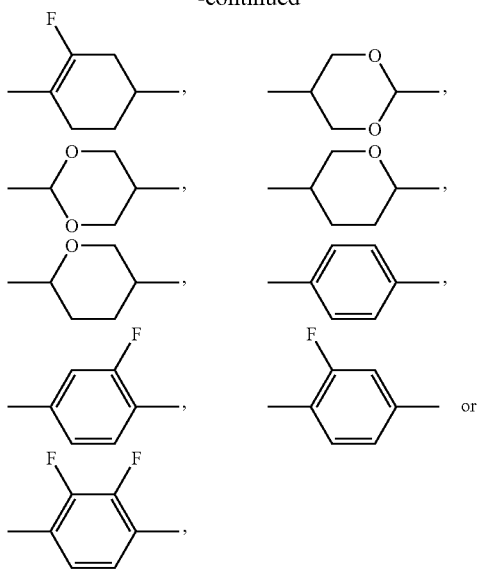

$Z^{11}$ and $Z^{12}$ each, independently of one another, denote —CH₂—CH₂—, —CH=CH—, —C≡C—, —CH₂—O—, —O—CH₂—, —CO—O—, —O—CO—, —CF₂—O—, —O—CF₂—, —CF₂—CF₂— or a single bond, $X^1$ denotes S, Se or Te, m and n, independently of one another, denote 0 or 1;

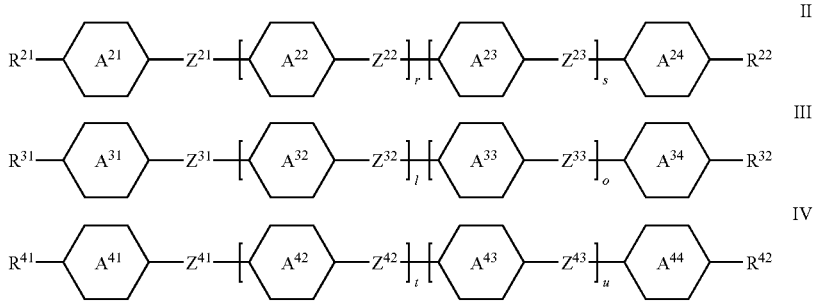

in which $R^{21}$, $R^{22}$, $R^{31}$, $R^{32}$, $R^{41}$ and $R^{42}$ each, independently of one another, denote H, an unsubstituted alkyl or alkenyl radical having up to 15 C atoms, in which one or more CH₂ groups may be replaced by —O—, —S—,

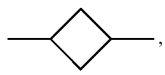

—C≡C—, —CF₂—O—, —O—CF₂—, —CO—O— or —O—CO— in such a way that O atoms are not linked directly to one another, one of the rings

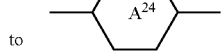 to 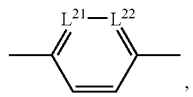

present denotes

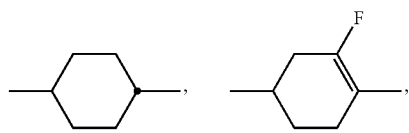

$L^{21}$ and $L^{22}$, independently of one another, denote =C(X²)— and one of $L^{21}$ and $L^{22}$ alternatively also denotes =N—, $X^2$ denotes F, Cl, OCF₃, CF₃, CH₃, CH₂F, or CHF₂, and the other rings, if present, in each case independently of one another, denote -continued

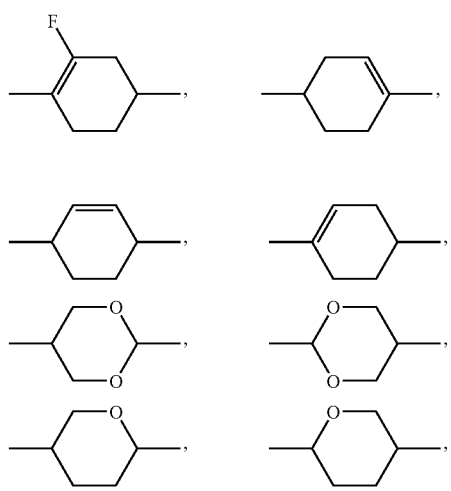

-continued
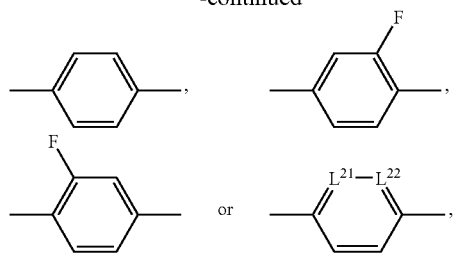
one of the rings
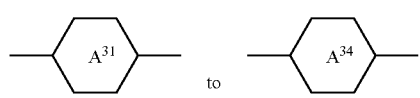
to
present denotes
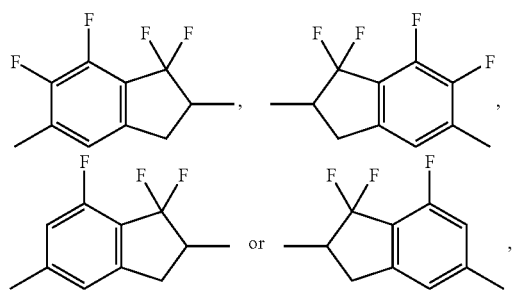
and the others, if present, in each case independently of one another, denote
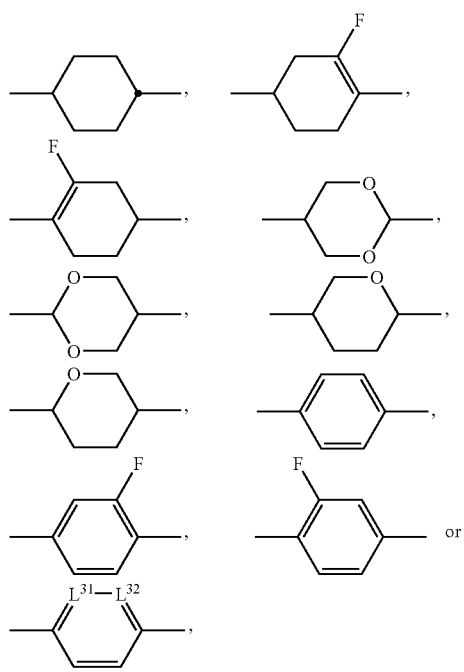
where
$L^{31}$ and $L^{32}$, independently of one another, denote =C($X^3$)— and one of $L^{31}$ and $L^{32}$ alternatively also denotes =N—, and
$X^3$ denotes F, Cl, $OCF_3$, $CF_3$, $CH_3$, $CH_2F$, or $CHF_2$, or
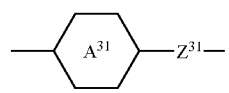
together denote a single bond,
one of the rings
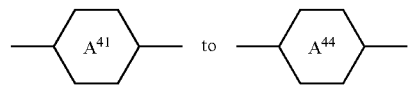
present denotes
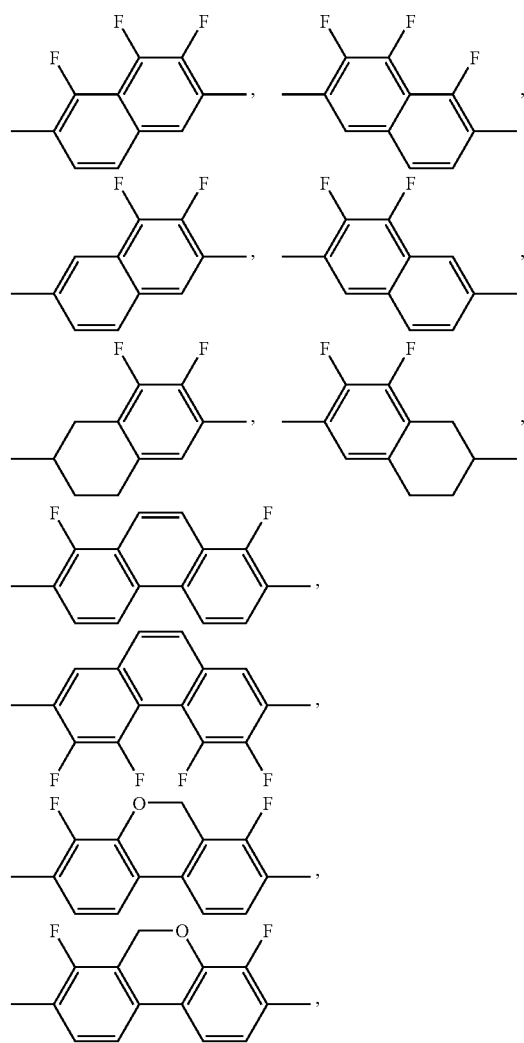

-continued

[chemical structures]

and the others, if present, in each case independently of one another, denote

[chemical structures]

-continued

[chemical structures] or $-\!\!\!-\!\!\!\overset{A^{41}}{\bigcirc}\!\!\!-\!\!\!Z^{41}\!-\!\!\!$ together denote a single bond, $Z^{21}$ to $Z^{23}$, $Z^{31}$ to $Z^{33}$ and $Z^{41}$ to $Z^{43}$ each, independently of one another, denote —$CH_2$—$CH_2$—, —CH=CH—, —C≡C—, —$CH_2$—O—, —O—$CH_2$—, —CO—O—, —O—CO—, —$CF_2$—O—, —O—$CF_2$—, —$CF_2$—$CF_2$— or a single bond, r and s each, independently of one another, denote 0 or 1, t and u each, independently of one another, denote 0 or 1, l and o each, independently of one another, denote 0 or 1;

$$R^{51}\!-\!\!\!\overset{A^{51}}{\bigcirc}\!\!-\!Z^{51}\!-\!\!\!\overset{A^{52}}{\bigcirc}\!\!-\!Z^{52}\!\!\!-_p\!\!-\!\!\!\overset{A^{53}}{\bigcirc}\!\!-\!Z^{53}\!\!\!-_q\!\!-\!\!\!\overset{A^{54}}{\bigcirc}\!\!-\!R^{52}\quad V$$

in which $R^{51}$ and $R^{52}$ each, independently of one another, denote H, an unsubstituted alkyl or alkenyl radical having up to 15 C atoms, in which one or more $CH_2$ groups may be replaced by —O—, —S—,

[chemical structure]

—C≡C—, —$CF_2$—O—, —O—$CF_2$—, —CO—O— or —O—CO— in such a way that O atoms are not linked directly to one another, $-\!\!\!-\!\!\!\overset{A^{51}}{\bigcirc}\!\!\!-\!\!\!$ to $-\!\!\!-\!\!\!\overset{A^{54}}{\bigcirc}\!\!\!-\!\!\!$ each, independently of one another, denote

[chemical structures]

-continued

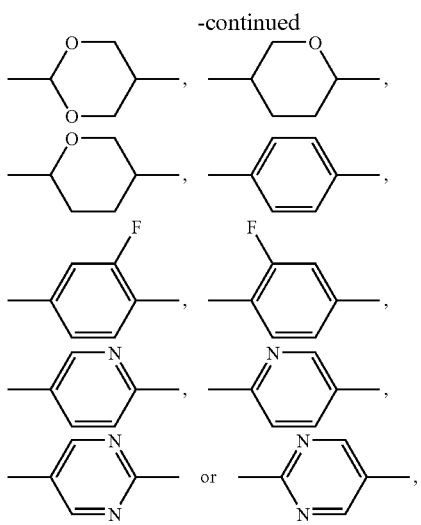

$Z^{51}$ to $Z^{53}$ each, independently of one another, denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, p and q each, independently of one another, denote 0 or 1.

7. An electro-optical display, containing as dielectric, a liquid-crystalline medium according to claim 1.

8. A display according to claim 7, which has an active-matrix addressing device.

9. A display according to claim 7, which is based on the VA, ECB, PS-VA, FFS or IPS effect.

10. A process for preparing a medium according to claim 1, comprising mixing one or more compounds of formula I with one or more further liquid-crystalline compounds and/or one or more dopants, dyes and/or additives and with one or more compounds of formula II, III and/or IV

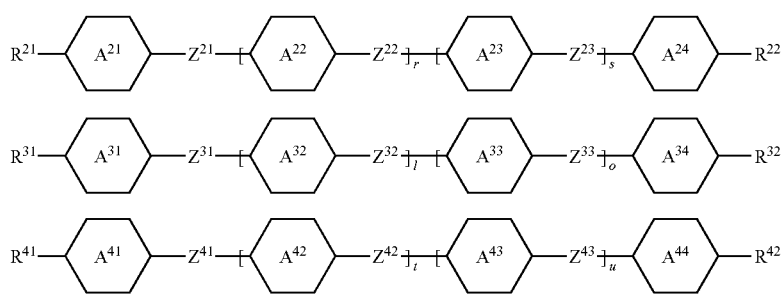

in which
$R^{21}$, $R^{22}$, $R^{31}$, $R^{32}$,
$R^{41}$ and $R^{42}$ each, independently of one another, denote H, an unsubstituted alkyl or alkenyl radical having up to 15 C atoms, in which one or more CH$_2$ groups may be replaced by —O—, —S—,

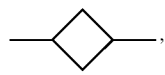

—C≡C—, —CF$_2$—O—, —O—CF$_2$—, —CO—O— or —O—CO— in such a way that O atoms are not linked directly to one another, one of the rings

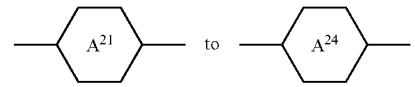

present denotes

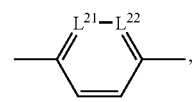

$L^{21}$ and $L^{22}$, independently of one another, denote =C(X$^2$)— and one of $L^{21}$ and $L^{22}$ alternatively also denotes =N—, X$^2$ denotes F, Cl, OCF$_3$, CF$_3$, CH$_3$, CH$_2$F, or CHF$_2$, and the other rings, if present, in each case independently of one another, denote

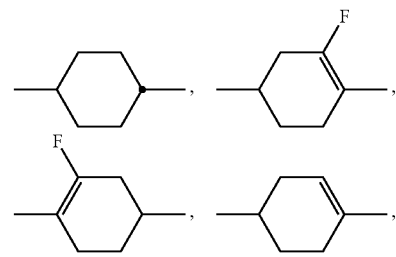

-continued

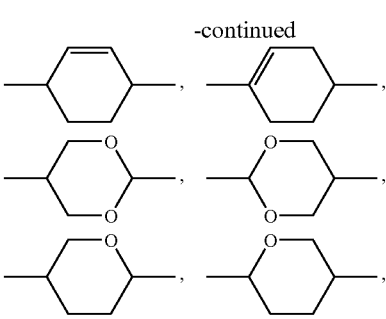

-continued
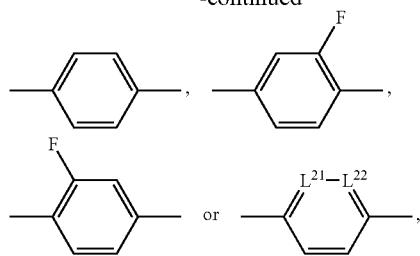
one of the rings
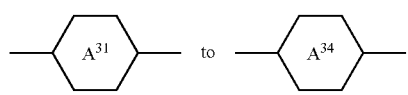
present denotes
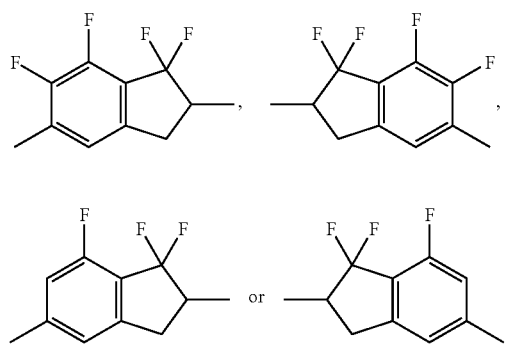
and the others, if present, in each case independently of one another, denote
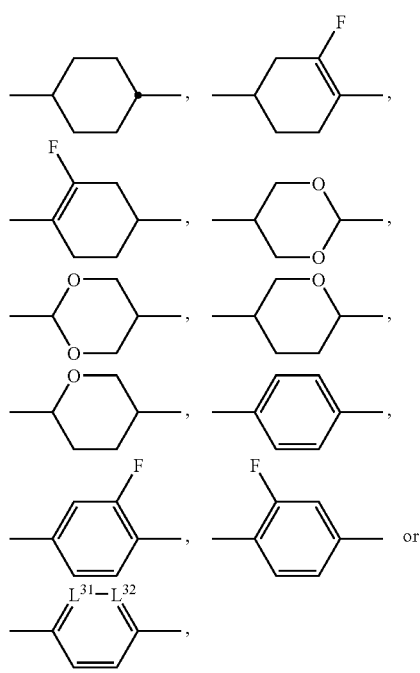
where
$L^{31}$ and $L^{32}$, independently of one another, denote $=C(X^3)-$ and one of $L^{31}$ and $L^{32}$ alternatively also denotes $=N-$, and
$X^3$ denotes F, Cl, $OCF_3$, $CF_3$, $CH_3$, $CH_2F$, or $CHF_2$, or
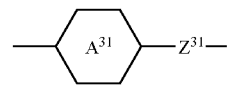
together denote a single bond,
one of the rings
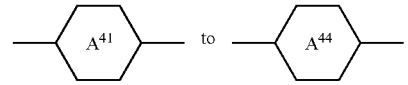
present denotes
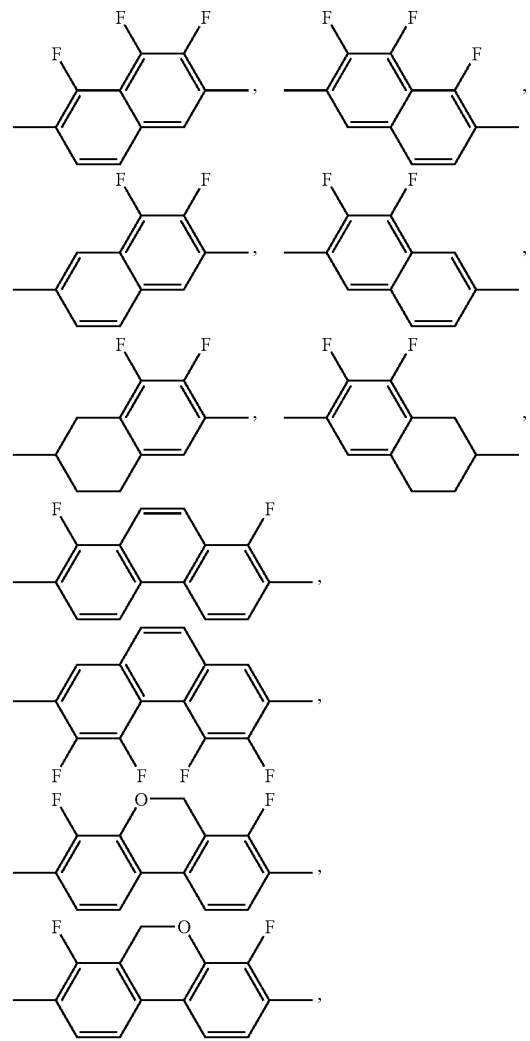

and the others, if present, in each case independently of one another, denote together denote a single bond,
$Z^{21}$ to $Z^{23}$,
$Z^{31}$ to $Z^{33}$ and
$Z^{41}$ to $Z^{43}$ each, independently of one another, denote
—CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, r and s each, independently of one another, denote 0 or 1,
t and u each, independently of one another, denote 0 or 1,
l and o each, independently of one another, denote 0 or 1.

11. A medium according to claim 2 which comprises 2-80% by weight of one or more compounds of formula V, where the total content of all compounds of the formulae I to V in the medium is 100% by weight or less.

12. A medium according to claim 1, wherein the second dielectrically negative component B comprises one or more compounds of formula III.

13. A medium according to claim 1, wherein the second dielectrically negative component B comprises one or more compounds of formula IV.

14. A medium according to claim 1, which comprises at least one compound of the formula I, wherein $X^1$ denotes S.

15. A medium according to claim 1, which comprises at least one compound of the formula I, wherein $X^1$ denotes Se.

16. A medium according to claim 1, which comprises at least one compound of the formula I, wherein $X^1$ denotes Te.

17. A medium according to claim 3, which comprises at least one compound of the formula I, wherein $X^1$ denotes S.

18. A medium according to claim 3, which comprises at least one compound of the formula I, wherein $X^1$ denotes Se.

19. A medium according to claim 3, which comprises at least one compound of the formula I, wherein $X^1$ denotes Te.

20. A medium according to claim 5, which comprises at least one compound of one of the formulae I1 to I4, wherein $X^1$ denotes S.

21. A medium according to claim 5, which comprises at least one compound of one of the formulae I1 to I4, wherein $X^1$ denotes Se.

22. A medium according to claim 5, which comprises at least one compound of one of the formulae I1 to I4, wherein $X^1$ denotes Te.

23. An electro-optical display, containing as dielectric, a liquid-crystalline medium according to claim 3.

24. A display according to claim 23, which has an active-matrix addressing device.

25. A display according to claim 23, which is based on the VA, ECB, PS-VA, FFS or IPS effect.

26. An electro-optical display, containing as dielectric, a liquid-crystalline medium according to claim 5.

27. A display according to claim 26, which has an active-matrix addressing device.

28. A display according to claim 26, which is based on the VA, ECB, PS-VA, FFS or IPS effect.

29. An electro-optical display, containing as dielectric, a liquid-crystalline medium according to claim 6.

30. A display according to claim 29, which has an active-matrix addressing device.

31. A display according to claim 29, which is based on the VA, ECB, PS-VA, FFS or IPS effect.

* * * * *